(12) United States Patent
Lee et al.

(10) Patent No.: US 10,454,733 B2
(45) Date of Patent: *Oct. 22, 2019

(54) PREAMBLE SEQUENCE GENERATION METHOD IN WIRELESS LAN SYSTEM

(71) Applicant: LG ELECTRONICS INC., Seoul (KR)

(72) Inventors: Kilbom Lee, Seoul (KR); Jinsoo Choi, Seoul (KR); Wookbong Lee, Seoul (KR); Hangyu Cho, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

This patent is subject to a terminal disclaimer.

(21) Appl. No.: 15/516,773

(22) PCT Filed: Oct. 5, 2015

(86) PCT No.: PCT/KR2015/010481
§ 371 (c)(1),
(2) Date: Apr. 4, 2017

(87) PCT Pub. No.: WO2016/056799
PCT Pub. Date: Apr. 14, 2016

(65) Prior Publication Data
US 2017/0310516 A1    Oct. 26, 2017

Related U.S. Application Data

(60) Provisional application No. 62/059,963, filed on Oct. 5, 2014.

(51) Int. Cl.
*H04L 27/26* (2006.01)
*H04W 84/12* (2009.01)

(52) U.S. Cl.
CPC ...... *H04L 27/2608* (2013.01); *H04L 27/2613* (2013.01); *H04L 27/2621* (2013.01); *H04W 84/12* (2013.01)

(58) Field of Classification Search
CPC ......... H04L 27/2602; H04L 2027/0095; H04L 27/2608; H04L 27/2621
(Continued)

(56) References Cited

U.S. PATENT DOCUMENTS

2003/0104797 A1* 6/2003 Webster ............ H04L 25/03159
455/296
2008/0192819 A1* 8/2008 Ward ..................... G06T 5/009
375/240.02

(Continued)

FOREIGN PATENT DOCUMENTS

WO    WO 2011/031058 A2    3/2011
WO    WO 2013/033231 A2    3/2013

*Primary Examiner* — Emmanuel Bayard
(74) *Attorney, Agent, or Firm* — Birch, Stewart, Kolasch & Birch, LLP

(57) ABSTRACT

Disclosed is a sequence generation method for: generating a basic sequence structure comprising $C_{52}$, which is composed of 52 tones, and $D_{12}$, which is composed of 12 tones; selecting any one among a plurality of phase rotation factors, which are determined in advance for a bandwidth and applied to the basic sequence structure by unit of $C_{52}$ or $C_{52}D_{12}$; and generating a sequence inserted into a preamble to be transmitted to a terminal.

16 Claims, 11 Drawing Sheets

(58) Field of Classification Search
USPC .................................................. 375/259–260
See application file for complete search history.

(56) References Cited

U.S. PATENT DOCUMENTS

| | | |
|---|---|---|
| 2012/0269125 A1 | 10/2012 | Porat et al. |
| 2012/0327871 A1 | 12/2012 | Ghosh et al. |
| 2014/0029681 A1 | 1/2014 | Zhang et al. |
| 2016/0286551 A1* | 9/2016 | Lee .................... H04L 27/26 |
| 2016/0330006 A1* | 11/2016 | Zhang ................. H04L 5/0048 |
| 2017/0373911 A1* | 12/2017 | Lee .................... H04L 27/26 |

* cited by examiner

PREAMBLE SEQUENCE GENERATION METHOD IN WIRELESS LAN SYSTEM

TECHNICAL FIELD

The present invention relates to a wireless communication system, and more particularly, to a method for generating a sequence for communication between a base station and a user equipment and apparatus therefore.

BACKGROUND ART

Recently, with development of information communication technology, various wireless communication technologies have been developed. Among others, a wireless local area network (WLAN) enables wireless access to the Internet using a portable terminal such as a personal digital assistant (PDA), a laptop, a portable multimedia player (PMP) in a home, an enterprise or a specific service provision area based on radio frequency technology.

In order to overcome limitations in communication rate which have been pointed out as weakness of a WLAN, in recent technical standards, a system for increasing network speed and reliability and extending wireless network distance has been introduced. For example, in IEEE 802.11n, multiple input and multiple output (MIMO) technology using multiple antennas in a transmitter and a receiver has been introduced in order to support high throughput (HT) with a maximum data rate of 540 Mbps or more, to minimize transmission errors, and to optimize data rate.

As next-generation communication technology, machine-to-machine (M2M) communication technology has been discussed. Even in an IEEE 802.11 WLAN system, technical standards supporting M2M communication have been developed as IEEE 802.11ah. In M2M communication, a scenario in which a small amount of data is communicated at a low rate may be considered in an environment in which many apparatuses are present.

Communication in a WLAN system is performed in a medium shared between all apparatuses. As in M2M communication, if the number of apparatuses is increased, in order to reduce unnecessary power consumption and interference, a channel access mechanism needs to be more efficiently improved.

DISCLOSURE OF THE INVENTION

Technical Task

An object of the present invention devised to solve the problem is to improve performance of a sequence that will be transmitted to a user equipment in a new communication system.

Another object of the present invention is to maximize an AGC (Adaptive Gain Control) gain as well as to minimize PAPR (Peak to Average Power Ratio) degradation.

A further object of the present invention is to provide various sequences for the communication system by designing a plurality of phase rotation factors capable of securing the same PAPR depending on communication bandwidths.

The technical problems solved by the present invention are not limited to the above technical problems and other technical problems which are not described herein will become apparent to those skilled in the art from the following description.

Technical Solutions

In an aspect of the present invention, provided herein is a sequence generation method, including: generating a basic sequence structure including $C_{52}$s, each of which is composed of 52 tones, and $D_{12}$s, each of which is composed of 12 tones and has a non-zero value at an interval of 4 tones; selecting any one from among a plurality of phase rotation factors predetermined with respect to bandwidths for communication with a user equipment (UE); and generating the sequence to be inserted into the preamble to be transmitted to the UE using the basic sequence structure and the phase rotation factor. In this case, the phase rotation factor may be applied to the basic sequence structure in a unit of a $C_{52}$ or a $C_{52}D_{12}$.

The basic sequence structure may be configured in the form of a $C_{52}D_{12}C_{52}D_{12}C_{52}D_{12}C_{52}$.

The phase rotation factor may be applied in the unit of the $C_{52}D_{12}$ to change a phase of each $C_{52}D_{12}$ of the basic sequence structure and the phase rotation factor may be applied in the unit of the $C_{52}$ to change a phase of the remaining $C_{52}$.

A $D_{12}$ is $\{0, 0, 0, 1+j, 0, 0, 0, -1-j, 0, 0, 0, -1-j\}$.

The sequence may be generated by adding a $0_5$, which is composed of five consecutive 0s, to front of the basic sequence structure and adding a $0_7$, which is composed of seven consecutive 0s, to back of the basic sequence structure.

In a 20 MHz bandwidth, the sequence to which the $0_5$ and the $0_7$ are added may be used without any change. In a 40 MHz bandwidth, a sequence composed of two partial sequences, each of which is generated by eliminating the $0_5$ and the $0_7$ from the sequence for the 20 MHz bandwidth, one $D_{12}$, one $0_5$, and one $0_7$ may be used. In an 80 MHz bandwidth, a sequence composed of two partial sequences, each of which is generated by eliminating the $0_5$ and the $0_7$ from the sequence for the 40 MHz bandwidth, one $D_{12}$, one $0_5$, and one $0_7$ may be used.

In the 40 MHz bandwidth, the phase rotation factor may change phases in a unit of the partial sequence generated by eliminating the $0_5$ and the $0_7$ from the sequence for the 20 MHz bandwidth and in the 80 MHz bandwidth, the phase rotation factor may change phases in a unit of the partial sequence generated by eliminating the $0_5$ and the $0_7$ from the sequence for the 40 MHz bandwidth.

The plurality of the phase rotation factors may be generated by multiplying any single phase rotation factor by 1, -1, i, or -i, cyclic-shifting the any single phase rotation factor, or arranging the any single phase rotation in reverse order.

The sequence generation method may further include transmitting the preamble to the UE by inserting the generated sequence into the preamble.

In another aspect of the present invention, provided herein is an access point (AP), including: a transmitter; a receiver; and a processor connected to the transmitter and the receiver and configured to generate the sequence. In this case, the processor may be configured to: generate a basic sequence structure including $C_{52}$s, each of which is composed of 52 tones, and $D_{12}$s, each of which is composed of 12 tones and has a non-zero value at an interval of 4 tones; select any one from among a plurality of phase rotation factors predetermined with respect to bandwidths for communication with a user equipment (UE); and generate the sequence to be inserted into the preamble to be transmitted to the UE using the basic sequence structure and the phase rotation factor. In addition, the phase rotation factor may be applied to the basic sequence structure in a unit of a $C_{52}$ or a $C_{52}D_{12}$.

Advantageous Effects

According to the embodiments of the present invention have the following effects.

First, improved performance of a preamble sequence can be used in a new communication system having an extended bandwidth.

Second, it is possible not only to obtain AGC performance gain but also to minimize PAPR performance degradation.

Third, a plurality of sequences are designed for each bandwidth, whereby the communication system can select any one from among various sequence candidates.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE FOR INVENTION

Figure 1:
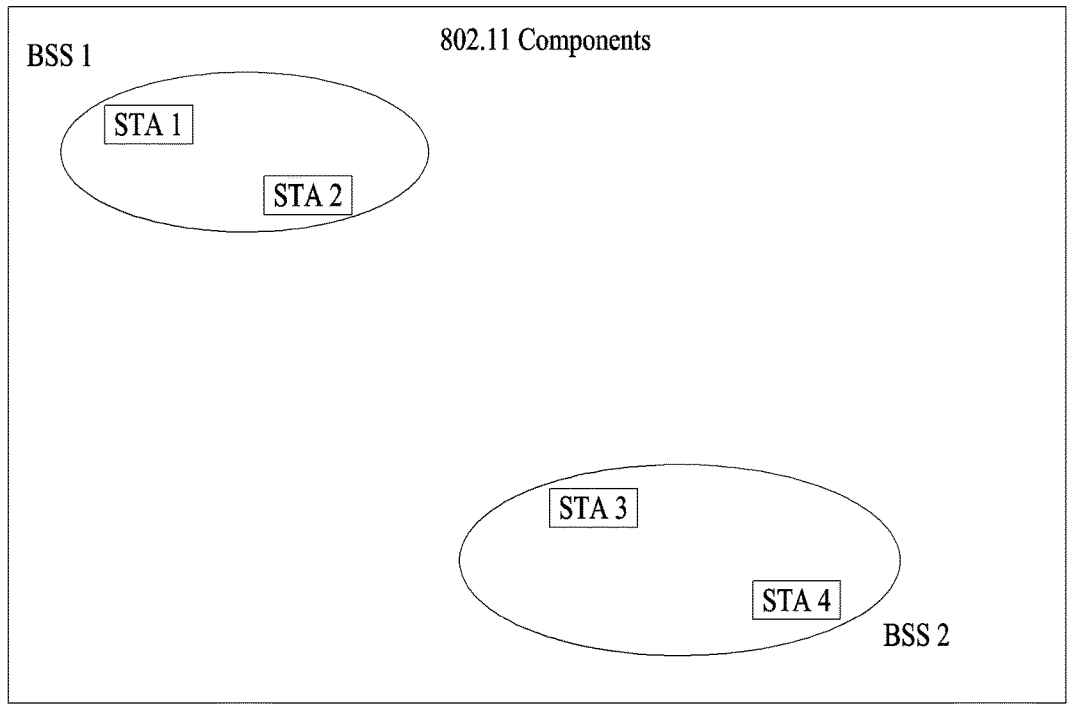
FIG. 1 is a diagram showing an exemplary structure of an IEEE 802.11 system to which the present invention is applicable.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. IEEE 802.11 System Overview 1.1 Structure of WLAN System

FIG. 1 is a diagram showing an exemplary structure of an IEEE 802.11 system to which the present invention is applicable.

An IEEE 802.11 structure may be composed of a plurality of components and a wireless local area network (WLAN) supporting station (STA) mobility transparent to a higher layer may be provided by interaction among the components. A basic service set (BSS) may correspond to a basic component block in an IEEE 802.11 LAN. In FIG. 1, two BSSs (BSS1 and BSS2) are present and each BSS includes two STAs (STA1 and STA2 are included in BSS1 and STA3 and STA4 are included in BSS2) as members. In FIG. 1, an ellipse indicating the BSS indicates a coverage area in which STAs included in the BSS maintains communication. This area may be referred to as a basic service area (BSA). If an STA moves out of a BSA, the STA cannot directly communicate with other STAs in the BSA.

In an IEEE 802.11 LAN, a BSS is basically an independent BSS (IBSS). For example, the IBSS may have only two STAs. In addition, the simplest BSS (BSS1 or BSS2) of FIG. 1, in which other components are omitted, may correspond to a representative example of the IBSS. Such a configuration is possible when STAs can directly perform communication. In addition, such a LAN is not configured in advance but may be configured if a LAN is necessary. This LAN may also be referred to as an ad-hoc network.

If an STA is turned on or off or if an STA enters or moves out of a BSS, the membership of the STA in the BSS may be dynamically changed. An STA may join a BSS using a synchronization process in order to become a member of the BSS. In order to access all services of a BSS based structure, an STA should be associated with the BSS. Such association may be dynamically set and may include use of a distribution system service (DSS).

Figure 2:
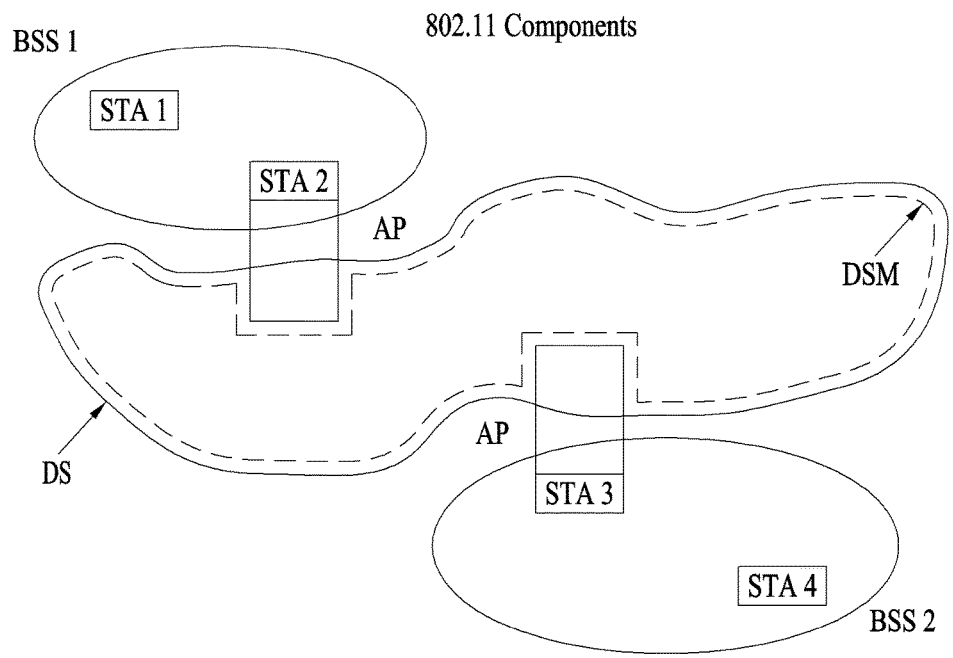
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, a distribution system (DS), a distribution system medium (DSM) and an access point (AP) are added to the structure of FIG. 1.

In a LAN, a direct station-to-station distance may be restricted by PHY performance. Although such distance restriction may be possible, communication between stations located at a longer distance may be necessary. In order to support extended coverage, a DS may be configured.

The DS means a structure in which BSSs are mutually connected. More specifically, the BSSs are not independently present as shown in FIG. 1 but the BSS may be present as an extended component of a network including a plurality of BSSs.

The DS is a logical concept and may be specified by characteristics of the DSM. In IEEE 802.11 standards, a wireless medium (WM) and a DSM are logically distinguished. Logical media are used for different purposes and are used by different components. In IEEE 802.11 standards, such media are not restricted to the same or different media. Since plural media are logically different, an IEEE 802.11 LAN structure (a DS structure or another network structure) may be flexible. That is, the IEEE 802.11 LAN structure may be variously implemented and a LAN structure may be independently specified by physical properties of each implementation.

The DS provides seamless integration of a plurality of BSSs and provides logical services necessary to treat an address to a destination so as to support a mobile apparatus.

The AP means an entity which enables associated STAs to access the DS via the WM and has STA functionality. Data transfer between the BSS and the DS may be performed via the AP. For example, STA2 and STA3 shown in FIG. 2 have STA functionality and provide a function enabling associated STAs (STA1 and STA4) to access the DS. In addition, since all APs correspond to STAs, all APs may be addressable entities. An address used by the AP for communication on the WM and an address used by the AP for communication on the DSM may not be equal.

Data transmitted from one of STAs associated with the AP to the STA address of the AP may always be received by an uncontrolled port and processed by an IEEE 802.1X port access entity. In addition, if a controlled port is authenticated, transmission data (or frames) may be transmitted to the DS.

Figure 3:
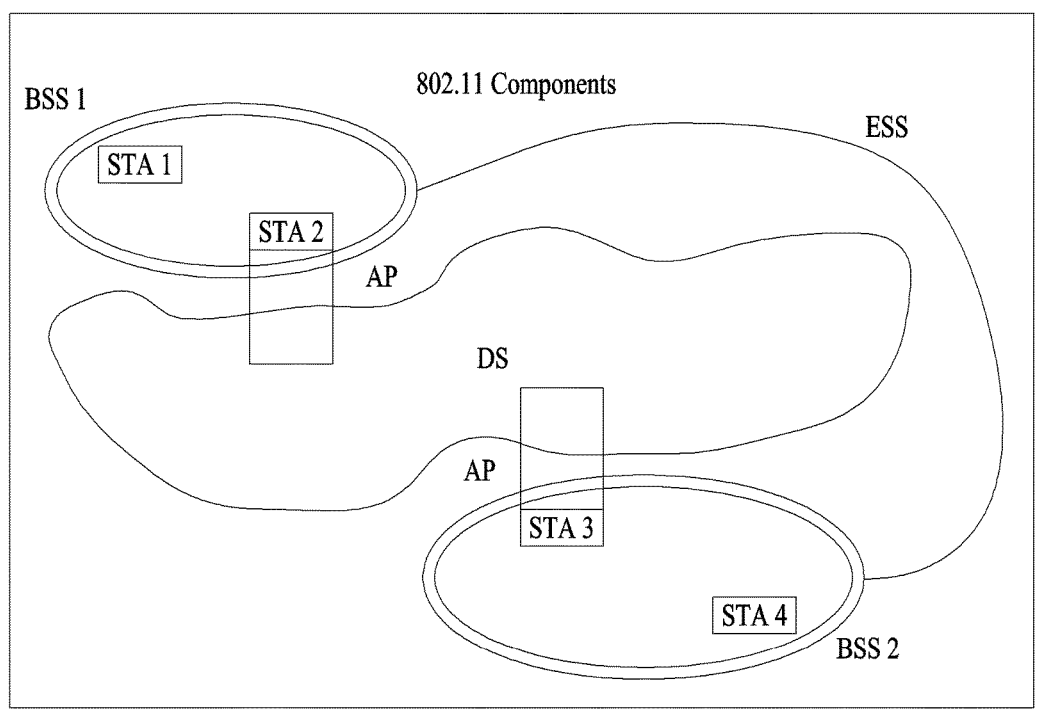
FIG. 3 is a diagram showing another exemplary structure of an IEEE 802.11 system to which the present invention is applicable.

FIG. 3 is a diagram showing another exemplary structure of an IEEE 802.11 system to which the present invention is applicable. In FIG. 3, an extended service set (ESS) for providing wide coverage is added to the structure of FIG. 2.

A wireless network having an arbitrary size and complexity may be composed of a DS and BSSs. In an IEEE 802.11 system, such a network is referred to as an ESS network. The ESS may correspond to a set of BSSs connected to one DS. However, the ESS does not include the DS. The ESS network appears as an IBSS network at a logical link control (LLC) layer. STAs included in the ESS may communicate with each other and mobile STAs may move from one BSS to another BSS (within the same ESS) transparently to the LLC layer.

In IEEE 802.11, relative physical locations of the BSSs in FIG. 3 are not assumed and may be defined as follows. The BSSs may partially overlap in order to provide consecutive coverage. In addition, the BSSs may not be physically connected and a distance between BSSs is not logically restricted. In addition, the BSSs may be physically located at the same location in order to provide redundancy. In addition, one (or more) IBSS or ESS network may be physically present in the same space as one (or more) ESS network. This corresponds to an ESS network type such as a case in which an ad-hoc network operates at a location where the ESS network is present, a case in which IEEE 802.11 networks physically overlapped by different organizations are configured or a case in which two or more different access and security policies are necessary at the same location.

Figure 4:
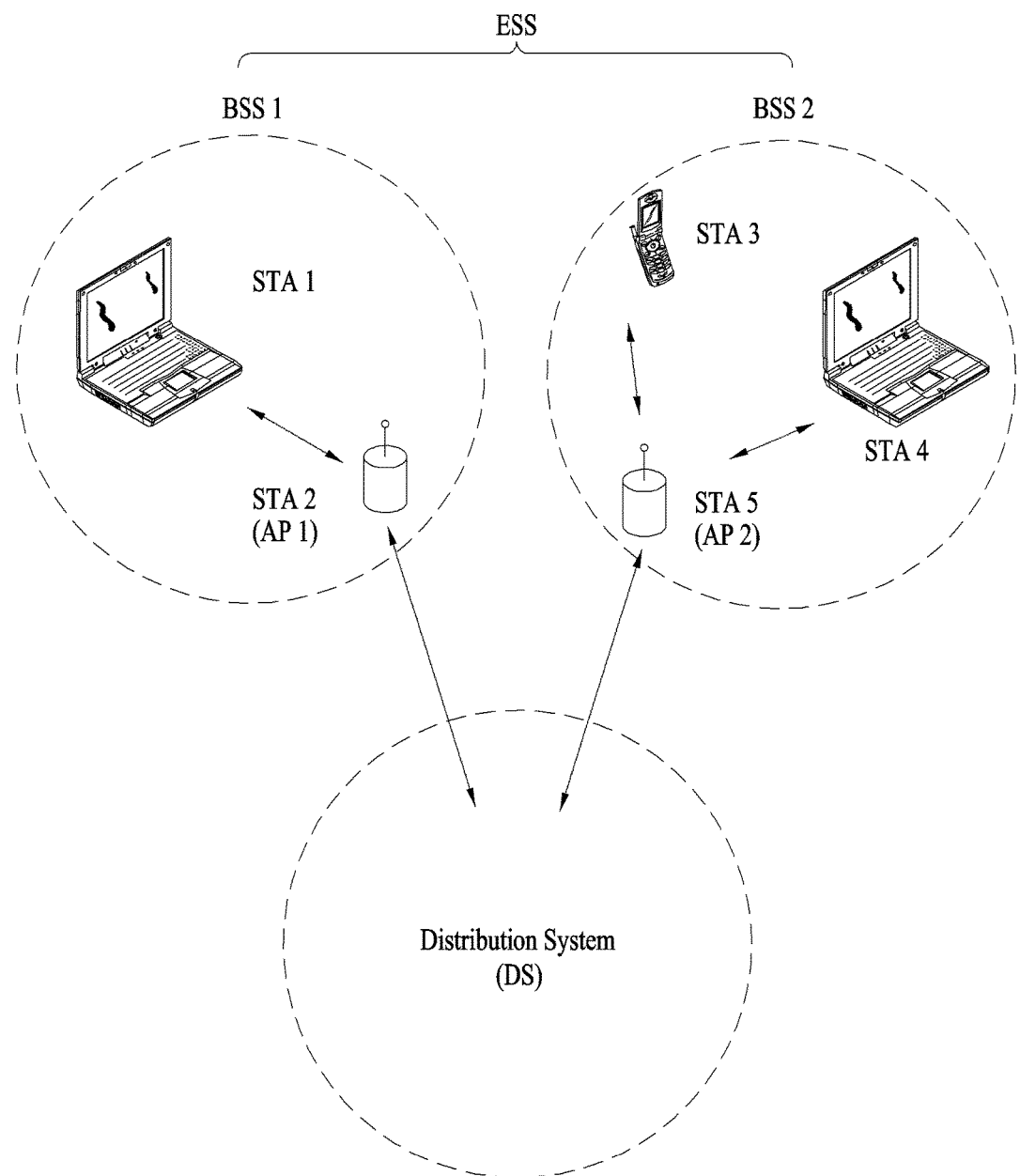
FIG. 4 is a diagram showing an exemplary structure of a WLAN system.

FIG. 4 is a diagram showing an exemplary structure of a WLAN system. FIG. 4 shows an example of an infrastructure BSS including a DS.

In the example of FIG. 4, BSS1 and BSS2 configure an ESS. In the WLAN system, an STA operates according to a MAC/PHY rule of IEEE 802.11. The STA includes an AP STA and a non-AP STA. The non-AP STA corresponds to an apparatus directly handled by a user, such as a laptop or a mobile phone. In the example of FIG. 4, STA1, STA3 and STA4 correspond to the non-AP STA and STA2 and STA5 correspond to the AP STA.

In the following description, the non-AP STA may be referred to as a terminal, a wireless transmit/receive unit (WTRU), a user equipment (UE), a mobile station (MS), a mobile terminal or a mobile subscriber station (MSS). In addition, the AP may correspond to a base station (BS), a Node-B, an evolved Node-B (eNB), a base transceiver system (BTS) or a femto BS.

1.2 Link Setup Process

Figure 5:
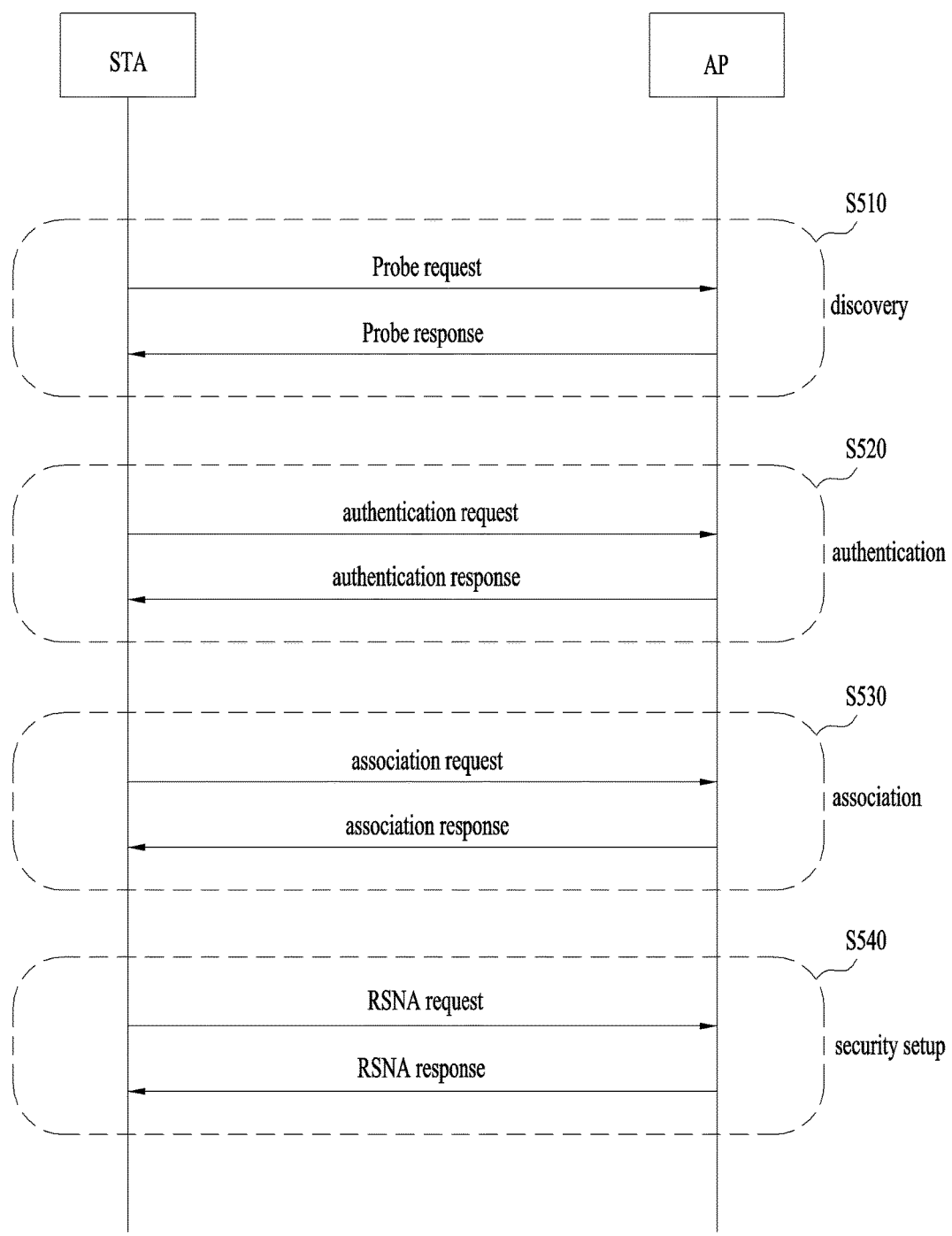
FIG. 5 is a diagram illustrating a link setup process in a WLAN system.

FIG. 5 is a diagram illustrating a general link setup process.

In order to establish a link with respect to a network and perform data transmission and reception, an STA discovers the network, performs authentication, establishes association and performs an authentication process for security. The link setup process may be referred to as a session initiation process or a session setup process. In addition, discovery, authentication, association and security setup of the link setup process may be collectively referred to as an association process.

An exemplary link setup process will be described with reference to FIG. 5.

In step S510, the STA may perform a network discovery operation. The network discovery operation may include a scanning operation of the STA. That is, the STA discovers the network in order to access the network. The STA should identify a compatible network before participating in a wireless network and a process of identifying a network present in a specific area is referred to as scanning. The scanning method includes an active scanning method and a passive scanning method.

In FIG. 5, a network discovery operation including an active scanning process is shown. In active scanning, the STA which performs scanning transmits a probe request frame while moving between channels and waits for a response thereto, in order to detect which AP is present. A responder transmits a probe response frame to the STA, which transmitted the probe request frame, as a response to the probe request frame. The responder may be an STA which lastly transmitted a beacon frame in a BSS of a scanned channel. In the BSS, since the AP transmits the beacon frame, the AP is the responder. In the IBSS, since the STAs in the IBSS alternately transmit the beacon frame, the responder is not fixed. For example, the STA which transmits the probe request frame on a first channel and receives the probe response frame on the first channel stores BSS related information included in the received probe response frame, moves to a next channel (e.g., a second channel) and performs scanning (probe request/response transmission/reception on the second channel) using the same method.

Although not shown in FIG. 5, a scanning operation may be performed using a passive scanning method. In passive scanning, the STA which performs scanning waits for a beacon frame while moving between channels. The beacon frame is a management frame in IEEE 802.11 and is periodically transmitted in order to indicate presence of a wireless network and to enable the STA, which performs scanning, to discover and participate in the wireless network. In the BSS, the AP is responsible for periodically transmitting the beacon frame. In the IBSS, the STAs alternately transmit the beacon frame. The STA which performs scanning receives the beacon frame, stores information about the BSS included in the beacon frame, and records beacon frame information of each channel while moving to another channel. The STA which receives the beacon frame may store BSS related information included in the received beacon frame, move to a next channel and perform scanning on the next channel using the same method.

Active scanning has delay and power consumption less than those of passive scanning.

After the STA has discovered the network, an authentication process may be performed in step S520. Such an authentication process may be referred to as a first authentication process to be distinguished from a security setup operation of step S540.

The authentication process includes a process of, at the STA, transmitting an authentication request frame to the AP and, at the AP, transmitting an authentication response frame to the STA in response thereto. The authentication frame used for authentication request/response corresponds to a management frame.

The authentication frame may include information about an authentication algorithm number, an authentication transaction sequence number, a status code, a challenge text, a robust security network (RSN), a finite cyclic group, etc. The information may be examples of information included in the authentication request/response frame and may be replaced with other information. The information may further include additional information.

The STA may transmit the authentication request frame to the AP. The AP may determine whether authentication of the STA is allowed, based on the information included in the received authentication request frame. The AP may provide the STA with the authentication result via the authentication response frame.

After the STA is successfully authenticated, an association process may be performed in step S530. The association process includes a process of, at the STA, transmitting an association request frame to the AP and, at the AP, transmitting an association response frame to the STA in response thereto.

For example, the association request frame may include information about various capabilities, beacon listen interval, service set identifier (SSID), supported rates, RSN, mobility domain, supported operating classes, traffic indication map (TIM) broadcast request, interworking service capability, etc.

For example, the association response frame may include information about various capabilities, status code, association ID (AID), supported rates, enhanced distributed channel access (EDCA) parameter set, received channel power indicator (RCPI), received signal to noise indicator (RSNI), mobility domain, timeout interval (association comeback time), overlapping BSS scan parameter, TIM broadcast response, QoS map, etc.

This information is purely exemplary information included in the association request/response frame and may be replaced with other information. This information may further include additional information.

After the STA is successfully authenticated, a security setup process may be performed in step S540. The security setup process of step S540 may be referred to as an authentication process through a robust security network association (RSNA) request/response. The authentication process of step S520 may be referred to as the first authentication process and the security setup process of step S540 may be simply referred to as an authentication process.

The security setup process of step S540 may include a private key setup process through 4-way handshaking of an extensible authentication protocol over LAN (EAPOL) frame. In addition, the security setup process may be performed according to a security method which is not defined in the IEEE 802.11 standard.

2.1 Evolution of WLAN

As a technical standard recently established in order to overcome limitations in communication speed in a WLAN, IEEE 802.11n has been devised. IEEE 802.11n aims at increasing network speed and reliability and extending wireless network distance. More specifically, IEEE 802.11n is based on multiple input and multiple output (MIMO) technology using multiple antennas in a transmitter and a receiver in order to support high throughput (HT) with a maximum data rate of 540 Mbps or more, to minimize transmission errors, and to optimize data rate.

As WLANs have come into widespread use and applications using the same have been diversified, recently, there is a need for a new WLAN system supporting throughput higher than a data rate supported by IEEE 802.11n. A next-generation WLAN system supporting very high throughput (VHT) is a next version (e.g., IEEE 802.11ac) of the IEEE 802.11n WLAN system and is an IEEE 802.11 WLAN system newly proposed in order to support a data rate of 1 Gbps or more at a MAC service access point (SAP).

The next-generation WLAN system supports a multi-user MIMO (MU-MIMO) transmission scheme by which a plurality of STAs simultaneously accesses a channel in order to efficiently use a radio channel. According to the MU-MIMO transmission scheme, the AP may simultaneously transmit packets to one or more MIMO-paired STAs.

In addition, support of a WLAN system operation in a whitespace is being discussed. For example, introduction of a WLAN system in a TV whitespace (WS) such as a frequency band (e.g., 54 to 698 MHz) in an idle state due to digitalization of analog TVs is being discussed as the IEEE 802.11af standard. However, this is only exemplary and the whitespace may be incumbently used by a licensed user. The licensed user means a user who is allowed to use a licensed band and may be referred to as a licensed device, a primary user or an incumbent user.

For example, the AP and/or the STA which operate in the WS should provide a protection function to the licensed user. For example, if a licensed user such as a microphone already uses a specific WS channel which is a frequency band divided on regulation such that a WS band has a specific bandwidth, the AP and/or the STA cannot use the frequency band corresponding to the WS channel in order to protect the licensed user. In addition, the AP and/or the STA must stop use of the frequency band if the licensed user uses the frequency band used for transmission and/or reception of a current frame.

Accordingly, the AP and/or the STA should perform a procedure of determining whether a specific frequency band in a WS band is available, that is, whether a licensed user uses the frequency band. Determining whether a licensed user uses a specific frequency band is referred to as spectrum sensing. As a spectrum sensing mechanism, an energy detection method, a signature detection method, etc. may be used. It may be determined that the licensed user uses the frequency band if received signal strength is equal to or greater than a predetermined value or if a DTV preamble is detected.

In addition, as next-generation communication technology, machine-to-machine (M2M) communication technology is being discussed. Even in an IEEE 802.11 WLAN system, a technical standard supporting M2M communication has been developed as IEEE 802.11ah. M2M communication means a communication scheme including one or more machines and may be referred to as machine type communication (MTC). Here, a machine means an entity which does not require direct operation or intervention of a person. For example, a device including a mobile communication module, such as a meter or a vending machine, may include a user equipment such as a smart phone which is capable of automatically accessing a network without operation/intervention of a user to perform communication. M2M communication includes communication between devices (e.g., device-to-device (D2D) communication) and communication between a device and an application server. Examples of communication between a device and a server include communication between a vending machine and a server, communication between a point of sale (POS) device and a server and communication between an electric meter, a gas meter or a water meter and a server. An M2M communication based application may include security, transportation, health care, etc. If the characteristics of such examples are considered, in general, M2M communication should support transmission and reception of a small amount of data at a low rate in an environment in which very many apparatuses are present.

More specifically, M2M communication should support a larger number of STAs. In a currently defined WLAN system, it is assumed that a maximum of 2007 STAs is associated with one AP. However, in M2M communication, methods supporting the case in which a larger number of STAs (about 6000) are associated with one AP are being discussed. In addition, in M2M communication, it is estimated that there are many applications supporting/requiring a low transfer rate. In order to appropriately support the low transfer rate, for example, in a WLAN system, the STA may recognize presence of data to be transmitted thereto based on a traffic indication map (TIM) element and methods of reducing a bitmap size of the TIM are being discussed. In addition, in M2M communication, it is estimated that there is traffic having a very long transmission/reception interval. For example, in electricity/gas/water consumption, a very small amount of data is required to be exchanged at a long period (e.g., one month). In a WLAN system, although the number of STAs associated with one AP is increased, methods of efficiently supporting the case in which the number of STAs, in which a data frame to be received from the AP is present during one beacon period, is very small are being discussed.

WLAN technology has rapidly evolved. In addition to the above-described examples, technology for direct link setup, improvement of media streaming performance, support of fast and/or large-scale initial session setup, support of extended bandwidth and operating frequency, etc. is being developed.

2.2 Medium Access Mechanism

In a WLAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception AP and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

Figure 6:
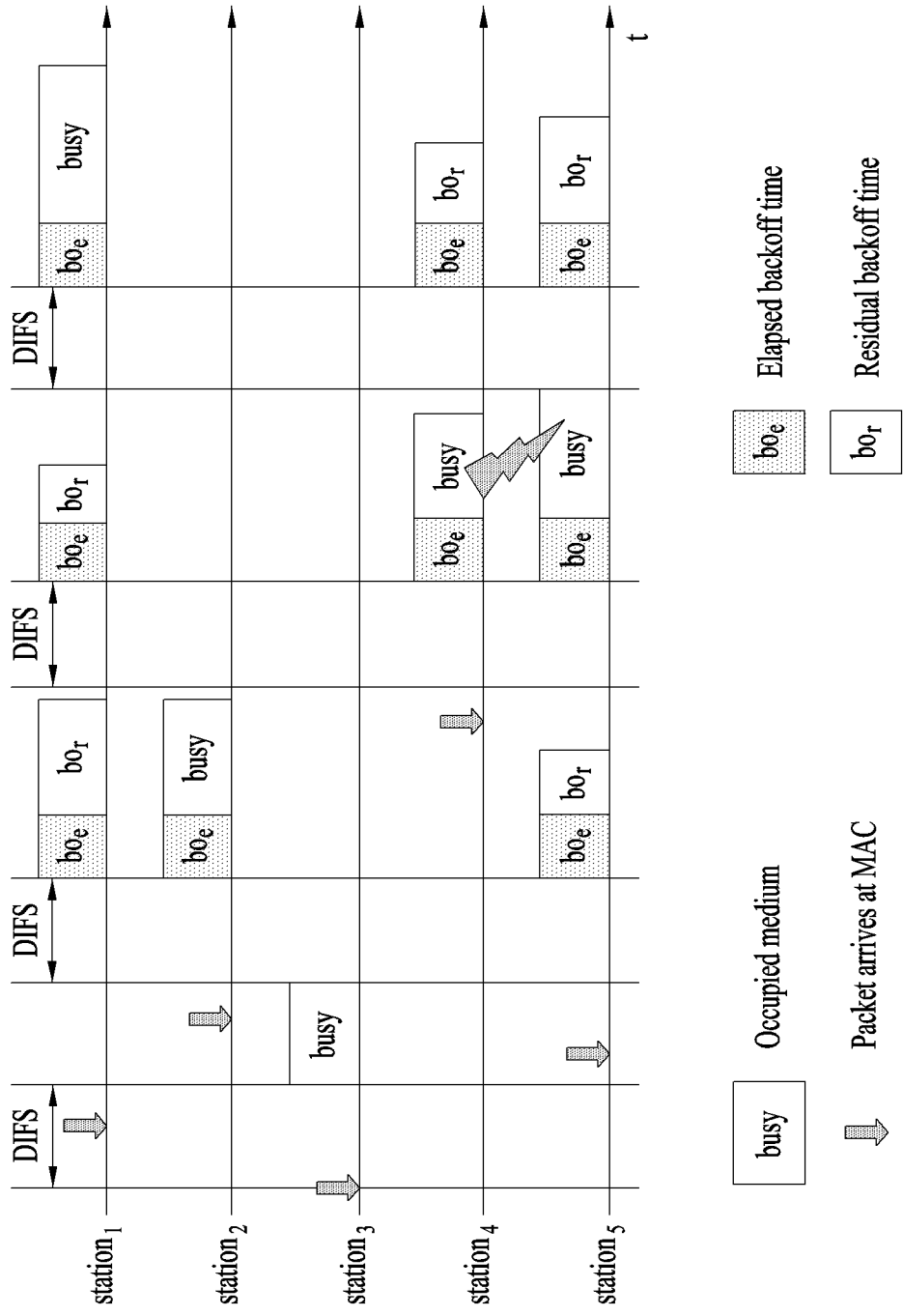
FIG. 6 is a diagram illustrating a backoff process.

FIG. 6 is a diagram illustrating a backoff process.

Operation based on a random backoff period will be described with reference to FIG. 6. If a medium is changed from an occupied or busy state to an idle state, several STAs may attempt data (or frame) transmission. At this time, a method of minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to 2n−1 (n=0, 1, 2, . . . ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 6, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values.

In the example of FIG. 6, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state again, STA1 and STA5 wait for the DIFS and then resume countdown. That is, after the residual backoff slots corresponding to the residual backoff time are counted down, frame transmission may start. Since the residual backoff time of STA5 is less than of STA1, STA5 starts frame transmission.

If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 6, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

2.3 Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a WLAN may use a network allocation vector (NAV). The NAV refers to a value of a time until a medium becomes available, which is indicated to another AP and/or STA by an AP and/or an STA, which is currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 7 and 8. Although a transmission range may not be equal to an actual carrier sensing range, for convenience, assume that the transmission range may be equal to the actual carrier sensing range.

Figure 7:
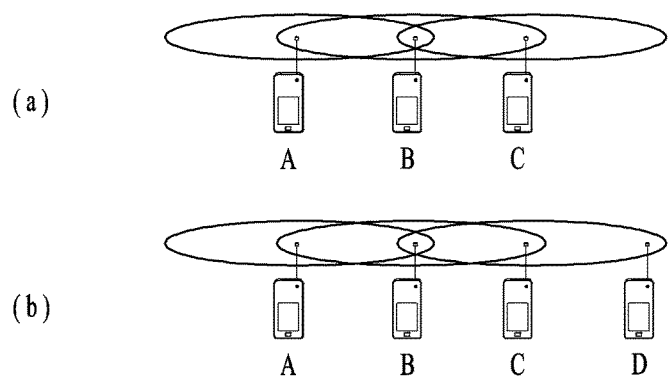
FIG. 7 is a diagram illustrating a hidden node and an exposed node.

FIG. 7 is a diagram illustrating a hidden node and an exposed node.

FIG. 7(*a*) shows a hidden node, and, in this case, an STA A and an STA B are performing communication and an STA C has information to be transmitted. More specifically, although the STA A transmits information to the STA B, the STA C may determine that the medium is in the idle state, when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be the hidden node of the STA C.

FIG. 7(b) shows an exposed node and, in this case, the STA B transmits data to the STA A and the STA C has information to be transmitted to the STA D. In this case, if the STA C performs carrier sensing, it may be determined that the medium is busy due to transmission of the STA B. If the STA C has information to be transmitted to the STA D, since it is sensed that the medium is busy, the STA C waits until the medium enters the idle state. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be the exposed node of the STA B.

Figure 8:
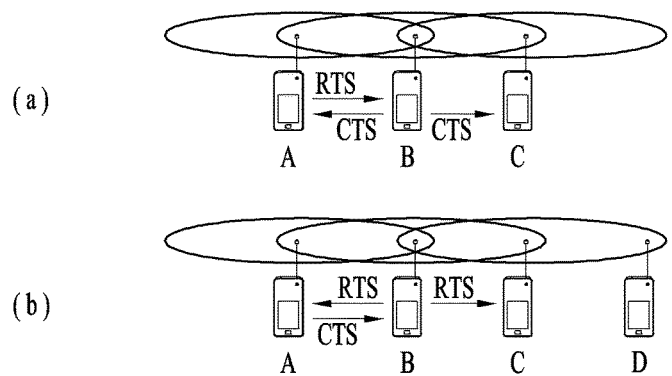
FIG. 8 is a diagram illustrating request to send (RTS) and clear to send (CTS)

FIG. 8 is a diagram illustrating request to send (RTS) and clear to send (CTS).

In the example of FIG. 7, in order to efficiently use a collision avoidance mechanism, short signaling packet such as RTS and CTS may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 8(a) shows a method of solving a hidden node problem. Assume that both the STA A and the STA C attempt to transmit data to the STA B. If the STA A transmits the RTS to the STA B, the STA B transmits the CTS to the peripheral STA A and C. As a result, the STA C waits until data transmission of the STA A and the STA B is finished, thereby avoiding collision.

FIG. 8(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS of the STA A, it can be confirmed that the STA A is outside carrier sensing of the STA C.

2.4 Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, in a WLAN system, a power management (PM) mode of the STA is supported.

The PM mode of the STA is divided into an active mode and a power save (PS) mode. The STA fundamentally operates in an active mode. The STA which operates in the active mode is maintained in an awake state. The awake state refers to a state in which normal operation such as frame transmission and reception or channel scanning is possible. The STA which operates in the PS mode operates while switching between a sleep state or an awake state. The STA which operates in the sleep state operates with minimum power and does not perform frame transmission and reception or channel scanning.

Since power consumption is reduced as the sleep state of the STA is increased, the operation period of the STA is increased. However, since frame transmission and reception is impossible in the sleep state, the STA may not unconditionally operate in the sleep state. If a frame to be transmitted from the STA, which operates in the sleep state, to the AP is present, the STA may be switched to the awake state to transmit the frame. If a frame to be transmitted from the AP to the STA is present, the STA in the sleep state may not receive the frame and may not confirm that the frame to be received is present. Accordingly, the STA needs to perform an operation for switching to the awake state according to a specific period in order to confirm presence of the frame to be transmitted thereto (to receive the frame if the frame to be transmitted is present).

Figure 9:
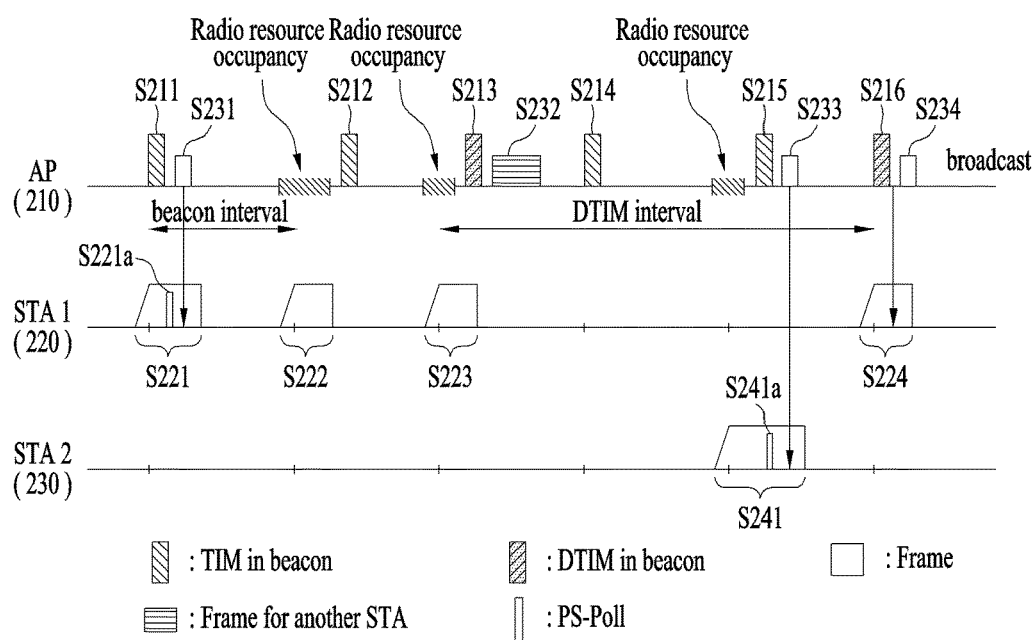
FIG. 9 is a diagram illustrating power management operation.

FIG. 9 is a diagram illustrating power management operation.

Referring to FIG. 9, an AP 210 transmits beacon frames to STAs within a BSS at a predetermined period (S211, S212, S213, S214, S215 and S216). The beacon frame includes a traffic indication map (TIM) information element. The TIM information element includes information indicating that buffered traffic for STAs associated with the AP 210 is present and the AP 210 will transmit a frame. The TIM element includes a TIM used to indicate a unicast frame or a delivery traffic indication map (DTIM) used to indicate a multicast or broadcast frame.

The AP 210 may transmit the DTIM once whenever the beacon frame is transmitted three times. An STA1 220 and an STA2 222 operate in the PS mode. The STA1 220 and the STA2 222 may be switched from the sleep state to the awake state at a predetermined wakeup interval to receive a TIM element transmitted by the AP 210. Each STA may compute a time to switch to the awake state based on a local clock thereof. In the example of FIG. 9, assume that the clock of the STA matches the clock of the AP.

For example, the predetermined awake interval may be set such that the STA1 220 is switched to the awake state every beacon interval to receive a TIM element. Accordingly, the STA1 220 may be switched to the awake state (S211) when the AP 210 first transmits the beacon frame (S211). The STA1 220 may receive the beacon frame and acquire the TIM element. If the acquired TIM element indicates that a frame to be transmitted to the STA1 220 is present, the STA1 220 may transmit, to the AP 210, a power save-Poll (PS-Poll) frame for requesting frame transmission from the AP 210 (S221a). The AP 210 may transmit the frame to the STA1 220 in correspondence with the PS-Poll frame (S231). The STA1 220 which completes frame reception is switched to the sleep state.

When the AP 210 secondly transmits the beacon frame, since another device access the medium and thus the medium is busy, the AP 210 may not transmit the beacon frame at an accurate beacon interval and may transmit the beacon frame at a delayed time (S212). In this case, the operation mode of the STA1 220 is switched to the awake state according to the beacon interval but the delayed beacon frame is not received. Therefore, the operation mode of the STA1 220 is switched to the sleep state again (S222).

When the AP 210 thirdly transmits the beacon frame, the beacon frame may include a TIM element set to a DTIM. Since the medium is busy, the AP 210 transmits the beacon frame at a delayed time (S213). The STA1 220 is switched to the awake state according to the beacon interval and may acquire the DTIM via the beacon frame transmitted by the AP 210. Assume that the DTIM acquired by the STA1 220 indicates that a frame to be transmitted to the STA1 220 is not present and a frame for another STA is present. In this case, the STA1 220 may confirm that a frame transmitted thereby is not present and may be switched to the sleep state again. The AP 210 transmits the beacon frame and then transmits the frame to the STA (S232).

The AP 210 fourthly transmits the beacon frame (S214). Since the STA1 220 cannot acquire information indicating that buffered traffic therefore is present via reception of the TIM element twice, the wakeup interval for receiving the TIM element may be controlled. Alternatively, if signaling information for controlling the wakeup interval of the STA1 220 is included in the beacon frame transmitted by the AP 210, the wakeup interval value of the STA1 220 may be controlled. In the present example, the STA1 220 may change switching of the operation state for receiving the TIM element every beacon interval to switching of the operation state every three beacon intervals. Accordingly, since the STA1 220 is maintained in the sleep state when the AP 210 transmits the fourth beacon frame (S214) and transmits the fifth beacon frame (S215), the TIM element cannot be acquired.

When the AP 210 sixthly transmits the beacon frame (S216), the STA1 220 may be switched to the awake state to acquire the TIM element included in the beacon frame (S224). Since the TIM element is a DTIM indicating that a broadcast frame is present, the STA1 220 may not transmit the PS-Poll frame to the AP 210 but may receive a broadcast frame transmitted by the AP 210 (S234). The wakeup interval set in the STA2 230 may be set to be greater than that of the STA1 220. Accordingly, the STA2 230 may be switched to the awake state to receive the TIM element (S241), when the AP 210 fifthly transmits the beacon frame (S215). The STA2 230 may confirm that a frame to be transmitted thereto is present via the TIM element and transmits the PS-Poll frame to the AP 210 (S241a) in order to request frame transmission. The AP 210 may transmit the frame to the STA2 230 in correspondence with the PS-Poll frame (S233).

For PM management shown in FIG. 9, a TIM element includes a TIM indicating whether a frame to be transmitted to an STA is present and a DTIM indicating whether a broadcast/multicast frame is present. The DTIM may be implemented by setting a field of the TIM element.

Figure 10:
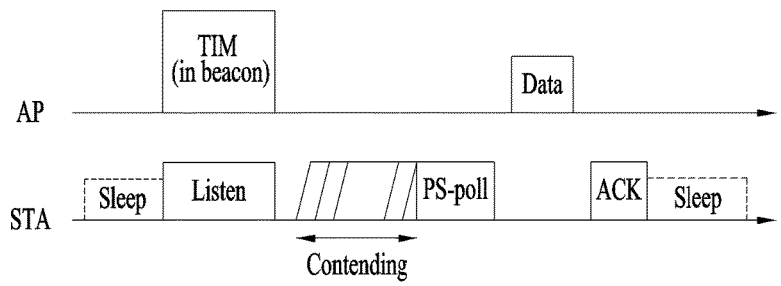
FIGS. 10 to 12 are diagrams illustrating operation of a station (STA) which receives a traffic indication map (TIM)
Figure 11:
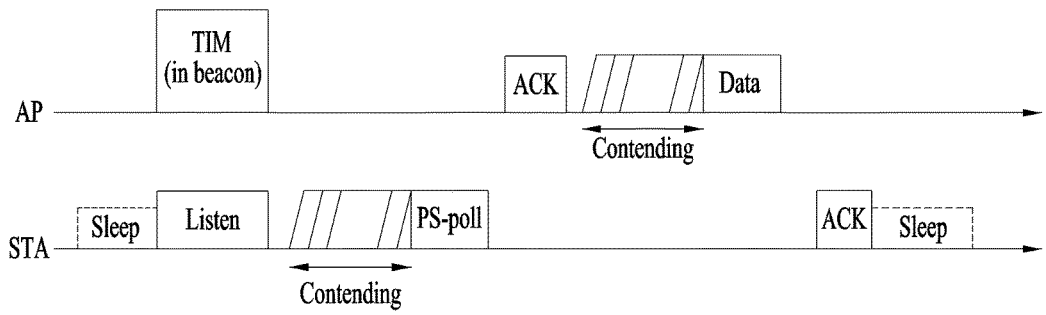
Figure 12:
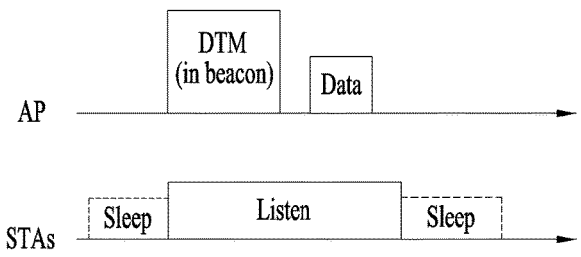

FIGS. 10 to 12 are diagrams illustrating operation of a station (STA) which receives a traffic indication map (TIM).

Referring to FIG. 10, an STA may be switched from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which receives the PS-Poll frame transmitted by the STA may transmit the frame to the STA. The STA may receive the data frame and transmit an ACK frame to the AP. Thereafter, the STA may be switched to the sleep state again.

As shown in FIG. 10, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 11.

In the example of FIG. 11, operation for switching the STA from the sleep state to the awake state, receiving a TIM from the AP, contending and transmitting a PS-Poll frame to the AP is equal to that of FIG. 10. If the data frame is not prepared during the SIFS even when the AP receives the PS-Poll frame, the data frame is not transmitted but an ACK frame may be transmitted to the STA. If the data frame is prepared after transmitting the ACK frame, the AP may contend and transmit the data frame to the STA. The STA may transmit the ACK frame indicating that the data frame has been successfully received to the AP and may be switched to the sleep state.

FIG. 12 shows an example in which the AP transmits the DTIM. The STAs may be switched from the sleep state to the awake state in order to receive the beacon frame including the DTIM element from the AP. The STA may confirm that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may be switched to the sleep state again after completing data reception.

2.5 TIM Structure

In the PM mode management method based on the TIM (or DTIM) protocol described with reference to FIGS. 9 to 12, the STAs may confirm whether a data frame to be transmitted thereto is present via STA identification included in the TIM element. The STA identification may be related to an association identifier (AID) assigned to the STA upon association with the AP.

The AID is used as a unique identifier for each STA within one BSS. For example, in a current WLAN system, the AID may be one of values of 1 to 2007. In a currently defined WLAN system, 14 bits are assigned to the AID in a frame transmitted by the AP and/or the STA. Although up to 16383 may be assigned as the AID value, 2008 to 16383 may be reserved.

The TIM element according to an existing definition is not appropriately applied to an M2M application in which a large number (e.g., more than 2007) of STAs is associated with one AP. If the existing TIM structure extends without change, the size of the TIM bitmap is too large to be supported in an existing frame format and to be suitable for M2M communication considering an application with a low transfer rate. In addition, in M2M communication, it is predicted that the number of STAs, in which a reception data frame is present during one beacon period, is very small. Accordingly, in M2M communication, since the size of the TIM bitmap is increased but most bits have a value of 0, there is a need for technology for efficiently compressing the bitmap.

As an existing bitmap compression technology, a method of omitting 0 which continuously appears at a front part of a bitmap and defining an offset (or a start point) is provided. However, if the number of STAs in which a buffered frame is present is small but a difference between the AID values of the STAs is large, compression efficiency is bad. For example, if only frames to be transmitted to only two STAs respectively having AID values of 10 and 2000 are buffered, the length of the compressed bitmap is 1990 but all bits other than both ends have a value of 0. If the number of STAs which may be associated with one AP is small, bitmap compression inefficiency is not problematic but, if the number of STAs is increased, bitmap compression inefficiency deteriorates overall system performance.

As a method of solving this problem, AIDs may be divided into several groups to more efficiently perform data transmission. A specific group ID (GID) is assigned to each group. AIDs assigned based on the group will be described with reference to FIG. 13.

FIG. 13(a) shows an example of AIDs assigned based on a group. In the example of FIG. 13(a), several bits of a front part of the AID bitmap may be used to indicate the GID. For example, four DIDs may be expressed by the first two bits of the AID of the AID bitmap. If the total length of the AID bitmap is N bits, the first two bits (B1 and B2) indicate the GID of the AID.

FIG. 13(a) shows another example of AIDs assigned based on a group. In the example of FIG. 13(b), the GID may be assigned according to the location of the AID. At this time, the AIDs using the same GID may be expressed by an offset and a length value. For example, if GID 1 is expressed by an offset A and a length B, this means that AIDs of A to A+B−1 on the bitmap have GID 1. For example, in the example of FIG. 13(b), assume that all AIDs of 1 to N4 are divided into four groups. In this case, AIDs belonging to GID 1 are 1 to N1 and may be expressed by an offset 1 and a length N1. AIDS belonging to GID2 may be expressed by an offset N1+1 and a length N2−N1+1, AIDs belonging to GID 3 may be expressed by an offset N2+1 and a length N3−N2+1. and AIDs belonging to GID 4 may be expressed by an offset N3+1 and a length N4−N3+1.

If the AIDs assigned based on the group are introduced, channel access is allowed at a time interval which is changed according to the GID to solve lack of TIM elements for a large number of STAs and to efficiently perform data transmission and reception. For example, only channel access of STA(s) corresponding to a specific group may be granted during a specific time interval and channel access of the remaining STA(s) may be restricted. A predetermined time interval at which only access of specific STA(s) is granted may also be referred to as a restricted access window (RAW).

Channel access according to GID will be described with reference to FIG. 13(c). FIG. 13(c) shows a channel access mechanism according to a beacon interval if the AIDs are divided into three groups. At a first beacon interval (or a first RAW), channel access of STAs belonging to GID 1 is granted but channel access of STAs belonging to other GIDs is not granted. For such implementation, the first beacon includes a TIM element for AIDs corresponding to GID 1. A second beacon frame includes a TIM element for AIDs corresponding to GID 2 and thus only channel access of the STAs corresponding to the AIDs belonging to GID 2 is granted during the second beacon interval (or the second RAW). A third beacon frame includes a TIM element for AIDs corresponding to GID 3 and thus only channel access of the STAs corresponding to the AIDs belonging to GID 3 is granted during the third beacon interval (or the third RAW). A fourth beacon frame includes a TIM element for AIDs corresponding to GID 1 and thus only channel access of the STAs corresponding to the AIDs belonging to GID 1 is granted during the fourth beacon interval (or the fourth RAW). Only channel access of the STAs corresponding to a specific group indicated by the TIM included in the beacon frame may be granted even in fifth and subsequent beacon intervals (or fifth and subsequent RAWs).

Although the order of GIDs allowed according to the beacon interval is cyclic or periodic in FIG. 13(c), the present invention is not limited thereto. That is, by including only AID(s) belonging to specific GID(s) in the TIM elements, only channel access of STA(s) corresponding to the specific AID(s) may be granted during a specific time interval (e.g., a specific RAW) and channel access of the remaining STA(s) may not be granted.

Figure 13:
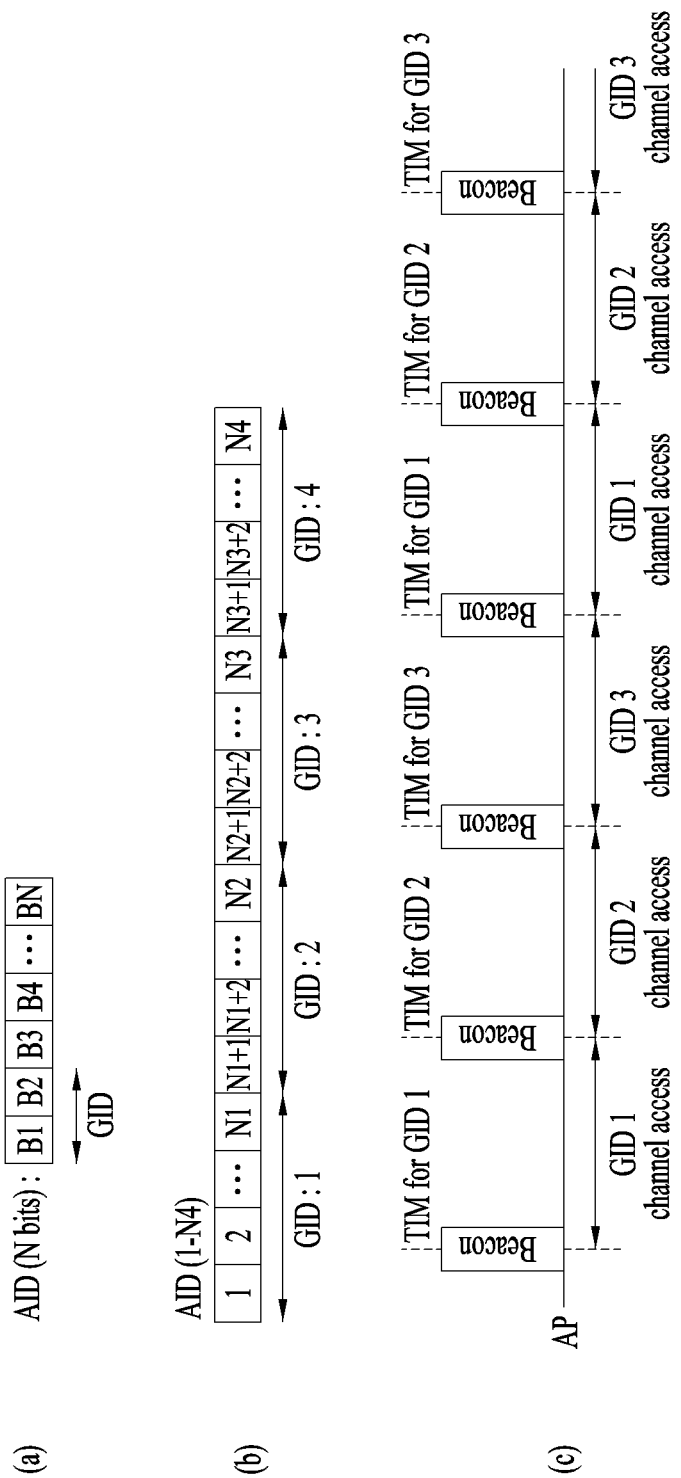
FIG. 13 is a diagram illustrating a group based association identifier (AID)

The above-described group based AID assignment method may also be referred to as a hierarchical structure of a TIM. That is, an entire AID space may be divided into a plurality of blocks and only channel access of STA(s) corresponding to a specific block having a non-zero value (that is, STAs of a specific group) may be granted. A TIM having a large size is divided into small blocks/groups such that the STA easily maintains TIM information and easily manages blocks/groups according to class, QoS or usage of the STA. Although a 2-level layer is shown in the example of FIG. 13, a TIM of a hierarchical structure having two or more levels may be constructed. For example, the entire AID space may be divided into a plurality of page groups, each page group may be divided into a plurality of blocks, and each block may be divided into a plurality of sub-blocks. In this case, as an extension of the example of FIG. 13(a), the first N1 bits of the AID bitmap indicate a paging ID (that is, a PID), the next N2 bits indicate a block ID, the next N3 bits indicate a sub-block ID, and the remaining bits indicate the STA bit location in the sub-block.

In the following examples of the present invention, various methods of dividing and managing STAs (or AIDs assigned to the STAs) on a predetermined hierarchical group basis are applied and the group based AID assignment method is not limited to the above examples.

2.6 Improved Channel Access Method

If AIDs are assigned/managed based on a group, STAs belonging to a specific group may use a channel only at a "group channel access interval (or RAW)" assigned to the group. If an STA supports an M2M application, traffic for the STA may have a property which may be generated at a long period (e.g., several tens of minutes or several hours). Since such an STA does not need to be in the awake state frequently, the STA may be in the sleep mode for g a long period of time and be occasionally switched to the awake state (that is, the awake interval of the STA may be set to be long). An STA having a long wakeup interval may be referred to as an STA which operates in a "long-sleeper" or "long-sleep" mode. The case in which the wakeup interval is set to be long is not limited to M2M communication and the wakeup interval may be set to be long according to the state of the STA or surroundings of the STA even in normal WLAN operation.

If the wakeup interval is set, the STA may determine whether a local clock thereof exceeds the wakeup interval. However, since the local clock of the STA generally uses a cheap oscillator, an error probability is high. In addition, if the STA operates in long-sleep mode, the error may be increased with time. Accordingly, time synchronization of the STA which occasionally wakes up may not match time synchronization of the AP. For example, although the STA computes when the STA may receive the beacon frame to be switched to the awake state, the STA may not actually receive the beacon frame from the AP at that timing. That is, due to clock drift, the STA may miss the beacon frame and such a problem may frequently occur if the STA operates in the long sleep mode.

Figure 14:
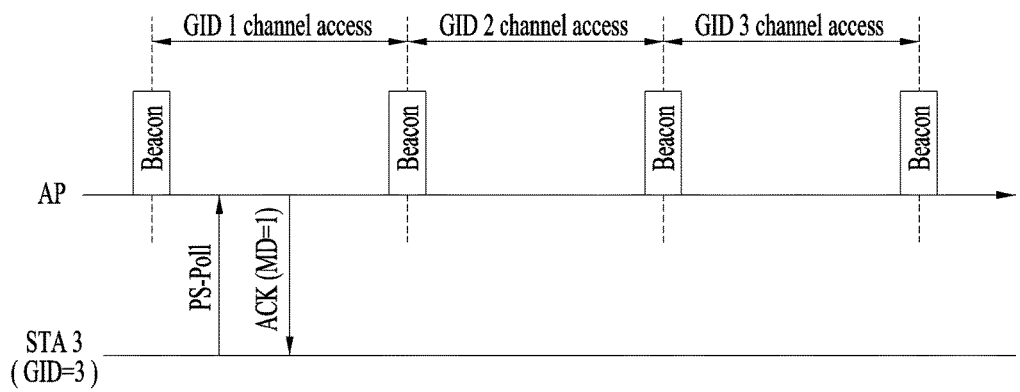
FIGS. 14 to 16 are diagrams showing examples of operation of an STA if a group channel access interval is set.
Figure 15:
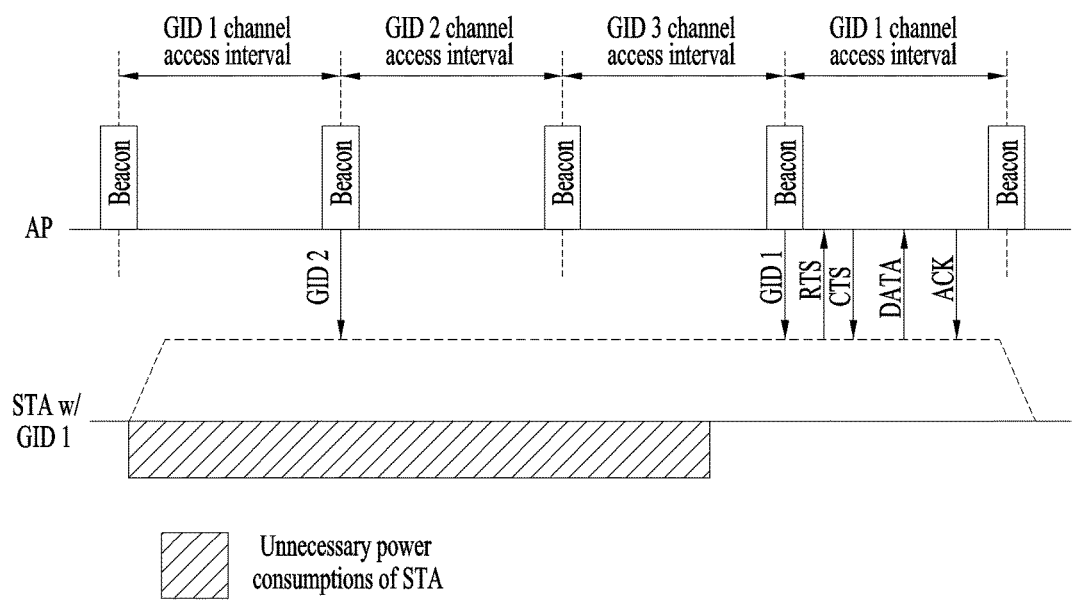
Figure 16:
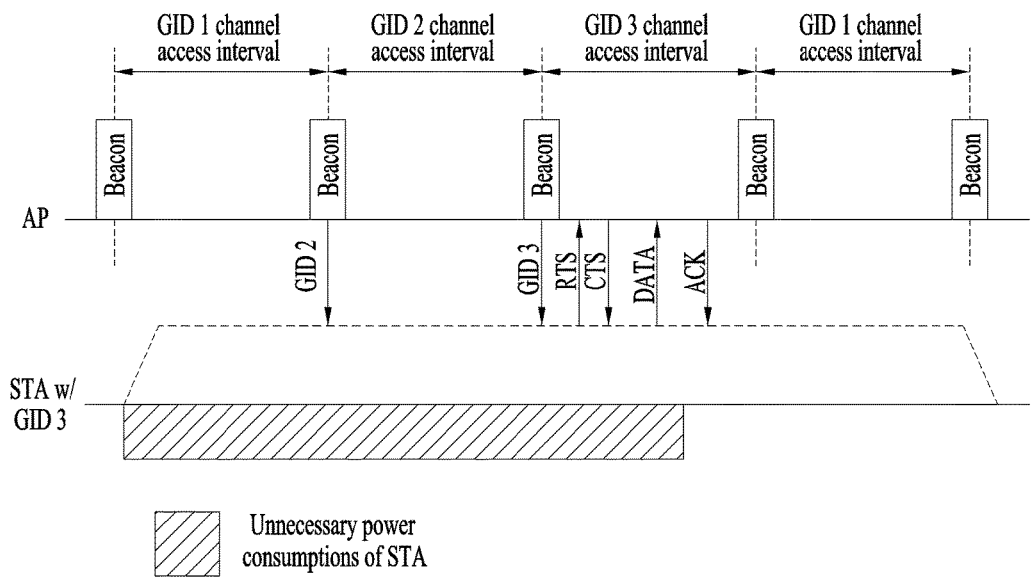

FIGS. 14 to 16 are diagrams showing examples of operation of an STA if a group channel access interval is set.

In the example of FIG. 14, STA3 may belong to group 3 (that is, GID=3), wake up at a channel access interval assigned to group 1 and perform PS-Poll for requesting frame transmission from the AP. The AP which receives PS-Poll from the STA transmits an ACK frame to STA3. If buffered data to be transmitted to STA3 is present, the AP may provide information indicating that data to be transmitted is present via the ACK frame. For example, the value of a "More Data" field (or an MD field) having a size of 1 bit included in the ACK frame may be set to 1 (that is, MD=1) to indicate the above information.

Since a time when STA3 transmits PS-Poll belongs to the channel access interval for group 1, even if data to be transmitted to STA3 is present, the AP does not immediately transmit data after transmitting the ACK frame but transmits data to STA3 at a channel access interval (GID 3 channel access of FIG. 14) assigned to group 3 to which STA3 belongs.

Since STA3 receives the ACK frame set to MD=1 from the AP, STA3 continuously waits for transmission of data from the AP. That is, in the example of FIG. 14, since STA3 cannot receive the beacon frame immediately after waking up, STA3 transmits PS-Poll to the AP on the assumption that a time when STA3 wakes up corresponds to the channel access interval assigned to the group, to which STA3 belongs, according to computation based on the local clock thereof and data to be transmitted thereto is present. Alternatively, since STA3 operates in the long-sleep mode, on the assumption that time synchronization is not performed, if the data to be transmitted thereto is present, STA3 may transmit PS-Poll to the AP in order to receive the data. Since the ACK frame received by STA3 from the AP indicates that data to be transmitted to STA3 is present, STA3 continuously waits for data reception under the assumption of the interval in which channel access thereof is granted. STA3 unnecessarily consumes power even when data reception is not allowed, until time synchronization is appropriately performed from information included in a next beacon frame.

In particular, if STA3 operates in the long-sleep mode, the beacon frame may frequently not be received, CCA may be performed even at the channel access interval, to which STA2 does not belong, thereby causing unnecessary power consumption.

Next, in the example of FIG. 15, the beacon frame is missed when the STA having GID 1 (that is, belonging to group 1) wakes up. That is, the STA which does not receive the beacon frame including the GID (or PID) assigned thereto is continuously in the awake state until the beacon frame including the GID (or PID) thereof is received. That is, although the STA wakes up at channel access interval assigned thereto, the STA cannot confirm whether the GID (or PID) thereof is included in the TIM transmitted via the beacon frame and thus cannot confirm whether the timing corresponds to the channel access interval assigned to the group thereof.

In the example of FIG. 15, the STA which is switched from the sleep state to the awake state is continuously in the awake state until the fourth beacon frame including the GID (that is, GID 1) thereof is received after the first beacon frame has been missed, thereby causing unnecessary power consumption. As a result, after unnecessary power consumption, the STA may receive the beacon frame including GID 1 and then may perform RTS transmission, CTS reception, data frame transmission and ACK reception.

FIG. 16 shows the case in which an STA wakes up at a channel access interval for another group. For example, the STA having GID 3 may wake up at the channel access interval for GID 1. That is, the STA having GID 3 unnecessarily consumes power until the beacon frame having the GID thereof is received after waking up. If a TIM indicating GID 3 is received via a third beacon frame, the STA may recognize the channel access interval for the group thereof and perform data transmission and ACK reception after CCA through RTS and CTS.

3. Proposed Sequence Generation Method

In the conventional WiFi standards, sequences are defined respectively for a short training filed (STF) and a long training filed (LTF). In particular, different STF and LTF sequences are defined for individual bandwidths of 20, 40, and 80 MHz. In addition, a phase rotation factor, which is applied to the STF and LTF sequences when a bandwidth is extended, is defined to have a different value for individual bandwidths of 20, 40, and 80 MHz.

As interest in future Wi-Fi and demand for improvement of throughput and QoE (quality of experience) after 802.11ac increase, it is necessary to define a new frame format for future WLAN systems. The most important part in a new frame format is a preamble part because design of a preamble used for synchronization, channel tracking, channel estimation, adaptive gain control (AGC) and the like may directly affect system performance.

In the future Wi-Fi system in which a large number of APs and STAs simultaneously access and attempt data transmission and reception, system performance may be limited when legacy preamble design is employed. That is, if each preamble block (e.g., a short training field (STF) in charge of AGC, CFO estimation/compensation, timing control and the like or a long training field (LTF) in charge of channel estimation/compensation, residual CFO compensation and the like) executes only the function thereof defined in the legacy preamble structure, frame length increases, causing overhead. Accordingly, if a specific preamble block can support various functions in addition to the function designated therefore, an efficient frame structure can be designed.

Furthermore, since the future Wi-Fi system considers data transmission in outdoor environments as well as indoor environments, the preamble structure may need to be designed differently depending on environments. Although design of a unified preamble format independent of environment variation can aid in system implementation and operation, of course, it is desirable that preamble design be adapted to system environment.

Preamble design for efficiently supporting various functions is described hereinafter. For convenience, a new WLAN system is referred to as an HE (High Efficiency) system and a frame and a PPDU (PLCP (Physical Layer Convergence Procedure) Protocol Data Unit) of the HE system are respectively referred to as an HE frame and an HE PPDU. However, it is obvious to those skilled in the art that the proposed preamble is applicable to other WLAN systems and cellular systems in addition to the HE system.

The following table 1 shows OFDM numerology which is a premise of a pilot sequence transmission method described below. Table 1 shows an example of new OFDM numerology proposed in the HE system and numerals and items shown in Table 1 are merely examples and other values may be applied. Table 1 is based on the assumption that FFT having a size four times the legacy one is applied to a given BW and 3 DCs are used per BW.

TABLE 1

| Parameter | CBW20 | CBW40 | CBW80 | CBW80 + 80 | CBW160 | Description |
|---|---|---|---|---|---|---|
| $N_{FFT}$ | 256 | 512 | 1024 | 1024 | 2048 | FFT size |
| $N_{SD}$ | 238 | 492 | 1002 | 1002 | 2004 | Number of complex data numbers per frequency segment |
| $N_{SP}$ | 4 | 6 | 8 | 8 | 16 | Number of pilot values per frequency segment |
| $N_{ST}$ | 242 | 498 | 1010 | 1010 | 2020 | Total number of subcarriers per frequency segment. See NOTE. |
| $N_{SR}$ | 122 | 250 | 506 | 506 | 1018 | Highest data subcarrier index per frequency segment |
| $N_{Seg}$ | 1 | 1 | 1 | 2 | 1 | Number of frequency segments |
| $\Delta_F$ | | | 312.5 kHz | | | Subcarrier frequency Spacing for non-HE portion |
| $\Delta_{F\_HE}$ | | | 78.125 kHz | | | Subcarrier frequency Spacing for HE portion |
| $T_{DFT}$ | | | 3.2 μs | | | IDFT/DFT period for non-HE portion |
| $T_{DFT\_HE}$ | | | 12.8 μs | | | IDFT/DFT period for HE portion |
| $T_{GI}$ | | | 0.8 μs = $T_{DFT}$/4 | | | Guard interval duration for non-HE portion |
| $T_{GI\_HE}$ | | | 3.2 μs = $T_{DFT\_HE}$/4 | | | Guard interval duration for HE portion |
| $T_{GI2}$ | | | 1.6 μs | | | Double guard interval for non-HE portion |
| $T_{GIS\_HE}$ | | | 0.8 μs = $T_{DFT\_HE}$/16 [Alternative: 0.4 μs (1/32 CP)] | | | Short guard interval Duration (used only for HE data) |
| $T_{SYML}$ | | | 4 μs = $T_{DFT}$ + $T_{GI}$ | | | Long GI symbol interval for non-HE portion |
| $T_{SYML\_HE}$ | | | 16 μs = $T_{DFT\_HE}$ + $T_{GI\_HE}$ | | | Long GI symbol interval for HE portion |
| $T_{SYMS\_HE}$ | | | 13.6 μs = $T_{DFT\_HE}$ + $T_{GIS\_HE}$ [Alternative: 13.2 μs (with 1/32 CP)] | | | Short GI symbol interval (used only for HE data) |
| $T_{SYM}$ | | | $T_{SYML}$ or $T_{SYMS}$ depending on the GI used | | | Symbol interval for non-HE portion |
| $T_{SYM\_HE}$ | | | $T_{SYML\_HE}$ or $T_{SYMS\_HE}$ depending on the GI used | | | Symbol interval for HE portion |
| $T_{L-STF}$ | | | 8 μs = 10 * $T_{DFT}$/4 | | | Non-HE Short Training field duration |
| $T_{L-LTF}$ | | | 8 μs = 2 × $T_{DFT}$ + $T_{GI2}$ | | | Non-HE Long Training field duration |
| $T_{L-SIG}$ | | | 4 μs = $T_{SYML}$ | | | Non-HE SIGNAL field duration |
| $T_{HE-SIGA}$ | | | 12.8 μs = 2($T_{SYML}$ + 3$T_{GI}$) in HE-PPDU format-1 or $T_{SYML\_HE}$ in HE-PPDU format-2 and HE-PPDU format-3 | | | HE Signal A field duration |
| $T_{HE-STF}$ | | | $T_{SYML\_HE}$ | | | HE Short Training field duration |
| $T_{HE-LTF}$ | | | $T_{SYML\_HE}$ | | | Duration of each HE LTF symbol |
| $T_{HE-SIGB}$ | | | $T_{SYML\_HE}$ | | | HE Signal B field duration |

TABLE 1-continued

| Parameter | CBW20 | CBW40 | CBW80 | CBW80 + 80 | CBW160 | Description |
|---|---|---|---|---|---|---|
| $N_{service}$ | | | 16 | | | Number of bits in the SERVICE field |
| $N_{tail}$ | | | 6 | | | Number of tail bits per BCC encoder |

NOTE—
$N_{ST} = N_{SD} + N_{SP}$

Figure 17:
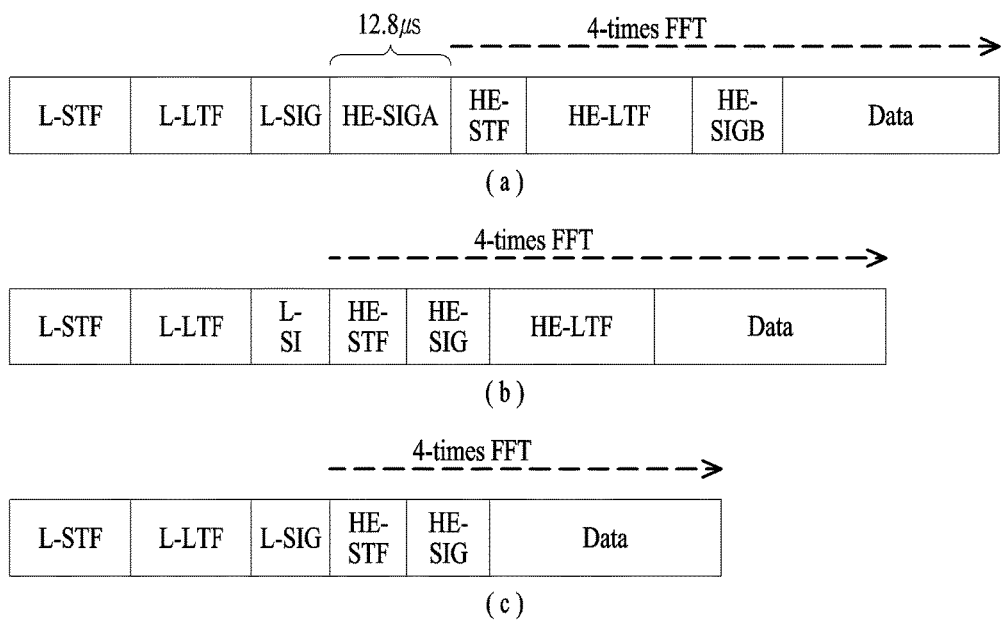
FIG. 17 is a diagram illustrating a frame structure according to the present invention.

FIG. 17 is a diagram illustrating frame structures related to an embodiment of the present invention. As illustrated in FIGS. 17(a), 17(b) and 17(c), various frame structures can be configured, and a proposed pilot sequence transmission method is related to an HE-STF (High Efficiency Short Training Field) in a preamble in a frame structure.

Hereinafter, a new sequence obtained by improving the preamble design as described above will be described. In addition, a corresponding sequence generation method will also be explained.

First, preconditions for the proposed sequence generation method are described. In the following description, $0_5$ means five consecutive 0s, $0_7$ means seven consecutive 0s, and $0_{12}$ means twelve consecutive 0s. In addition, $C_{52}$ means a vector with size of 52 and it can be defined as shown in Equation 1.

Equation 1

$$C_{52} = \sqrt{1/2}\{0, 0, 0, c1, 0, 0, 0, c2, \ldots, c12\} \quad \text{[Equation 1]}$$

There are four null tones including DC components in the center of 52 components included in $C_{52}$. $C_{52}$ are composed of twelve coefficient values (i.e., c1, c2, ..., c12), thirty-six (=12*3) "0" values, and four null tones, and that is, $C_{52}$ includes a total of the 52 components. In addition, the STF sequence for the 20 MHz bandwidth used in the legacy VHT system can be reused for the twelve coefficient values c1 to c12.

Hereinafter, sequences for 20, 40, and 80 MHz bandwidths are described in detail based on the above vector $C_{52}$.

First, assuming a system where a 256 FFT size is applied, the sequence for the 20 MHz bandwidth is defined. The sequence for the 20 MHz bandwidth can be defined as shown in Equation 2.

Equation 2

$$0_5 C_{52} 0_{12} C_{52} 0_{12} C_{52} 0_{12} C_{52} 0_7 \quad \text{[Equation 2]}$$

The sequence for the 20 MHz bandwidth defined as shown in Equation 2 includes a total of 256 tones (i.e., 5+52+12+52+12+52+12+52+7=256).

The sequence for the 40 MHz bandwidth can be defined as shown in Equation 3.

Equation 3

$$0_5 C_{52} 0_{12} C_{52} 0_{12} C_{52} 0_{12} C_{52} 0_{12} C_{52} 0_{12} C_{52} 0_{12} C_{52} 0_7 \quad \text{[Equation 3]}$$

The sequence for the 40 MHz bandwidth defined as shown in Equation 3 includes a total of 512 tones. In this case, a sequence component ($C_{52}$ $0_{12}$ $C_{52}$ $0_{12}$ $C_{52}$ $0_{12}$ $C_{52}$) obtained by eliminating $0_5$ and $0_7$ from the 20 MHz sequence defined according to Equation 2 is located at the left and right sides of the center $0_{12}$. That is, the sequence for the 40 MHz bandwidth is defined through sequential arrangement of $0_5$—a part of the sequence for 20 MHz-$0_{12}$—a part of the sequence for 20 MHz-$0_7$. Alternatively, the sequence for the 40 MHz bandwidth can be defined by repeating the sequence for the 20 MHz bandwidth twice ($0_5+0_7=0_{12}$).

The sequence for the 80 MHz bandwidth can be defined as shown in Equation 4.

Equation 4

$$0_5 C_{52} 0_{12} C_{52} 0_{12} C_{52} 0_{12} C_{52} 0_{12} C_{52} 0_{12} \\ C_{52} 0_{12} C_{52} 0_{12} C_{52} \ldots \ldots \\ 0_5 C_{52} 0_{12} C_{52} 0_{12} C_{52} 0_{12} C_{52} 0_{12} C_{52} 0_{12} \\ C_{52} 0_{12} C_{52} 0_7 \quad \text{[Equation 4]}$$

As shown in Equation 4, the sequence for the 80 MHz bandwidth includes a total of 1024 tones, and it can be defined by repeating the sequence for the 20 MHz bandwidth four times ($0_5+0_7=0_{12}$). In this case, a DC component can be inserted into the center component $0_{12}$ of the aforementioned sequences for 20, 40, and 80 MHz.

Hereinafter, a new STF sequence defined by adding specific tones, which are repeated at an interval of 4 tones or 2 tones, to the $0_{12}$ component is described based on the aforementioned sequence structures. By doing so, when a subband in the new sequence is assigned to a UE, the subband assigned to the UE can include non-zero values in all cases. Meanwhile, the aforementioned $C_{52}$ component of the sequences for 20, 40, and 80 MHz can be identically applied to the conventional STF and LTF sequences.

According to an embodiment, a sequence can be generated by replacing at least one $0_{12}$ component of the sequences defined according to Equation 2 to Equation 4 with a $D_{12}$ component. In this case, the $D_{12}$ component means a component obtained by substituting the zero values of the $O_{12}$ component with non-zero values repeated at the interval of 4-tone or 2-tone. For instance, the $D_{12}$ component according to the embodiment can be defined as shown in Equation 5.

Equation 5

$$D_{12} = \{0\ 0\ 0\ 1+j\ 0\ 0\ 0\ -1-j\ 0\ 0\ 0\ -1-j\} \quad \text{[Equation 5]}$$

In the embodiment according to equation 5, the $D_{12}$ component includes non-zero values such as 1+j at the fourth tone, −1−j at the eighth tone, and −1−j at the twelfth tone. In each of the sequences for 20, 40, and 80 MHz, at least one $0_{12}$ component can be substituted with the $D_{12}$ component in Equation 5.

However, compared to a case where the $O_{12}$ component is used, such a substitution process may increase a peak to average power ratio (PAPR). According to an embodiment, a UE/AP can rotate a phase by a unit of $\{C_{12}D_{12}\}$ and/or $\{C_{12}\}$ to reduce the PAPR. In other words, a phase rotation factor $\gamma_k$ can be applied to the proposed sequences.

For example, if $C_{52}$ is the same as that of the STF sequence of the VHT system, it can be defined as shown in Equation 6.

Equation 6

$$C_{52} = \sqrt{1/2}\{0001+j000-1-j000-1-j000\ -1-j0001+ \\ j0000--000-1-j000-1-j0001+j0001+j0001+ \\ j0001+j\} \quad \text{[Equation 6]}$$

In this case, if $D_{12}$ is applied to the 20 MHz sequence according to the proposed embodiment, a new 20 MHz sequence can be defined as shown in Equation 7.

Equation 7

$$S_{20\ MHz}=[0_5 C_{52} D_{12} C_{52} D_{12} C_{52} D_{12} C_{52} 0_7] \quad \text{[Equation 7]}$$

Equation 8 shows a process for applying the phase rotation factor to the sequence in Equation 7.

Equation 8

$$S_{20\ MHz} = [0_5\ \underbrace{C_{52}\ D_{12}}_{\times\ \gamma_1^{(20)}}\ \underbrace{C_{52}\ D_{12}}_{\times\ \gamma_2^{(20)}}\ \underbrace{C_{52}\ D_{12}}_{\times\ \gamma_3^{(20)}}\ \underbrace{C_{52}}_{\times\ \gamma_4^{(20)}}\ 0_7] \quad \text{[Equation 8]}$$

In Equation 8, a k value of $\gamma_k$ indicates an index of the phase rotation factor applied to each sequence and a superscript character 20 indicates that the corresponding phase rotation factor is applied to the 20 MHz sequence.

In an embodiment according to Equation 7, a process for determining a value of the phase rotation factor to optimize the PAPR (=1.7379) is disclosed. First, Table 2 below shows eight cases of $\gamma_k$ capable of obtaining the optimum PAPR value corresponding to 1.7379. In Table 2, each column indicates an index of the phase rotation factor (i.e., k=1, 2, 3, or 4) and each row indicates one of eight independent cases.

TABLE 2

| | | | |
|---|---|---|---|
| 1 | 1 | 1 | −1 |
| 1 | −1 | −1 | −1 |
| −1 | 1 | 1 | 1 |
| −1 | −1 | −1 | 1 |
| 1i | 1i | 1i | −1i |
| 1i | −1i | −1i | −1i |
| −1i | 1i | 1i | 1i |
| −1i | −1i | −1i | 1i |

Meanwhile, if $0_{12}$ is used in Table 2 instead of $D_{12}$ (i.e., the $0_{12}$ component is set to '0'), the PAPR can be decreased, whereby a value of 1.6747 can be obtained. Table 3 below shows an example of implementing a phase rotation factor for the 20 MHz sequence when $0_{12}$ is used as described above. In this case, there are a total of 32 cases.

TABLE 3

| | | | |
|---|---|---|---|
| 1 | 1 | 1 | −1 |
| 1 | 1 | −1 | 1 |
| 1 | −1 | 1 | 1 |
| 1 | −1 | −1 | −1 |
| 1 | 1i | 1 | −1i |
| 1 | 1i | −1 | 1i |
| 1 | −1i | 1 | 1i |
| 1 | −1i | −1 | −1i |
| −1 | 1 | 1 | 1 |
| −1 | 1 | −1 | −1 |
| −1 | −1 | 1 | −1 |
| −1 | −1 | −1 | 1 |
| −1 | 1i | 1 | 1i |
| −1 | 1i | −1 | −1i |
| −1 | −1i | 1 | −1i |
| −1 | −1i | −1 | 1i |
| 1i | 1 | 1i | −1 |
| 1i | 1 | −1i | 1 |
| 1i | −1 | 1i | 1 |
| 1i | −1 | −1i | −1 |

TABLE 3-continued

| | | | |
|---|---|---|---|
| 1i | 1i | 1i | −1i |
| 1i | 1i | −1i | 1i |
| 1i | −1i | 1i | 1i |
| 1i | −1i | −1i | −1i |
| −1i | 1 | 1i | 1 |
| −1i | 1 | −1i | −1 |
| −1i | −1 | 1i | −1 |
| −1i | −1 | −1i | 1 |
| −1i | 1i | 1i | 1i |
| −1i | 1i | −1i | −1i |
| −1i | −1i | 1i | −1i |
| −1i | −1i | −1i | 1i |

Additionally, sequences for 40 and 80 MHz can be created by extending the 20 MHz sequence in Equation 7. That is, a sequence for the 40 MHz bandwidth can be generated based on the 20 MHz sequence and a sequence for the 80 MHz bandwidth can be generated based on the 40 MHz sequence.

Hereinafter, processes for generating the sequences for 40 and 80 MHz and examples of implementing a phase rotation factor for each of the sequences are described. First, the sequence for the 40 MHz bandwidth obtained by extending the sequence for the 20 MHz bandwidth ($S_{20\ MHz}$) can be defined as shown in Equation 9.

Equation 9

$$S_{40\ MHz} = [0_5\ \underbrace{S'_{20\ MHz}\ D_{12}}_{\times\ \gamma_1^{(40)}}\ \underbrace{S'_{20\ MHz}}_{\times\ \gamma_2^{(40)}}\ 0_7] \quad \text{[Equation 9]}$$

In Equation 9, $S'_{20\ MHz}$ indicates a partial sequence created by eliminating the first component $0_5$ and the last component $0_7$ from the sequence for the 20 MHz bandwidth, $S_{20\ MHz}$. That is, the sequence for the 40 MHz bandwidth, $S_{40\ MHz}$ can be generated by repeating a part of the sequence for the 20 MHz bandwidth. Similarly, the sequence for the 80 MHz bandwidth, $S_{80\ MHz}$ can be defined by extending $S'_{40\ MHz}$ as shown in Equation 10. In this case, $S'_{40\ MHz}$ indicates a partial sequence created by eliminating the first component $0_5$ and the last component $0_7$ from $S_{40\ MHz}$.

Equation 10

$$S_{80\ MHz} = [0_5\ \underbrace{S'_{40\ MHz}\ D_{12}}_{\times\ \gamma_1^{(80)}}\ \underbrace{S'_{40\ MHz}}_{\times\ \gamma_2^{(80)}}\ 0_7] \quad \text{[Equation 10]}$$

Table 4 below shows optimum PAPRs of sequences defined for individual bandwidths according to FFT applied to the proposed communication system Table 4

TABLE 4

| BW | FFT | PAPR |
|---|---|---|
| 20 MHz | 256 | 1.7379 |
| 40 MHz | 512 | 2.2941 |
| 80 MHz | 1024 | 3.5251 |

Table 5 shows PAPRs according to sequences and FFT defined in the conventional 802.11ac system.

Table 5

TABLE 5

| BW | FFT | PAPR |
|---|---|---|
| 20 MHz | 64 | 1.6179 |
| 40 MHz | 128 | 1.6179 |
| 80 MHz | 256 | 1.6747 |

It can be seen in Tables 4 and 5 that when the proposed sequences are used, corresponding PAPRs are increased. That is, the phase rotation factor $\gamma_k$ needs to be adjusted to reduce the PAPRs, and thus, an embodiment for setting a value of the phase rotation factor is described in the following.

First, described is an embodiment of configuring a phase rotation factor for the sequence for the 40 MHz bandwidth. The phase rotation factor for the partial sequence $S'_{20\,MHz}$ of the sequence for the 20 MHz bandwidth is described with reference to Equation 10. Hereinafter, unlike Equation 9, an embodiment for configuring a phase rotation factor by further segmenting $S_{40\,MHz}$ into smaller parts is described.

$S_{40\,MHz}$ can be divided into two parts and then represented as shown in Equation 11.

Equation 11

$$S_{40\,MHz}=[0_5 S_{40\,MHz}^1 S_{40\,MHz}^2 0_7]$$

$$S_{40\,MHz}^1=[C_{52}D_{12}C_{52}D_{12}C_{52}D_{12}C_{52}D_{12}]$$

$$S_{40\,MHz}^2=[C_{52}D_{12}C_{52}D_{12}C_{52}D_{12}C_{52}] \quad \text{[Equation 11]}$$

When $S_{40\,MHz}^1$ and $S_{40\,MHz}^2$ are defined as shown in Equation 11, the phase rotation factor can be defined and applied in a unit of $\{C_{12}D_{12}\}$ as shown in Equation 12.

In other words, similar to Equation 9 where the phase rotation factor for the sequence for the 20 MHz bandwidth is configured in a unit of $\{C_{12}D_{12}\}$ and/or $\{C_{12}\}$, the phase rotation factor for the sequence for the 40 MHz bandwidth can be defined in the unit of $\{C_{12}D_{12}\}$ and/or $\{C_{12}\}$. Such an embodiment can be expressed as shown in Equation 12.

Equation 12

[Equation 12]

$$S_{40\,MHz}^1 = [\underbrace{[C_{52}\ D_{12}]}_{\times\ \gamma_1^{(40)}}\ \underbrace{[C_{52}\ D_{12}]}_{\times\ \gamma_2^{(40)}}\ \underbrace{[C_{52}\ D_{12}]}_{\times\ \gamma_3^{(40)}}\ \underbrace{[C_{52}\ D_{12}]}_{\times\ \gamma_4^{(40)}}]$$

$$S_{40\,MHz}^2 = [\underbrace{[C_{52}\ D_{12}]}_{\times\ \gamma_5^{(40)}}\ \underbrace{[C_{52}\ D_{12}]}_{\times\ \gamma_6^{(40)}}\ \underbrace{[C_{52}\ D_{12}]}_{\times\ \gamma_7^{(40)}}\ \underbrace{[C_{52}]}_{\times\ \gamma_8^{(40)}}]$$

When the phase rotation factor for the 40 MHz bandwidth is determined by the segmentation, the PAPR in Table 4 can be decreased from 2.2941 to 2.0227. Table 6 shows eight cases of the phase rotation factor that satisfies the condition of PAPR=2.0227. In Table 6, each column indicates an index of the phase rotation factor (i.e., k=1, 2, . . . , 8) and each row indicates one of the eight independent cases

TABLE 6

| 1 | 1i | −1 | −1 | −1 | 1i | 1 | −1 |
|---|---|---|---|---|---|---|---|
| 1 | −1i | −1 | −1 | −1 | −1i | 1 | −1 |
| −1 | 1i | 1 | 1 | 1 | 1i | −1 | 1 |
| −1 | −1i | 1 | 1 | 1 | −1i | −1 | 1 |
| 1i | 1 | −1i | −1i | −1i | 1 | 1i | −1i |
| 1i | −1 | −1i | −1i | −1i | −1 | 1i | −1i |
| −1i | 1 | 1i | 1i | 1i | 1 | −1i | 1i |
| −1i | −1 | 1i | 1i | 1i | −1 | −1i | 1i |

Meanwhile, in the case of the 40 MHz sequence, if $0_{12}$ is used instead of $D_{12}$, the PAPR can be decreased to 1.6747. In addition, it is possible to implement 128 different results according to phase rotation factors. In other words, a total of 128 different sequences satisfying the condition of PAPR=1.6747 can be generated and individual phase rotation factors are given as shown in Table 7.

TABLE 7

| 1 | 1 | 1 | 1i | −1 | 1 | −1 | 1i |
|---|---|---|---|---|---|---|---|
| 1 | 1 | 1 | −1i | −1 | 1 | −1 | −1i |
| 1 | 1 | −1 | 1i | −1 | 1 | 1 | 1i |
| 1 | 1 | −1 | −1i | −1 | 1 | 1 | −1i |
| 1 | 1 | 1i | 1 | 1 | −1 | 1i | −1 |
| 1 | 1 | 1i | −1 | 1 | −1 | 1i | 1 |
| 1 | 1 | −1i | 1 | 1 | −1 | −1i | −1 |
| 1 | 1 | −1i | −1 | 1 | −1 | −1i | 1 |
| 1 | −1 | 1 | 1i | −1 | −1 | −1 | 1i |
| 1 | −1 | 1 | −1i | −1 | −1 | −1 | −1i |
| 1 | −1 | −1 | 1i | −1 | −1 | 1 | 1i |
| 1 | −1 | −1 | −1i | −1 | −1 | 1 | −1i |
| 1 | −1 | 1i | 1 | 1 | 1 | 1i | −1 |
| 1 | −1 | 1i | −1 | 1 | 1 | 1i | 1 |
| 1 | −1 | −1i | 1 | 1 | 1 | −1i | −1 |
| 1 | −1 | −1i | −1 | 1 | 1 | −1i | 1 |
| −1 | 1 | 1 | 1i | 1 | 1 | −1 | 1i |
| −1 | 1 | 1 | −1i | 1 | 1 | −1 | −1i |
| −1 | 1 | −1 | 1i | 1 | 1 | 1 | 1i |
| −1 | 1 | −1 | −1i | 1 | 1 | 1 | −1i |
| −1 | 1 | 1i | 1 | −1 | −1 | 1i | −1 |
| −1 | 1 | 1i | −1 | −1 | −1 | 1i | 1 |
| −1 | 1 | −1i | 1 | −1 | −1 | −1i | −1 |
| −1 | 1 | −1i | −1 | −1 | −1 | −1i | 1 |
| −1 | −1 | 1 | 1i | 1 | −1 | −1 | 1i |
| −1 | −1 | 1 | −1i | 1 | −1 | −1 | −1i |
| −1 | −1 | −1 | 1i | 1 | −1 | 1 | 1i |
| −1 | −1 | −1 | −1i | 1 | −1 | 1 | −1i |
| −1 | −1 | 1i | 1 | −1 | 1 | 1i | −1 |
| −1 | −1 | 1i | −1 | −1 | 1 | 1i | 1 |
| −1 | −1 | −1i | 1 | −1 | 1 | −1i | −1 |
| −1 | −1 | −1i | −1 | −1 | 1 | −1i | 1 |
| 1 | 1i | 1 | 1 | −1 | 1i | −1 | 1 |
| 1 | 1i | 1 | −1 | −1 | 1i | −1 | −1 |
| 1 | 1i | −1 | 1 | −1 | 1i | 1 | 1 |
| 1 | 1i | −1 | −1 | −1 | 1i | 1 | −1 |
| 1 | 1i | 1i | 1i | 1 | −1i | 1i | −1i |
| 1 | 1i | 1i | −1i | 1 | −1i | 1i | 1i |
| 1 | 1i | −1i | 1i | 1 | −1i | −1i | −1i |
| 1 | 1i | −1i | −1i | 1 | −1i | −1i | 1i |
| 1 | −1i | 1 | 1 | −1i | −1i | −1 | 1 |
| 1 | −1i | 1 | −1 | −1i | −1i | −1 | −1 |
| 1 | −1i | −1 | 1 | −1i | −1i | 1 | 1 |
| 1 | −1i | −1 | −1 | −1i | −1i | 1 | −1 |
| 1 | −1i | 1i | 1i | 1i | 1i | 1i | −1i |
| 1 | −1i | 1i | −1i | 1i | 1i | 1i | 1i |
| 1 | −1i | −1i | 1i | 1i | 1i | −1i | −1i |
| 1 | −1i | −1i | −1i | 1 | 1i | −1i | 1i |

TABLE 7-continued

| | | | | | | | |
|---|---|---|---|---|---|---|---|
| -1 | 1i | 1 | 1 | 1 | 1i | -1 | 1 |
| -1 | 1i | 1 | -1 | 1 | 1i | -1 | -1 |
| -1 | 1i | -1 | 1 | 1 | 1i | 1 | 1 |
| -1 | 1i | -1 | -1 | 1 | 1i | 1 | -1 |
| -1 | 1i | 1i | 1i | -1 | -1i | 1i | -1i |
| -1 | 1i | 1i | -1i | -1 | -1i | 1i | 1i |
| -1 | 1i | -1i | 1i | -1 | -1i | -1i | -1i |
| -1 | 1i | -1i | -1i | -1 | -1i | -1i | 1i |
| -1 | -1i | 1 | 1 | 1 | -1i | -1 | 1 |
| -1 | -1i | 1 | -1 | 1 | -1i | -1 | -1 |
| -1 | -1i | -1 | 1 | 1 | -1i | 1 | 1 |
| -1 | -1i | -1 | -1 | 1 | -1i | 1 | -1 |
| -1 | -1i | 1i | 1i | -1 | 1i | 1i | -1i |
| -1 | -1i | 1i | -1i | -1 | 1i | 1i | 1i |
| -1 | -1i | -1i | 1i | -1 | 1i | -1i | -1i |
| -1 | -1i | -1i | -1i | -1 | 1i | -1i | 1i |
| 1i | 1 | 1 | 1 | 1i | -1 | 1 | -1 |
| 1i | 1 | 1 | -1 | 1i | -1 | 1 | 1 |
| 1i | 1 | -1 | 1 | 1i | -1 | -1 | -1 |
| 1i | 1 | -1 | -1 | 1i | -1 | -1 | 1 |
| 1i | 1 | 1i | 1i | -1i | 1 | -1i | 1i |
| 1i | 1 | 1i | -1i | -1i | 1 | -1i | -1i |
| 1i | 1 | -1i | 1i | -1i | 1 | 1i | 1i |
| 1i | 1 | -1i | -1i | -1i | 1 | 1i | -1i |
| 1i | -1 | 1 | 1 | 1i | 1 | 1 | -1 |
| 1i | -1 | 1 | -1 | 1i | 1 | 1 | 1 |
| 1i | -1 | -1 | 1 | 1i | 1 | -1 | -1 |
| 1i | -1 | -1 | -1 | 1i | 1 | -1 | 1 |
| 1i | -1 | 1i | 1i | -1i | -1 | -1i | 1i |
| 1i | -1 | 1i | -1i | -1i | -1 | -1i | -1i |
| 1i | -1 | -1i | 1i | -1i | -1 | 1i | 1i |
| 1i | -1 | -1i | -1i | -1i | -1 | 1i | -1i |
| -1i | 1 | 1 | 1 | -1i | -1 | 1 | -1 |
| -1i | 1 | 1 | -1 | -1i | -1 | 1 | 1 |
| -1i | 1 | -1 | 1 | -1i | -1 | -1 | -1 |
| -1i | 1 | -1 | -1 | -1i | -1 | -1 | 1 |
| -1i | 1 | 1i | 1i | 1i | 1 | -1i | 1i |
| -1i | 1 | 1i | -1i | 1i | 1 | -1i | -1i |
| -1i | 1 | -1i | 1i | 1i | 1 | 1i | 1i |
| -1i | 1 | -1i | -1i | 1i | 1 | 1i | -1i |
| -1i | -1 | 1 | 1 | -1i | 1 | 1 | -1 |
| -1i | -1 | 1 | -1 | -1i | 1 | 1 | 1 |
| -1i | -1 | -1 | 1 | -1i | 1 | -1 | -1 |
| -1i | -1 | -1 | -1 | -1i | 1 | -1 | 1 |
| -1i | -1 | 1i | 1i | 1i | -1 | -1i | 1i |
| -1i | -1 | 1i | -1i | 1i | -1 | -1i | -1i |
| -1i | -1 | -1i | 1i | 1i | -1 | 1i | 1i |
| -1i | -1 | -1i | -1i | 1i | -1 | 1i | -1i |
| 1i | 1i | 1 | 1i | 1i | -1i | 1 | -1i |
| 1i | 1i | 1 | -1i | 1i | -1i | 1 | 1i |
| 1i | 1i | -1 | 1i | 1i | -1i | -1 | -1i |
| 1i | 1i | -1 | -1i | 1i | -1i | -1 | 1i |
| 1i | 1i | 1i | 1 | -1i | 1i | -1i | 1 |
| 1i | 1i | 1i | -1 | -1i | 1i | -1i | -1 |
| 1i | 1i | -1i | 1 | -1i | 1i | 1i | 1 |
| 1i | 1i | -1i | -1 | -1i | 1i | 1i | -1 |
| 1i | -1i | 1 | 1i | 1i | 1i | 1 | -1i |
| 1i | -1i | 1 | -1i | 1i | 1i | 1 | 1i |
| 1i | -1i | -1 | 1i | 1i | 1i | -1 | -1i |
| 1i | -1i | -1 | -1i | 1i | 1i | -1 | 1i |
| 1i | -1i | 1i | 1 | -1i | -1i | -1i | 1 |
| 1i | -1i | 1i | -1 | -1i | -1i | -1i | -1 |
| 1i | -1i | -1i | 1 | -1i | -1i | 1i | 1 |
| 1i | -1i | -1i | -1 | -1i | -1i | 1i | -1 |
| -1i | 1i | 1 | 1i | -1i | -1i | 1 | -1i |
| -1i | 1i | 1 | -1i | -1i | -1i | 1 | 1i |
| -1i | 1i | -1 | 1i | -1i | -1i | -1 | -1i |
| -1i | 1i | -1 | -1i | -1i | -1i | -1 | 1i |
| -1i | 1i | 1i | 1 | 1i | 1i | -1i | 1 |
| -1i | 1i | 1i | -1 | 1i | 1i | -1i | -1 |
| -1i | 1i | -1i | 1 | 1i | 1i | 1i | 1 |
| -1i | 1i | -1i | -1 | 1i | 1i | 1i | -1 |
| -1i | -1i | 1 | 1i | -1i | 1i | 1 | -1i |
| -1i | -1i | 1 | -1i | -1i | 1i | 1 | 1i |
| -1i | -1i | -1 | 1i | -1i | 1i | -1 | -1i |
| -1i | -1i | -1 | -1i | -1i | 1i | -1 | 1i |
| -1i | -1i | 1i | 1 | 1i | -1i | -1i | 1 |
| -1i | -1i | 1i | -1 | 1i | -1i | -1i | -1 |
| -1i | -1i | -1i | 1 | 1i | -1i | 1i | 1 |
| -1i | -1i | -1i | -1 | 1i | -1i | 1i | -1 |

Next, an embodiment for segmenting a phase rotation factor for the sequence for the 80 MHz bandwidth is described. Two different embodiments can be applied to the sequence for the 80 MHz bandwidth.

As a first method, a sequence for the 20 MHz bandwidth having 256 components is first generated, and then a sequence for the 80 MHz bandwidth having 1024 components can be generated by repeating the sequence for the 20 MHz bandwidth four times. The first method can be expressed as shown in Equation 13.

Equation 13

$$S_{20MHz} = [\underbrace{C_{52} \; D_{12}}_{\times \gamma_1^{(80)}} \; \underbrace{C_{52} \; D_{12}}_{\times \gamma_2^{(80)}} \; \underbrace{C_{52} \; D_{12}}_{\times \gamma_3^{(80)}} \; \underbrace{C_{52}}_{\times \gamma_4^{(80)}}]$$

$$S_{80MHz} = [0_5 \; \underbrace{S_{20MHz} \; D_{12}}_{\times \gamma_5^{(80)}} \; \underbrace{S_{20MHz} \; D_{12}}_{\times \gamma_6^{(80)}} \; \underbrace{S_{20MHz} \; D_{12}}_{\times \gamma_7^{(80)}} \; \underbrace{S_{20MHz}}_{\times \gamma_8^{(80)}} \; 0_7]$$

[Equation 13]

In Equation 13, a value of $\gamma_k$ is determined based on a direction capable of minimizing a PAPR of the 80 MHz sequence. In other words, in Equation 14, the phase rotation factor $\gamma_k$ (where k=1, 2, 3, or 4) for the 20 MHz bandwidth is determined by an optimum value for the 80 MHz sequence rather than an optimum value for the 20 MHz sequence. That is, in Equation 13, the phase rotation factor $\gamma_k$ (where k=5, 6, 7, or 8) is not simply determined in consideration of four times repetition of the 20 MHz sequence but is determined based on phase rotation factors for the 20 MHz bandwidth and phase rotation factors for the 80 MHz bandwidth.

In the case of the 80 MHz sequence in accordance with the first method, it is possible to obtain a PAPR value equal to 2.1348.

TABLE 8

| | | | | | | | |
|---|---|---|---|---|---|---|---|
| 1 | -1 | -1 | -1 | 1 | 1 | 1 | -1 |
| 1 | -1 | -1 | -1 | -1 | -1 | -1 | 1 |
| 1 | -1 | -1 | -1 | i | i | i | -i |
| 1 | -1 | -1 | -1 | -i | -i | -i | i |

As a second method for the 80 MHz sequence, a method similar to the segmentation embodiment for the 40 MHz sequence can be applied. That is, phase rotation factors for the 80 MHz sequence can be determined in the unit of $\{C_{12}D_{12}\}$ and/or $\{C_{12}\}$. The 80 MHz sequence in accordance with the second method can be expressed as shown in Equation 14.

Equation 14

$$S_{80\ MHz} = [0_5 S_{80\ MHz}^1 S_{80\ MHz}^2 0_7]$$

[Equation 14]

$S_{80\ MHz}^1 =$ $[C_{52}D_{12}C_{52}D_{12}C_{52}D_{12}C_{52}D_{12}C_{12}D_{12}C_{52}D_{52}C_{52}D_{12}C_{52}D_{12}]$ $S_{80\ MHz}^2 =$ $[C_{52}D_{12}C_{52}D_{52}C_{52}D_{12}C_{52}D_{12}C_{52}D_{12}C_{52}D_{12}C_{51}D_{12}C_{52}]$

The 80 MHz sequence can be divided into two parts ($S_{80\ MHz}^1$, $S_{80\ MHz}^2$) as shown in Equation 14. Each of the two parts includes 8 $\{C_{12}D_{12}\}$ components, i.e., the 80 MHz sequence includes a total of 16 $\{C_{12}D_{12}\}$ components (the last 16$^{th}$ component includes only $C_{12}$). Accordingly, since the phase rotation factor is applied in the unit of $\{C_{12}D_{12}\}$, a total of 16 phase rotation factor values can be defined for a single sequence. This can be expressed as shown in Equation 15 and the optimum PAPR can be achieved through Equation 15.

Equation 15

$$S_{80MHz}^1 = \begin{bmatrix} \frac{C_{52}\ D_{12}}{\times} & \frac{C_{52}\ D_{12}}{\times} & \frac{C_{52}\ D_{12}}{\times} \\ \gamma_1 & \gamma_2 & \gamma_3 \end{bmatrix}$$ [Equation 15]

$$\frac{C_{52}\ D_{12}}{\times}\ \frac{C_{52}\ D_{12}}{\times}\ \frac{C_{52}\ D_{12}}{\times}\ \frac{C_{52}\ D_{12}}{\times}\ \frac{C_{52}\ D_{12}}{\times}$$
$$\gamma_4\quad \gamma_5\quad \gamma_6\quad \gamma_7\quad \gamma_8$$

$$S_{80MHz}^2 = \begin{bmatrix} \frac{C_{52}\ D_{12}}{\times} & \frac{C_{52}\ D_{12}}{\times} & \frac{C_{52}\ D_{12}}{\times} \\ \gamma_9 & \gamma_{10} & \gamma_{11} \end{bmatrix}$$

$$\frac{C_{52}\ D_{12}}{\times}\ \frac{C_{52}\ D_{12}}{\times}\ \frac{C_{52}\ D_{12}}{\times}\ \frac{C_{52}\ D_{12}}{\times}\ \frac{C_{52}}{\times}$$
$$\gamma_{12}\quad \gamma_{13}\quad \gamma_{14}\quad \gamma_{15}\quad \gamma_{16}$$

If $D_{12}$ is equal to $0_{12}$ in Equation 15, 6144 phase rotation factors satisfying the condition of PAPR=1.6747 can be generated and each of the phase rotation factors includes 16 components ($\gamma = \{\gamma_1, \gamma_2, \ldots \gamma_{16}\}$).

Table 9 below shows 704 sequences corresponding to baseline sequences among the 6144 phase rotation factors. In Table 9, there are a total of 704 rows and each of the rows indicates a baseline sequence composed of 16 components. In addition, Table 9 shows each block by dividing the 704 rows into a random number to easily distinguish between the individual sequences.

TABLE 9

| | | | | | | | | | | | | | | | |
|---|---|---|---|---|---|---|---|---|---|---|---|---|---|---|---|
| 1 | 1 | 1 | 1 | 1 | -1 | -i | i | 1 | 1 | -1 | -1 | 1 | -1 | i | -i |
| 1 | 1 | 1 | 1 | 1 | -i | i | -1 | 1 | -1 | -1 | 1 | 1 | i | -i | -1 |
| 1 | 1 | 1 | 1 | i | 1 | i | -1 | -1 | 1 | -1 | 1 | -i | i | i | -1 |
| 1 | 1 | 1 | 1 | i | -i | -1 | 1 | -1 | -1 | 1 | 1 | -i | 1 | -1 | 1 |
| 1 | 1 | 1 | -1 | 1 | -1 | -i | -i | 1 | 1 | -1 | 1 | 1 | -1 | i | i |
| 1 | 1 | 1 | -1 | 1 | 1 | -i | -i | 1 | 1 | -1 | 1 | -1 | 1 | i | i |
| 1 | 1 | 1 | -1 | -1 | -i | i | -1 | 1 | -1 | -1 | -1 | -1 | i | -i | -1 |
| 1 | 1 | 1 | -1 | i | -1 | -i | -1 | -1 | 1 | -1 | -1 | -i | i | i | -1 |
| 1 | 1 | 1 | -1 | -i | -1 | i | -1 | -1 | 1 | -1 | -1 | i | -i | -i | -1 |
| 1 | 1 | 1 | i | 1 | i | -i | -i | 1 | -1 | -1 | i | 1 | -1 | i | -i |
| 1 | 1 | 1 | i | -1 | 1 | -i | -1 | 1 | 1 | -1 | -1 | -1 | 1 | 1 | 1 |
| 1 | 1 | 1 | i | -1 | -i | 1 | i | 1 | -1 | 1 | i | -1 | 1 | -i | i |
| 1 | 1 | 1 | i | 1 | i | -i | -1 | 1 | -1 | 1 | i | -i | -1 | i | i |
| 1 | 1 | 1 | i | -i | 1 | i | -i | -1 | 1 | -1 | 1 | i | 1 | -i | -i |
| 1 | 1 | 1 | i | -1 | i | -1 | i | -1 | -1 | 1 | i | i | -1 | -1 | i |
| 1 | 1 | 1 | -i | 1 | i | -i | i | 1 | -1 | -1 | -i | i | -1 | i | i |
| 1 | 1 | 1 | -1 | -1 | 1 | -i | 1 | 1 | 1 | -1 | i | -1 | 1 | 1 | -1 |
| 1 | 1 | 1 | -1 | -1 | -i | i | -i | 1 | -1 | -1 | -i | -1 | 1 | -1 | -i |
| 1 | 1 | 1 | -i | i | -1 | -i | -i | -1 | 1 | -1 | -i | -i | -1 | i | -i |
| 1 | 1 | 1 | -i | -i | 1 | i | i | -1 | 1 | -1 | -1 | i | 1 | -i | i |
| 1 | 1 | 1 | -1 | -1 | i | -1 | -i | -1 | 1 | 1 | -i | i | -1 | -1 | -i |
| 1 | 1 | -1 | 1 | 1 | i | i | -1 | 1 | -1 | 1 | 1 | 1 | -i | -1 | -1 |
| 1 | 1 | 1 | 1 | 1 | i | -i | -1 | 1 | -1 | -1 | 1 | 1 | -i | i | -1 |
| 1 | 1 | 1 | 1 | -1 | i | i | i | 1 | 1 | -1 | -1 | -1 | 1 | i | -i |
| 1 | 1 | 1 | 1 | i | -1 | -i | 1 | -1 | 1 | -1 | 1 | -i | -1 | i | 1 |
| 1 | 1 | 1 | 1 | -i | 1 | i | -1 | -1 | 1 | -1 | 1 | i | 1 | -i | -1 |
| 1 | 1 | 1 | -1 | 1 | i | -i | 1 | -1 | 1 | -1 | -1 | 1 | -i | i | 1 |
| 1 | 1 | 1 | -1 | -1 | i | -i | -1 | 1 | -1 | -1 | -1 | -1 | -i | i | -1 |
| 1 | 1 | 1 | -1 | i | 1 | -1 | -1 | -1 | -1 | -1 | -1 | -1 | -1 | 1 | 1 |
| 1 | 1 | 1 | -1 | i | -i | -1 | -1 | 1 | -1 | 1 | -1 | -1 | i | -1 | 1 |
| 1 | 1 | 1 | -1 | -i | -1 | -1 | -1 | 1 | -1 | -1 | 1 | -1 | -i | -1 | -1 |
| 1 | 1 | 1 | i | 1 | -i | 1 | -i | -1 | 1 | 1 | i | 1 | i | -i | -i |
| 1 | 1 | 1 | i | i | -1 | -1 | -1 | 1 | -1 | -1 | i | -i | i | -i | i |
| 1 | 1 | 1 | 1 | i | 1 | -1 | -1 | -1 | 1 | i | -i | 1 | 1 | -1 |

TABLE 9-continued

| | | | | | | | | | | | | | | | |
|---|---|---|---|---|---|---|---|---|---|---|---|---|---|---|---|
| 1 | 1 | 1 | i | i | -i | -1 | i | -1 | -1 | 1 | i | -i | i | -1 | i |
| 1 | 1 | 1 | i | -i | -1 | i | i | -1 | 1 | -1 | i | i | -i | -i | i |
| 1 | 1 | 1 | -i | 1 | -1 | -i | 1 | 1 | 1 | -1 | i | 1 | -1 | i | -1 |
| 1 | 1 | 1 | -i | 1 | -i | i | 1 | -1 | 1 | -1 | -i | i | 1 | -i | i |
| 1 | 1 | 1 | -i | -1 | i | -i | -i | 1 | -1 | 1 | -i | -1 | -i | i | -i |
| 1 | 1 | 1 | -i | i | 1 | -i | i | -1 | 1 | -1 | -i | -i | 1 | i | i |
| 1 | 1 | 1 | -i | i | -i | -1 | -i | -1 | 1 | -i | -i | i | -1 | i | -i |
| 1 | 1 | 1 | -i | -i | i | -i | -1 | 1 | -1 | 1 | i | -i | -i | i | -i |
| 1 | 1 | -1 | 1 | 1 | -1 | -1 | -i | 1 | -1 | 1 | -1 | 1 | -1 | i | i |
| 1 | 1 | -1 | 1 | 1 | -i | -1 | -1 | 1 | -1 | 1 | 1 | 1 | i | i | -1 |

| | | | | | | | | | | | | | | | |
|---|---|---|---|---|---|---|---|---|---|---|---|---|---|---|---|
| 1 | 1 | -1 | 1 | -1 | 1 | -i | -i | 1 | 1 | 1 | -1 | -1 | 1 | i | i |
| 1 | 1 | -1 | 1 | i | 1 | 1 | -1 | -1 | 1 | 1 | 1 | -i | 1 | -i | -1 |
| 1 | 1 | -1 | 1 | 1 | -i | -1 | -1 | -1 | -1 | -1 | 1 | -i | 1 | -1 | -1 |
| 1 | 1 | -1 | 1 | -i | -1 | -i | 1 | -1 | 1 | 1 | 1 | i | -1 | i | 1 |
| 1 | 1 | -1 | -1 | 1 | -1 | -i | i | 1 | 1 | 1 | 1 | 1 | -1 | i | -i |
| 1 | 1 | -1 | -1 | -1 | 1 | -i | i | 1 | 1 | 1 | 1 | -1 | 1 | i | -i |
| 1 | 1 | -1 | -1 | -1 | -i | -i | -1 | 1 | -1 | 1 | -1 | -1 | i | i | -1 |
| 1 | 1 | -1 | -1 | i | -i | -1 | 1 | -1 | -1 | -1 | -1 | 1 | -1 | i | 1 |
| 1 | 1 | -1 | -1 | -i | -1 | -i | -1 | -1 | 1 | 1 | -1 | i | -1 | i | -1 |
| 1 | 1 | -1 | i | 1 | -1 | -i | i | 1 | 1 | 1 | -i | 1 | -1 | i | -1 |
| 1 | 1 | -1 | i | 1 | -i | -i | -i | 1 | -1 | 1 | 1 | 1 | 1 | i | -i |
| 1 | 1 | -1 | i | -1 | i | i | 1 | -1 | 1 | 1 | i | -1 | -i | -i | i |
| 1 | 1 | -1 | i | i | 1 | i | -i | -1 | 1 | 1 | i | -i | 1 | -i | -i |
| 1 | 1 | -1 | i | i | -i | -1 | i | -1 | -1 | i | i | i | -1 | 1 | -i |
| 1 | 1 | -1 | i | -i | i | 1 | -i | -1 | -1 | i | 1 | -i | 1 | 1 | 1 |
| 1 | 1 | -1 | -i | 1 | i | 1 | -1 | 1 | -1 | -1 | i | 1 | -i | 1 | 1 |
| 1 | 1 | -1 | -i | -1 | 1 | i | 1 | 1 | 1 | 1 | i | -1 | 1 | -i | -1 |
| 1 | 1 | -1 | -i | -1 | -i | 1 | -1 | 1 | -1 | 1 | i | 1 | -i | i | -1 |
| 1 | 1 | -1 | -i | i | -1 | i | -1 | 1 | 1 | -i | -i | -1 | -i | -1 | 1 |
| 1 | 1 | -1 | -i | -i | 1 | -i | i | 1 | 1 | 1 | -i | i | 1 | i | i |
| 1 | 1 | -1 | -i | -i | i | -1 | i | -1 | -1 | -i | i | -i | -1 | i | 1 |
| 1 | 1 | i | 1 | 1 | i | -i | 1 | 1 | -1 | i | -1 | 1 | -i | i | i |
| 1 | 1 | i | 1 | -1 | 1 | -1 | 1 | 1 | -1 | i | -1 | 1 | 1 | 1 | 1 |
| 1 | 1 | i | 1 | -1 | -i | i | i | 1 | -1 | i | 1 | -1 | i | i | -i |
| 1 | 1 | i | 1 | i | -1 | i | -i | -1 | 1 | i | -1 | -i | -1 | i | i |

| | | | | | | | | | | | | | | | |
|---|---|---|---|---|---|---|---|---|---|---|---|---|---|---|---|
| 1 | 1 | -1 | 1 | -1 | -i | -i | 1 | 1 | -1 | 1 | 1 | -1 | i | i | 1 |
| 1 | 1 | -1 | 1 | i | -1 | i | 1 | 1 | 1 | 1 | 1 | -1 | -1 | -1 | 1 |
| 1 | 1 | -1 | 1 | -i | 1 | -i | -1 | -1 | 1 | 1 | 1 | i | 1 | i | -1 |
| 1 | 1 | -1 | 1 | -i | i | -1 | -1 | -1 | -1 | 1 | i | -i | -1 | -1 | -1 |
| 1 | 1 | -1 | -1 | 1 | -1 | -i | 1 | 1 | 1 | 1 | -1 | 1 | 1 | 1 | 1 |
| 1 | 1 | -1 | -1 | -1 | i | i | -1 | 1 | -1 | 1 | -1 | -1 | -i | -i | -1 |
| 1 | 1 | -1 | -1 | i | -1 | i | -1 | -1 | 1 | 1 | -1 | -i | -1 | -i | -1 |
| 1 | 1 | -1 | -1 | -i | 1 | -i | 1 | -1 | 1 | 1 | -1 | i | 1 | i | 1 |
| 1 | 1 | -1 | -1 | -i | i | -1 | 1 | -1 | -1 | 1 | -1 | -1 | -i | -1 | 1 |
| 1 | 1 | -1 | i | 1 | i | i | -i | 1 | -1 | 1 | i | i | -i | -i | -i |
| 1 | 1 | -1 | i | -1 | 1 | -i | 1 | 1 | 1 | 1 | -i | -1 | 1 | i | -1 |
| 1 | 1 | -1 | i | -1 | -i | -i | i | 1 | -1 | 1 | i | -1 | i | i | i |
| 1 | 1 | -1 | i | i | 1 | i | -1 | 1 | 1 | -1 | i | 1 | -1 | -1 | i |
| 1 | 1 | -1 | i | -i | -1 | -1 | -1 | 1 | -1 | -i | 1 | -1 | -1 | 1 | 1 |
| 1 | 1 | -1 | -i | 1 | -1 | i | 1 | 1 | 1 | i | 1 | -1 | -i | -1 | 1 |
| 1 | 1 | -1 | -i | 1 | -i | 1 | 1 | 1 | -1 | -1 | i | 1 | i | 1 | -1 |
| 1 | 1 | -1 | -i | -1 | i | -1 | 1 | 1 | -1 | -1 | i | -1 | -i | -i | 1 |
| 1 | 1 | -1 | -i | i | -i | 1 | -1 | 1 | -1 | -i | -i | i | -1 | i | 1 |
| 1 | 1 | -1 | -i | -i | -1 | -i | -1 | -1 | -1 | -i | -i | i | -1 | i | -1 |
| 1 | 1 | i | 1 | 1 | -1 | -i | 1 | 1 | -i | -1 | 1 | -1 | 1 | -1 | 1 |
| 1 | 1 | i | 1 | 1 | -i | -1 | 1 | 1 | -1 | 1 | 1 | 1 | 1 | -i | -i |
| 1 | 1 | i | 1 | -1 | i | i | -i | 1 | -1 | i | -1 | -1 | -i | i | i |
| 1 | 1 | i | 1 | i | 1 | -i | -i | 1 | 1 | i | -1 | 1 | 1 | -i | i |
| 1 | 1 | i | 1 | i | -i | i | -1 | -1 | i | -1 | -i | i | -i | i | 1 |

| | | | | | | | | | | | | | | | |
|---|---|---|---|---|---|---|---|---|---|---|---|---|---|---|---|
| 1 | 1 | i | 1 | -i | 1 | -i | i | -1 | 1 | i | -1 | i | 1 | -i | -i |
| 1 | 1 | i | -1 | 1 | -1 | 1 | -i | 1 | 1 | -i | 1 | 1 | -1 | -1 | i |
| 1 | 1 | i | -1 | -1 | 1 | -1 | 1 | 1 | 1 | -i | 1 | -1 | 1 | 1 | -i |
| 1 | 1 | i | -1 | -i | -1 | i | -i | -1 | 1 | 1 | -1 | i | -1 | 1 | -i |
| 1 | 1 | i | -1 | 1 | -1 | i | 1 | 1 | 1 | i | 1 | -1 | -1 | i | -i |
| 1 | 1 | i | -1 | -i | -1 | -1 | -1 | 1 | -i | -1 | i | -1 | 1 | -1 |
| 1 | 1 | i | i | 1 | i | 1 | -i | 1 | -1 | -i | i | 1 | -i | -1 | -i |
| 1 | 1 | i | i | -1 | 1 | i | -1 | 1 | -1 | -i | -i | i | 1 | -1 | 1 |
| 1 | 1 | i | i | -1 | -i | -1 | i | 1 | -1 | -1 | i | -i | 1 | -1 | i |
| 1 | 1 | i | i | i | -1 | i | -1 | 1 | -i | i | -i | -1 | -1 | 1 |
| 1 | 1 | 1 | i | -i | 1 | -i | -1 | 1 | -i | i | 1 | 1 | -1 | -i |
| 1 | 1 | i | -i | 1 | -i | -i | -1 | 1 | -i | -1 | -i | 1 | 1 | 1 | -i |
| 1 | 1 | i | -i | i | 1 | i | -1 | 1 | -i | -i | -i | 1 | -1 | i |
| 1 | 1 | i | -i | i | -i | -1 | -i | -1 | -i | -i | i | -i | 1 | i | i |
| 1 | 1 | 1 | -i | -i | -1 | -1 | -i | -1 | 1 | -i | -i | 1 | -1 | 1 | -i |

TABLE 9-continued

| | | | | | | | | | | | | | | | |
|---|---|---|---|---|---|---|---|---|---|---|---|---|---|---|---|
| 1 | 1 | -i | 1 | 1 | -1 | 1 | -i | 1 | 1 | i | -1 | 1 | -1 | -1 | i |
| 1 | 1 | -1 | 1 | 1 | -i | 1 | -1 | 1 | -1 | i | 1 | 1 | 1 | -1 | -1 |
| 1 | 1 | -i | 1 | -1 | i | -1 | 1 | 1 | -1 | i | 1 | -1 | -i | 1 | 1 |
| 1 | 1 | -i | 1 | i | -1 | -1 | 1 | -1 | 1 | i | 1 | -i | -1 | 1 | 1 |
| 1 | 1 | i | 1 | -i | i | i | -1 | -1 | -1 | i | 1 | i | -i | i | -1 |
| 1 | 1 | i | -1 | 1 | -i | -i | -i | 1 | -1 | i | 1 | i | i | -i | i |
| 1 | 1 | i | -1 | -1 | i | i | i | 1 | -1 | i | 1 | -1 | -i | i | -i |
| 1 | 1 | i | -1 | i | 1 | -i | i | -1 | 1 | i | 1 | -i | 1 | -i | -i |
| 1 | 1 | i | -1 | i | -i | -i | -1 | -1 | -1 | i | -1 | -1 | i | -i | -1 |
| 1 | 1 | i | -1 | -i | i | i | 1 | -1 | -1 | i | -1 | i | -i | i | 1 |
| 1 | 1 | i | i | 1 | -i | -1 | -i | 1 | -1 | -i | i | 1 | i | 1 | -i |
| 1 | 1 | i | i | -1 | 1 | i | i | -i | -1 | i | -1 | i | -1 | -1 | i |
| 1 | 1 | i | i | i | 1 | 1 | -i | -1 | 1 | -i | i | -i | 1 | -1 | i |
| 1 | 1 | i | i | i | -i | i | -1 | -1 | i | i | -i | i | i | -i |
| 1 | 1 | i | i | -i | -1 | -1 | i | -1 | 1 | -i | i | i | -1 | 1 | i |
| 1 | 1 | i | -i | 1 | -1 | 1 | 1 | 1 | -1 | i | 1 | 1 | -1 | -1 | -1 |
| 1 | 1 | i | -i | 1 | -i | -1 | 1 | -1 | 1 | i | i | 1 | 1 | -i | -1 |
| 1 | 1 | i | -i | -1 | -1 | -1 | 1 | -1 | -i | -i | -1 | 1 | 1 | -i |
| 1 | 1 | i | -i | i | -1 | 1 | -i | -1 | 1 | -i | -i | -i | -1 | -1 | -i |
| 1 | 1 | i | -i | -i | 1 | -1 | -i | -1 | 1 | -i | -i | -i | 1 | 1 | i |
| 1 | 1 | -i | 1 | 1 | i | -1 | -1 | 1 | -1 | i | 1 | 1 | -i | 1 | -1 |
| 1 | 1 | -i | 1 | -1 | 1 | -1 | 1 | 1 | 1 | i | -1 | -1 | 1 | -1 | i |
| 1 | 1 | -i | 1 | i | 1 | -1 | -1 | 1 | 1 | i | 1 | -i | 1 | 1 | -1 |
| 1 | 1 | -i | 1 | -i | 1 | -1 | -1 | 1 | 1 | i | 1 | 1 | 1 | -1 | -1 |

| | | | | | | | | | | | | | | | |
|---|---|---|---|---|---|---|---|---|---|---|---|---|---|---|---|
| 1 | 1 | -i | 1 | -i | -1 | 1 | 1 | -1 | 1 | i | 1 | i | -1 | -1 | 1 |
| 1 | 1 | -i | -1 | 1 | -1 | 1 | 1 | 1 | 1 | i | 1 | 1 | -1 | -1 | -i |
| 1 | 1 | -i | -1 | -1 | 1 | 1 | i | 1 | 1 | i | 1 | 1 | -1 | 1 | -i |
| 1 | 1 | -i | -1 | -1 | -i | 1 | -1 | 1 | -1 | i | -1 | -1 | i | -1 | -1 |
| 1 | 1 | -i | -1 | i | -1 | -i | i | 1 | -1 | i | -i | -1 | -i | -i |
| 1 | 1 | -i | -1 | -i | 1 | i | -1 | 1 | 1 | i | 1 | 1 | 1 | 1 | i |
| 1 | 1 | -i | -1 | -i | -1 | -i | -1 | 1 | 1 | -1 | -1 | 1 | -1 | 1 | 1 |
| 1 | 1 | -i | i | 1 | -1 | -i | 1 | 1 | i | i | 1 | i | -1 | -i |
| 1 | 1 | -i | i | -1 | i | -i | 1 | 1 | -i | -i | -1 | -i | -i | -1 |
| 1 | 1 | -i | i | 1 | -1 | -i | 1 | 1 | -i | -i | -i | -1 | -i | -1 |
| 1 | 1 | -i | i | -i | 1 | i | -1 | 1 | -i | -i | i | 1 | i | 1 |

| | | | | | | | | | | | | | | | |
|---|---|---|---|---|---|---|---|---|---|---|---|---|---|---|---|
| 1 | 1 | -i | 1 | -i | 1 | i | 1 | -1 | -1 | -i | 1 | i | -i | 1 | 1 |
| 1 | 1 | -i | -1 | 1 | 1 | -1 | 1 | -1 | 1 | i | -1 | 1 | -i | 1 | 1 |
| 1 | 1 | -i | -1 | -1 | i | -1 | -1 | 1 | -1 | i | 1 | -1 | -1 | i | -1 |
| 1 | 1 | -i | -1 | i | 1 | i | i | 1 | -1 | i | 1 | -i | 1 | i | -i |
| 1 | 1 | -i | -1 | i | -i | -i | 1 | -1 | -1 | i | 1 | i | -1 | -i | i |
| 1 | 1 | -i | -1 | -i | -1 | -i | -i | 1 | -1 | 1 | i | -1 | -i | i |
| 1 | 1 | -i | i | 1 | 1 | -1 | 1 | 1 | 1 | i | 1 | 1 | 1 | -1 |
| 1 | 1 | -i | i | -1 | 1 | 1 | 1 | 1 | i | -i | -1 | 1 | -1 | -1 |
| 1 | 1 | -i | i | i | 1 | i | 1 | -1 | -i | -i | -i | 1 | i | -1 |
| 1 | 1 | -i | i | i | -i | -i | -i | -1 | -1 | -i | 1 | -i | -i | -i |
| 1 | 1 | -i | i | -i | -1 | -i | -1 | 1 | -i | -i | i | -1 | -i | 1 |

| | | | | | | | | | | | | | | | |
|---|---|---|---|---|---|---|---|---|---|---|---|---|---|---|---|
| 1 | 1 | -i | -i | -1 | -1 | -1 | 1 | 1 | -1 | -i | i | -1 | i | -1 | -1 |
| 1 | 1 | -i | -i | i | -1 | -1 | -1 | -1 | 1 | -i | i | -i | -1 | -i | 1 |
| 1 | 1 | -i | -i | -i | 1 | 1 | -1 | 1 | -1 | -i | 1 | i | 1 | 1 | -1 |
| 1 | 1 | -i | -i | -i | i | -1 | i | 1 | -1 | -i | -1 | i | -i | -i | 1 |
| 1 | -1 | 1 | 1 | 1 | i | i | -1 | 1 | 1 | -1 | 1 | 1 | -1 | -i | -1 |
| 1 | -1 | 1 | 1 | -1 | -1 | -i | i | 1 | -1 | -1 | -1 | -1 | -1 | i | -1 |
| 1 | -1 | 1 | 1 | -1 | -i | -i | 1 | 1 | -1 | 1 | 1 | -1 | i | i | 1 |
| 1 | -1 | 1 | 1 | i | -1 | -i | -1 | 1 | -1 | -1 | 1 | -i | -1 | -1 | -1 |
| 1 | -1 | 1 | 1 | -i | -1 | i | -1 | 1 | -1 | -1 | 1 | i | -1 | -i | -1 |
| 1 | -1 | 1 | -1 | 1 | -i | -i | 1 | 1 | -1 | -1 | 1 | 1 | 1 | i | 1 |
| 1 | -1 | 1 | -1 | 1 | -1 | -i | 1 | 1 | -1 | -1 | -1 | 1 | i | 1 | 1 |
| 1 | -1 | 1 | -1 | -1 | 1 | i | 1 | 1 | -1 | -1 | -1 | -i | -i | -i | -1 |
| 1 | -1 | 1 | -1 | i | 1 | -i | -1 | 1 | -1 | -1 | -1 | -i | 1 | i | -1 |
| 1 | -1 | 1 | -1 | -1 | -i | -i | 1 | 1 | -1 | -1 | 1 | 1 | 1 | 1 | 1 |
| 1 | -1 | 1 | -1 | -i | -i | 1 | -1 | 1 | -1 | 1 | 1 | 1 | 1 | 1 |
| 1 | -1 | 1 | i | 1 | -1 | 1 | 1 | 1 | -1 | 1 | -1 | 1 | 1 | -1 | -1 |
| 1 | -1 | 1 | i | -1 | 1 | i | 1 | 1 | -1 | -1 | 1 | -1 | -1 | -i | -1 |
| 1 | -1 | 1 | 1 | i | 1 | -1 | 1 | -1 | 1 | 1 | -1 | 1 | i | 1 |
| 1 | -1 | 1 | 1 | i | -1 | 1 | -1 | 1 | 1 | -i | -i | -1 | 1 |
| 1 | -1 | 1 | -i | 1 | i | -1 | 1 | 1 | 1 | 1 | 1 | 1 | -i | -1 | -1 |

| | | | | | | | | | | | | | | | |
|---|---|---|---|---|---|---|---|---|---|---|---|---|---|---|---|
| 1 | 1 | -i | -i | i | 1 | i | -1 | -1 | 1 | -i | 1 | -1 | 1 | 1 | 1 |
| 1 | 1 | -i | -i | i | -i | -1 | 1 | -1 | -i | -i | -i | 1 | -1 | 1 |
| 1 | 1 | -1 | -1 | -i | -1 | 1 | -1 | -1 | -1 | -1 | -1 | 1 | -1 | -1 | -1 |
| 1 | -1 | 1 | 1 | 1 | 1 | -i | i | 1 | -1 | -1 | 1 | 1 | 1 | i | -i |
| 1 | -1 | 1 | 1 | 1 | -i | -1 | -1 | 1 | -1 | 1 | 1 | 1 | 1 | 1 | -1 |
| 1 | -1 | 1 | 1 | -1 | i | i | 1 | 1 | 1 | -1 | 1 | -i | -i | -i | 1 |
| 1 | -1 | 1 | 1 | i | 1 | -1 | 1 | 1 | -1 | -1 | -1 | 1 | -i | 1 | 1 |

TABLE 9-continued

| | | | | | | | | | | | | | | | |
|---|---|---|---|---|---|---|---|---|---|---|---|---|---|---|---|
| 1 | -1 | 1 | 1 | -i | 1 | i | 1 | -1 | -1 | -1 | 1 | 1 | 1 | -i | 1 |
| 1 | -1 | 1 | 1 | -i | -i | -1 | 1 | -1 | 1 | 1 | 1 | 1 | i | -1 | 1 |
| 1 | -1 | 1 | -1 | 1 | i | i | 1 | 1 | 1 | -1 | -1 | 1 | -i | -i | 1 |
| 1 | -1 | 1 | -1 | -1 | -1 | -i | -i | 1 | -1 | -1 | 1 | -1 | -1 | 1 | i |
| 1 | -1 | 1 | -1 | -1 | -1 | -i | -1 | 1 | 1 | -1 | -1 | -1 | 1 | 1 | -i |
| 1 | -1 | 1 | -1 | i | -1 | -i | 1 | -1 | 1 | -1 | -1 | -i | -1 | i | 1 |
| 1 | -1 | 1 | -1 | -i | -1 | -1 | -i | -1 | 1 | 1 | 1 | 1 | -1 | -1 | i |
| 1 | -1 | 1 | i | 1 | 1 | i | 1 | 1 | -1 | -1 | -i | 1 | 1 | -i | -1 |
| 1 | -1 | 1 | i | -1 | -1 | i | 1 | 1 | 1 | 1 | -i | -1 | -1 | -i | -1 |
| 1 | -1 | 1 | i | -1 | -i | -i | i | 1 | 1 | -1 | i | -1 | i | 1 | i |
| 1 | -1 | 1 | i | i | -1 | -i | -1 | 1 | -1 | 1 | i | -i | -1 | i | -i |
| 1 | -1 | 1 | i | i | -1 | -1 | -1 | 1 | -1 | 1 | -i | 1 | -1 | -1 | 1 |
| 1 | -1 | 1 | -i | 1 | 1 | i | 1 | -1 | 1 | 1 | i | 1 | 1 | -1 | 1 |
| 1 | -1 | 1 | -i | 1 | -1 | -1 | -1 | 1 | 1 | 1 | 1 | 1 | 1 | -1 | 1 |
| 1 | -1 | 1 | -i | -1 | -1 | i | -1 | 1 | -1 | -1 | 1 | -1 | -1 | -1 | 1 |
| 1 | -1 | 1 | -i | 1 | 1 | -i | -1 | 1 | 1 | -i | -1 | 1 | i | i | -i |
| 1 | -1 | 1 | -1 | -1 | 1 | 1 | 1 | 1 | -1 | -1 | 1 | -1 | -1 | 1 | -1 |
| 1 | -1 | 1 | -1 | -1 | -i | 1 | 1 | -1 | 1 | 1 | -1 | 1 | i | 1 | 1 |
| 1 | -1 | -1 | 1 | 1 | 1 | 1 | 1 | 1 | -1 | -1 | 1 | 1 | -i | 1 | -i |
| 1 | -1 | -1 | 1 | -1 | -1 | 1 | 1 | 1 | 1 | -1 | -1 | -1 | -1 | -1 | -i |
| 1 | -1 | -1 | 1 | -1 | -1 | -1 | -i | 1 | 1 | 1 | -1 | -1 | 1 | -1 | i |
| 1 | -1 | -1 | 1 | i | -1 | 1 | -1 | 1 | 1 | -1 | -1 | -1 | -1 | 1 | i |
| 1 | -1 | -1 | 1 | -i | 1 | -i | 1 | -1 | 1 | 1 | 1 | 1 | 1 | 1 | 1 |
| 1 | -1 | -1 | 1 | -i | -i | -1 | 1 | -1 | 1 | 1 | 1 | i | 1 | -1 | -1 |
| 1 | -1 | -1 | -1 | 1 | 1 | -1 | 1 | -1 | 1 | 1 | 1 | 1 | -i | 1 | i |
| 1 | -1 | -1 | -1 | -1 | -1 | i | -1 | 1 | 1 | 1 | 1 | -1 | -1 | -i | i |
| 1 | -1 | -1 | -1 | -1 | -i | -1 | i | 1 | -1 | 1 | -1 | i | -i | -i | -i |
| 1 | -1 | -1 | -1 | i | 1 | 1 | -1 | 1 | 1 | 1 | 1 | 1 | -i | -1 | -1 |
| 1 | -1 | -1 | -1 | 1 | -1 | -i | -1 | 1 | -1 | 1 | 1 | 1 | -1 | 1 | -1 |
| 1 | -1 | -1 | -i | -i | 1 | -1 | -1 | 1 | -1 | -1 | i | i | 1 | 1 | -1 |
| 1 | -1 | -1 | 1 | i | -i | 1 | 1 | -1 | 1 | -1 | 1 | i | 1 | 1 | -1 |
| 1 | -1 | -1 | i | -1 | i | -1 | -1 | 1 | 1 | -1 | -i | -i | -1 | -1 | 1 |
| 1 | -1 | -1 | i | i | -1 | 1 | -1 | 1 | -1 | 1 | -i | -1 | -1 | -1 | 1 |
| 1 | -1 | -1 | i | 1 | i | 1 | i | 1 | -1 | 1 | -i | -1 | -i | 1 | 1 |
| 1 | -1 | -1 | i | -i | -1 | 1 | -1 | 1 | 1 | 1 | i | -1 | -i | 1 | -1 |
| 1 | -1 | -1 | -i | 1 | 1 | i | 1 | 1 | -1 | 1 | i | 1 | 1 | -1 | -1 |
| 1 | -1 | -1 | -i | 1 | -i | i | 1 | 1 | 1 | -1 | i | 1 | i | -1 | 1 |
| 1 | -1 | -1 | -i | -1 | 1 | -i | -1 | -1 | 1 | 1 | -i | -i | -i | i | -i |
| 1 | -1 | -1 | -i | 1 | 1 | i | -1 | -1 | -1 | 1 | -i | -i | 1 | -1 | -1 |

| | | | | | | | | | | | | | | | |
|---|---|---|---|---|---|---|---|---|---|---|---|---|---|---|---|
| 1 | -1 | 1 | -1 | -1 | 1 | 1 | 1 | -1 | 1 | 1 | i | -1 | -i | 1 | -1 |
| 1 | -1 | 1 | -i | i | 1 | i | -1 | 1 | 1 | -i | -1 | -i | 1 | i |
| 1 | -1 | 1 | -i | -i | -1 | -1 | 1 | -1 | 1 | i | i | -1 | -1 | -1 |
| 1 | -1 | -1 | 1 | 1 | 1 | 1 | i | 1 | -1 | 1 | -1 | 1 | 1 | -1 | -1 |
| 1 | -1 | -1 | 1 | -1 | 1 | -1 | i | 1 | 1 | -1 | -1 | 1 | 1 | 1 | 1 |
| 1 | -1 | -1 | 1 | -1 | 1 | -1 | i | 1 | -1 | -1 | -1 | -1 | -1 | -1 | -i |
| 1 | -1 | -1 | 1 | i | 1 | -1 | -i | -1 | -1 | -1 | -i | 1 | -1 | i |
| 1 | -1 | -1 | 1 | i | i | -1 | -1 | -1 | -1 | 1 | -i | -i | -1 | -1 |
| 1 | -1 | -1 | 1 | -i | -1 | -1 | -1 | -1 | 1 | 1 | i | -1 | -1 | 1 |
| 1 | -1 | -1 | -1 | 1 | 1 | -i | 1 | -1 | 1 | 1 | 1 | 1 | -1 | i |
| 1 | -1 | -1 | -1 | 1 | -1 | i | 1 | 1 | -1 | 1 | i | i | 1 | -i |
| 1 | -1 | -1 | -1 | -1 | -1 | 1 | 1 | 1 | -1 | 1 | -i | -1 | -1 | 1 | i |
| 1 | -1 | -1 | -1 | i | -1 | -i | -1 | 1 | -1 | 1 | -1 | -i | -1 | i |
| 1 | -1 | -1 | -1 | i | 1 | 1 | -1 | 1 | -1 | 1 | -i | -i | 1 | -i |
| 1 | -1 | -1 | -1 | -i | -1 | -i | -1 | 1 | 1 | 1 | 1 | -1 | 1 | 1 |
| 1 | -1 | -1 | i | 1 | i | 1 | -1 | 1 | 1 | -i | 1 | -i | i | 1 |
| 1 | -1 | -1 | i | -1 | -1 | -1 | -1 | 1 | 1 | -i | -i | -1 | -i | 1 |
| 1 | -1 | -1 | i | -1 | -1 | -1 | 1 | 1 | -1 | -i | -1 | -1 | 1 | -1 |
| 1 | -1 | -1 | i | i | -1 | 1 | 1 | 1 | -1 | -i | -1 | -1 | 1 | -1 |
| 1 | -1 | -1 | i | -i | i | -1 | -1 | -1 | 1 | -i | 1 | 1 | -1 | 1 |
| 1 | -1 | -1 | -i | i | 1 | 1 | 1 | 1 | i | 1 | i | 1 | i |
| 1 | -1 | -1 | -1 | -1 | -1 | -1 | 1 | 1 | i | -1 | -1 | 1 | 1 |
| 1 | -1 | -1 | -i | -1 | -1 | 1 | -i | 1 | 1 | -i | -1 | i | -1 | -i |
| 1 | -1 | -1 | -i | i | -i | i | -1 | 1 | 1 | -i | -i | -i | -i | i |

| | | | | | | | | | | | | | | | |
|---|---|---|---|---|---|---|---|---|---|---|---|---|---|---|---|
| 1 | -1 | -1 | -i | i | i | -1 | 1 | -1 | 1 | -i | -i | -i | -1 | i |
| 1 | -1 | -1 | -1 | -i | -1 | -i | 1 | -1 | 1 | -i | i | -1 | 1 | i |
| 1 | -1 | i | 1 | 1 | 1 | -1 | -i | 1 | -1 | -i | -1 | 1 | 1 | i |
| 1 | -1 | i | 1 | 1 | -i | -i | -1 | 1 | 1 | 1 | -1 | -1 | i | -i |
| 1 | -1 | i | 1 | -1 | i | i | 1 | 1 | 1 | -1 | -1 | -i | i | -i |
| 1 | -1 | i | 1 | i | 1 | 1 | -1 | -1 | -i | 1 | -1 | 1 | -1 | 1 |
| 1 | -1 | i | 1 | i | i | i | -1 | -1 | 1 | 1 | -1 | -i | i | -1 |
| 1 | -1 | i | -1 | 1 | 1 | -i | 1 | -1 | -1 | 1 | 1 | 1 | 1 | 1 | -i |
| 1 | -1 | i | -1 | 1 | -i | 1 | 1 | 1 | -1 | -1 | 1 | i | 1 | -1 |
| 1 | -1 | i | -1 | -1 | 1 | 1 | -1 | 1 | -1 | -1 | 1 | 1 | -i | 1 |
| 1 | -1 | i | -1 | -i | 1 | 1 | 1 | 1 | -i | -1 | -1 | -i | 1 | -1 |
| 1 | -1 | i | -i | i | 1 | 1 | -1 | -1 | -1 | -1 | -1 | 1 | -1 | -1 |
| 1 | -1 | i | -1 | i | 1 | -i | -1 | -1 | 1 | i | -1 | -i | -1 | -1 |

TABLE 9-continued

| | | | | | | | | | | | | | | | |
|---|---|---|---|---|---|---|---|---|---|---|---|---|---|---|---|
| 1 | -1 | i | i | 1 | 1 | 1 | -1 | 1 | -1 | -i | -i | 1 | 1 | -1 | 1 |
| 1 | -1 | i | 1 | 1 | -1 | 1 | -1 | 1 | 1 | -1 | 1 | 1 | 1 | -1 | -1 |
| 1 | -1 | i | 1 | -1 | -1 | i | 1 | 1 | 1 | i | -i | -1 | i | 1 | -1 |
| 1 | -1 | i | 1 | i | -1 | -i | -1 | 1 | 1 | -1 | -1 | -1 | -1 | -1 | -1 |
| 1 | -1 | i | 1 | -i | 1 | i | -1 | -1 | -1 | i | -i | 1 | 1 | i | 1 |
| 1 | -1 | i | -i | 1 | 1 | -1 | -1 | 1 | -1 | -1 | i | 1 | 1 | 1 | 1 |
| 1 | -1 | i | -1 | -1 | -1 | -1 | -1 | 1 | -1 | -i | 1 | -1 | -1 | 1 | 1 |
| 1 | -1 | i | -i | 1 | 1 | 1 | -1 | 1 | -1 | 1 | i | -i | 1 | 1 | 1 |
| 1 | -1 | i | -1 | -i | 1 | i | -1 | 1 | -1 | 1 | 1 | 1 | i | 1 | -1 |
| 1 | -1 | i | -i | -i | -1 | -i | -1 | 1 | 1 | i | -i | i | i | -1 | -i |
| 1 | -1 | -1 | 1 | 1 | 1 | i | i | 1 | 1 | -i | -1 | 1 | -1 | i | -i |
| 1 | -1 | -i | 1 | -1 | -1 | -1 | 1 | 1 | -1 | i | -1 | -1 | -1 | 1 | -i |
| 1 | -1 | -1 | -i | -i | 1 | -i | -i | -1 | -1 | 1 | -i | i | 1 | i | -i |
| 1 | -1 | -1 | -i | -i | -i | -1 | i | -1 | 1 | -1 | -i | i | i | -1 | i |
| 1 | -1 | i | 1 | 1 | i | -1 | i | 1 | 1 | i | -1 | 1 | -i | -i | -i |
| 1 | -1 | i | 1 | -1 | -1 | -1 | -1 | 1 | -1 | -i | -1 | -1 | -1 | 1 | 1 |
| 1 | -1 | i | 1 | -1 | -i | 1 | 1 | 1 | 1 | -i | 1 | -1 | i | -1 | 1 |
| 1 | -1 | i | 1 | 1 | -1 | 1 | -1 | -1 | -1 | -i | 1 | -1 | -1 | -1 | -1 |
| 1 | -1 | i | 1 | -1 | 1 | i | 1 | -1 | -1 | i | -1 | 1 | 1 | i | -i |
| 1 | -1 | i | 1 | -1 | -1 | i | -1 | 1 | 1 | 1 | 1 | 1 | i | i | 1 |
| 1 | -1 | i | -1 | 1 | i | -1 | -i | 1 | 1 | 1 | 1 | 1 | -i | -i | i |
| 1 | -1 | i | -1 | -1 | -1 | 1 | -i | 1 | -1 | -i | 1 | -1 | -1 | -1 | 1 |
| 1 | -1 | i | -1 | -i | 1 | -1 | 1 | 1 | -i | 1 | -1 | -1 | i | -1 | -1 |
| 1 | -1 | i | -1 | 1 | -1 | i | 1 | -1 | -1 | i | 1 | -1 | -1 | -1 | -i |
| 1 | -1 | i | -1 | -1 | 1 | 1 | -1 | -1 | 1 | i | 1 | -1 | 1 | i | i |
| 1 | -1 | i | i | 1 | i | -1 | -1 | 1 | 1 | -i | i | 1 | -i | 1 | -i |
| 1 | -1 | i | i | -1 | -1 | -1 | 1 | 1 | -1 | -i | -1 | -1 | -1 | 1 | -1 |
| 1 | -1 | i | i | 1 | 1 | 1 | -1 | 1 | -1 | 1 | 1 | -i | -1 | -i | -i |
| 1 | -1 | i | i | -i | -1 | 1 | -1 | 1 | i | i | i | i | -i | i |
| 1 | -1 | i | -i | 1 | i | -1 | i | 1 | 1 | i | i | 1 | -i | -i | -1 |
| 1 | -1 | i | -i | -1 | i | 1 | 1 | 1 | 1 | i | 1 | -1 | -i | 1 | -1 |
| 1 | -1 | i | -i | 1 | i | -i | -i | -1 | 1 | -i | -i | -i | -i | -i | -i |
| 1 | -1 | i | -1 | -i | -i | 1 | -1 | -1 | i | i | 1 | -1 | -i | -1 |
| 1 | -1 | -i | 1 | 1 | 1 | -1 | i | 1 | -1 | i | -1 | 1 | 1 | 1 | -i |
| 1 | -1 | -i | 1 | 1 | -1 | 1 | -1 | 1 | 1 | -i | -1 | 1 | i | i | i |
| 1 | -1 | -1 | 1 | -1 | i | -1 | 1 | 1 | 1 | -1 | -1 | -1 | -1 | -i | -i |
| 1 | -1 | -i | 1 | -1 | -1 | -1 | -i | 1 | 1 | -i | -1 | -1 | i | -i | i |
| 1 | -1 | -i | 1 | i | -1 | i | -i | -1 | -1 | -i | -1 | -i | -1 | i | i |
| 1 | -1 | -i | 1 | -1 | -i | i | 1 | -1 | -1 | -i | -1 | 1 | -i | -1 |
| 1 | -1 | -i | 1 | -i | i | 1 | -1 | -1 | -i | -1 | 1 | i | i | -1 |
| 1 | -1 | -i | -1 | 1 | i | i | -i | 1 | 1 | -i | 1 | 1 | -i | i | i |
| 1 | -1 | -i | -1 | -1 | i | 1 | -1 | 1 | 1 | i | -1 | -1 | -i | -1 | -1 |
| 1 | -1 | -i | -1 | i | 1 | -1 | 1 | 1 | 1 | i | -1 | -1 | -i | -1 | -1 |
| 1 | -1 | -i | i | 1 | i | -1 | -1 | 1 | 1 | i | -1 | -i | 1 | -1 | 1 |
| 1 | -1 | -i | -1 | 1 | i | 1 | -1 | -1 | 1 | -1 | -1 | -1 | -1 | -1 |
| 1 | -1 | -1 | 1 | i | 1 | -i | -1 | -1 | -1 | -i | -i | -1 | 1 | -i | i |
| 1 | -1 | -1 | 1 | i | 1 | -i | -1 | 1 | 1 | -i | 1 | -i | -1 | -1 | -1 |
| 1 | -1 | -i | 1 | -i | -1 | 1 | -1 | -1 | -1 | i | 1 | 1 | -1 | -1 | -1 |
| 1 | -1 | -i | -1 | 1 | 1 | 1 | i | 1 | -1 | i | 1 | 1 | 1 | -i | -i |
| 1 | -1 | -i | -1 | -1 | -1 | 1 | i | -1 | 1 | -i | -1 | -1 | -1 | -1 | -1 |
| 1 | -1 | -i | -1 | -1 | -i | -1 | -1 | 1 | -i | -1 | -1 | i | 1 | 1 | -1 |
| 1 | -1 | -i | -1 | i | -i | -1 | -1 | 1 | 1 | i | -1 | -i | i | 1 | -1 |
| 1 | -1 | -1 | -1 | -i | 1 | 1 | -1 | -1 | 1 | -1 | 1 | 1 | -1 | -1 |
| 1 | -1 | -i | 1 | -i | 1 | 1 | 1 | 1 | -i | -1 | i | i | 1 | -1 |
| 1 | -1 | -i | i | -1 | -i | -1 | 1 | 1 | 1 | -i | -i | -1 | i | i | -1 |
| 1 | -1 | -i | i | i | -1 | i | 1 | -1 | -1 | -i | -i | -i | -1 | i | -1 |
| 1 | -1 | -i | i | -i | 1 | -i | -1 | -1 | -i | -i | i | 1 | -i | 1 |
| 1 | -1 | -i | -i | -i | -i | -i | -1 | 1 | -i | 1 | -i | i | 1 | -i | 1 |
| 1 | -1 | -i | -i | 1 | -i | 1 | -1 | -1 | -i | i | i | 1 | -i | 1 |
| 1 | -1 | -i | -i | -1 | 1 | -1 | -1 | 1 | -1 | -1 | 1 | 1 | -1 | 1 |
| 1 | i | 1 | 1 | 1 | -1 | -1 | -1 | 1 | -i | -1 | 1 | 1 | 1 | -1 |
| 1 | i | 1 | 1 | -1 | 1 | 1 | 1 | 1 | -i | -1 | 1 | -1 | -1 | -i | 1 |
| 1 | i | 1 | 1 | -1 | i | -i | i | 1 | i | -1 | -1 | -1 | i | i | -i |
| 1 | i | 1 | 1 | i | -1 | 1 | -i | 1 | 1 | -1 | -1 | -i | i | -i | -1 |
| 1 | i | 1 | 1 | 1 | -i | i | 1 | -1 | 1 | i | -1 | 1 | i | -i | -1 |
| 1 | i | 1 | -1 | 1 | -i | -i | -i | 1 | -1 | 1 | 1 | -i | i | i |
| 1 | i | 1 | -1 | -1 | -1 | -i | -1 | 1 | -i | -1 | -1 | -1 | 1 | i | -1 |
| 1 | i | 1 | -1 | i | 1 | i | 1 | 1 | -1 | 1 | 1 | -1 | i | -1 | -i |
| 1 | i | 1 | -1 | -i | -1 | 1 | -1 | 1 | -1 | -1 | -1 | i | -1 | 1 | i |
| 1 | i | 1 | i | 1 | i | -1 | 1 | 1 | -i | 1 | -i | i | i |
| 1 | i | 1 | i | -1 | -1 | 1 | -1 | -i | 1 | -1 | 1 | i | -1 | -i |
| 1 | i | 1 | i | -1 | i | 1 | -1 | 1 | -1 | -1 | -i | 1 | -1 | i | -1 |
| 1 | i | 1 | i | -i | 1 | 1 | -1 | 1 | -i | 1 | 1 | i | -1 | 1 | 1 |
| 1 | i | 1 | i | -1 | -i | -i | 1 | -i | 1 | 1 | -i | 1 | i |
| 1 | i | 1 | i | 1 | -1 | 1 | -1 | 1 | -i | 1 | -i | -1 | -1 | 1 | 1 |

TABLE 9-continued

| | | | | | | | | | | | | | | | |
|---|---|---|---|---|---|---|---|---|---|---|---|---|---|---|---|
| 1 | -1 | -1 | i | -1 | -1 | -1 | -1 | 1 | -1 | i | -i | -1 | -1 | 1 | 1 |
| 1 | -1 | -i | i | i | 1 | -i | 1 | -1 | -1 | -i | -i | -i | 1 | -i | -1 |
| 1 | -1 | -i | i | i | i | -i | -i | -1 | 1 | -i | i | -i | -i | -i | -i |
| 1 | -1 | -i | i | -i | -1 | i | -1 | -1 | -i | -i | i | -1 | i | 1 |
| 1 | -1 | -i | -i | 1 | 1 | -1 | 1 | 1 | -1 | i | i | 1 | 1 | 1 | -1 |
| 1 | -1 | -i | -i | 1 | -i | -1 | i | 1 | 1 | i | -i | 1 | 1 | 1 | i |
| 1 | -1 | -i | -1 | -1 | i | -i | 1 | 1 | 1 | -i | i | -1 | -1 | -i | -1 |
| 1 | -1 | -i | -i | i | i | -i | i | -1 | 1 | -i | -i | -i | -i | -1 | 1 |
| 1 | -1 | -i | -i | -i | -1 | i | 1 | -1 | -1 | i | i | -1 | i | i | -1 |
| 1 | i | 1 | 1 | 1 | 1 | i | -1 | 1 | -i | -1 | 1 | 1 | -1 | -i | -1 |
| 1 | i | 1 | 1 | 1 | -1 | -i | 1 | 1 | 1 | -1 | -1 | 1 | -i | 1 | -i |
| 1 | i | 1 | 1 | -1 | -1 | -i | 1 | 1 | -i | -1 | 1 | -1 | 1 | i | 1 |
| 1 | i | 1 | 1 | i | i | -1 | -i | -1 | 1 | 1 | -1 | -i | i | -1 | 1 |
| 1 | i | 1 | 1 | -i | -1 | 1 | -1 | -1 | 1 | 1 | 1 | i | 1 | 1 | -1 |
| 1 | i | 1 | -1 | 1 | -1 | -i | 1 | 1 | -i | -1 | -1 | 1 | 1 | 1 | 1 |
| 1 | i | 1 | -1 | -1 | 1 | i | -1 | 1 | -i | -1 | -1 | -1 | -1 | -i | -1 |
| 1 | i | 1 | -1 | -1 | i | -i | -1 | i | 1 | -1 | -1 | i | 1 | i | i |
| 1 | i | 1 | -1 | i | -i | 1 | i | -1 | 1 | 1 | -i | -i | 1 | 1 | -i |
| 1 | i | 1 | -1 | -1 | i | -1 | -i | -1 | i | 1 | 1 | i | i | -1 | i |
| 1 | i | 1 | i | 1 | -1 | -1 | 1 | i | 1 | -i | 1 | -1 | -1 | 1 | 1 |
| 1 | i | 1 | i | 1 | -i | i | 1 | 1 | 1 | -1 | i | 1 | -i | -i | -1 |
| 1 | i | 1 | i | -1 | -1 | 1 | 1 | 1 | -i | 1 | -i | -1 | 1 | 1 | -1 |

| | | | | | | | | | | | | | | | |
|---|---|---|---|---|---|---|---|---|---|---|---|---|---|---|---|
| 1 | i | 1 | i | -1 | 1 | 1 | 1 | i | -1 | -i | -1 | i | -1 | -1 | -1 |
| 1 | i | 1 | i | 1 | -1 | 1 | -1 | -1 | 1 | -i | -i | i | -1 | -1 | 1 |
| 1 | i | 1 | i | -i | -1 | 1 | -1 | -1 | -1 | 1 | i | i | 1 | 1 | -i |
| 1 | i | 1 | i | -i | -i | 1 | -1 | -1 | i | 1 | -i | i | -i | 1 | 1 |
| 1 | i | 1 | -i | 1 | -1 | -1 | -1 | -i | 1 | 1 | 1 | 1 | -1 | 1 | i |
| 1 | i | 1 | -i | -1 | 1 | 1 | 1 | 1 | -i | 1 | i | -1 | -1 | 1 | -1 |
| 1 | i | 1 | -i | -1 | -1 | i | 1 | -1 | -1 | 1 | -1 | -1 | i | -1 | -i |
| 1 | i | 1 | -i | i | i | -1 | -1 | -1 | i | 1 | i | -i | i | -1 | 1 |
| 1 | i | 1 | -i | -i | -1 | 1 | i | -1 | i | 1 | -i | i | 1 | 1 | i |
| 1 | i | 1 | -i | i | -1 | 1 | i | 1 | 1 | 1 | i | -i | i | -1 | -1 |
| 1 | i | -1 | 1 | 1 | -1 | 1 | -i | 1 | -i | -1 | -1 | 1 | 1 | 1 | i |
| 1 | i | -1 | 1 | -1 | -1 | i | 1 | -i | -1 | -1 | -1 | -1 | -1 | -1 | -i |
| 1 | i | -1 | 1 | -1 | i | i | 1 | i | 1 | -1 | -1 | i | -i | -i | -i |
| 1 | i | -1 | 1 | i | i | -1 | -1 | i | 1 | 1 | -i | i | -i | -i | -1 |
| 1 | i | -1 | 1 | -i | -1 | -1 | -1 | i | 1 | 1 | -i | i | 1 | 1 | -i |
| 1 | i | -1 | -i | -1 | -1 | i | 1 | i | -1 | -1 | i | -1 | -1 | -1 | -i |
| 1 | i | -1 | -i | -i | -1 | i | -1 | i | -1 | 1 | -i | -1 | -1 | -i | -i |
| 1 | i | -1 | -1 | 1 | -1 | i | 1 | -i | 1 | 1 | 1 | -i | 1 | -i | 1 |
| 1 | i | -1 | -1 | -1 | -i | -1 | -i | -1 | -i | 1 | -1 | -1 | -1 | i | -1 |
| 1 | i | -1 | -1 | i | -i | 1 | 1 | 1 | -1 | 1 | -1 | -i | i | -i | 1 |
| 1 | i | -1 | -1 | i | -i | -1 | 1 | i | -1 | 1 | -1 | -i | i | -i | -1 |
| 1 | i | -1 | -1 | -i | i | 1 | -i | -1 | -1 | 1 | 1 | i | -i | 1 | 1 |

| | | | | | | | | | | | | | | | |
|---|---|---|---|---|---|---|---|---|---|---|---|---|---|---|---|
| 1 | i | 1 | i | i | 1 | 1 | -i | -1 | -i | 1 | i | -i | -1 | 1 | -i |
| 1 | i | 1 | i | i | -1 | 1 | 1 | -1 | i | 1 | -i | -1 | -i | 1 | -1 |
| 1 | i | 1 | i | -i | 1 | -1 | -1 | -1 | i | 1 | -i | i | i | -1 | 1 |
| 1 | i | 1 | -i | 1 | 1 | -1 | 1 | -i | 1 | B2 | 1 | -1 | -1 | -1 |
| 1 | i | 1 | -i | 1 | -i | i | 1 | 1 | -1 | 1 | i | 1 | -1 | -1 | 1 |
| 1 | i | 1 | -i | -1 | -1 | 1 | -1 | 1 | -i | 1 | i | -1 | 1 | 1 | 1 |
| 1 | i | 1 | -i | i | 1 | 1 | i | -1 | -i | 1 | -i | -i | -1 | 1 | i |
| 1 | i | 1 | -i | i | -i | 1 | -1 | -1 | i | 1 | i | -i | -i | 1 | 1 |
| 1 | i | 1 | -i | -i | i | -1 | 1 | -1 | 1 | 1 | i | i | i | -1 | -i |
| 1 | i | -1 | 1 | 1 | 1 | 1 | i | 1 | -i | -1 | 1 | 1 | i | 1 | -i |
| 1 | i | -1 | 1 | 1 | -i | i | i | 1 | i | -1 | 1 | -1 | -i | -1 |
| 1 | i | -1 | 1 | -1 | -1 | -1 | -1 | i | -1 | -1 | -1 | 1 | -1 | -1 |
| 1 | i | -1 | 1 | i | 1 | -1 | -1 | -i | -1 | 1 | i | -1 | -1 | -1 | -1 |
| 1 | i | -1 | 1 | i | -i | i | -1 | -1 | -i | 1 | -i | -1 | -1 | -i | -1 |
| 1 | i | -1 | 1 | -i | i | 1 | i | -1 | -1 | 1 | -i | -1 | -i | -1 | -1 |
| 1 | i | -1 | -1 | 1 | 1 | 1 | -i | 1 | -i | -1 | 1 | 1 | -1 | 1 | i |
| 1 | i | -1 | -1 | 1 | -i | -i | 1 | 1 | 1 | 1 | 1 | -i | i | -i |
| 1 | i | -1 | -1 | -1 | -1 | -1 | 1 | -i | -1 | -1 | -1 | -1 | i | -1 | -1 |
| 1 | i | -1 | -1 | i | -1 | 1 | i | -i | -1 | -1 | -1 | 1 | -i | -1 | 1 |
| 1 | i | -1 | -1 | i | -i | i | -1 | i | -1 | -1 | -i | -1 | -i | -1 | -1 |
| 1 | i | -1 | -1 | -i | -i | -1 | -i | 1 | -1 | -1 | i | -i | -1 | -1 | i |

| | | | | | | | | | | | | | | | |
|---|---|---|---|---|---|---|---|---|---|---|---|---|---|---|---|
| 1 | i | -1 | i | 1 | 1 | 1 | -1 | 1 | -i | -1 | -1 | 1 | -1 | 1 | 1 |
| 1 | i | -1 | i | 1 | -i | i | -1 | 1 | i | 1 | -i | 1 | -i | -i | 1 |
| 1 | i | -1 | i | -1 | -1 | i | i | 1 | -i | 1 | 1 | -1 | 1 | -1 | i |
| 1 | i | -1 | i | i | 1 | -1 | i | -i | 1 | -1 | -1 | -1 | -1 | -1 | -i |
| 1 | i | -1 | i | i | i | 1 | -i | i | 1 | -i | -i | -i | -1 | -1 | -i |
| 1 | i | -1 | i | -i | -i | -1 | -1 | -1 | -1 | i | -i | i | -i | -1 | 1 |
| 1 | i | -1 | -i | 1 | -1 | 1 | -1 | -i | 1 | 1 | 1 | 1 | 1 | 1 | 1 |
| 1 | i | -1 | -i | -1 | -1 | 1 | i | -1 | -1 | -1 | i | 1 | i | -1 | -1 |
| 1 | i | -1 | -i | 1 | i | i | 1 | 1 | 1 | 1 | i | -1 | i | -i | -1 |
| 1 | i | -1 | -i | i | i | i | -1 | 1 | 1 | i | -i | i | -i | i | i |
| 1 | i | -1 | -i | -i | 1 | -i | -1 | -i | -1 | 1 | i | 1 | -1 | -i |
| 1 | i | -1 | -i | -i | -i | -1 | 1 | -1 | i | -i | i | -i | -1 | -1 |
| 1 | i | i | 1 | i | -i | 1 | -1 | 1 | -i | -i | 1 | 1 | 1 | -1 | -1 |

TABLE 9-continued

| | | | | | | | | | | | | | | | |
|---|---|---|---|---|---|---|---|---|---|---|---|---|---|---|---|
| 1 | i | i | 1 | -1 | 1 | -1 | 1 | 1 | -i | -i | -1 | -1 | -1 | 1 | 1 |
| 1 | i | i | 1 | -1 | i | 1 | i | 1 | i | -i | i | -1 | i | -1 | -i |
| 1 | i | i | 1 | i | i | 1 | -1 | -1 | i | -i | i | -i | i | -1 | -1 |
| 1 | i | i | 1 | -i | i | -i | i | -1 | i | i | i | i | i | -i | -i |
| 1 | i | i | -1 | 1 | -1 | 1 | 1 | 1 | -i | -i | 1 | 1 | 1 | -1 | 1 |
| 1 | i | i | -1 | -1 | 1 | -1 | -1 | 1 | -i | -i | -1 | -1 | -1 | 1 | -1 |
| 1 | i | i | -1 | -1 | i | 1 | -i | 1 | 1 | -i | 1 | -1 | 1 | -1 | i |
| 1 | i | i | -1 | i | i | -i | i | -1 | i | i | i | -i | i | -i | -i |
| 1 | i | i | -1 | -i | -i | -i | -i | -1 | -i | i | 1 | i | 1 | -i | -1 |
| 1 | i | -1 | i | 1 | -1 | 1 | 1 | 1 | -i | -1 | -i | 1 | 1 | 1 | -1 |
| 1 | i | -1 | i | -1 | 1 | -i | i | 1 | -i | 1 | i | -1 | -1 | i | i |
| 1 | i | -1 | i | -1 | 1 | -i | 1 | 1 | 1 | -i | -1 | -1 | i | i | 1 |
| 1 | i | -1 | i | i | i | -i | -1 | i | 1 | 1 | -i | i | -i | -i | -i |
| 1 | i | -1 | i | -i | -1 | -i | -1 | -i | -1 | i | i | 1 | -1 | -i |
| 1 | i | -1 | -i | 1 | 1 | 1 | 1 | 1 | -i | -1 | i | i | -1 | 1 | -1 |
| 1 | i | -1 | -i | 1 | i | 1 | 1 | 1 | -i | -1 | i | i | -i | -i | -1 |
| 1 | i | -1 | -i | -1 | -1 | -1 | -1 | 1 | -i | -1 | i | -1 | -1 | -1 | 1 |
| 1 | i | -1 | -i | i | 1 | 1 | -i | -1 | -1 | -i | -i | -i | -1 | 1 | -i |
| 1 | i | -1 | -i | i | -i | -i | -1 | 1 | i | 1 | -i | -i | -i | -i | -i |
| 1 | i | -1 | -i | -1 | i | -i | -1 | -1 | i | -1 | -1 | -1 | 1 | 1 | -1 |
| 1 | i | i | 1 | 1 | 1 | -1 | -1 | 1 | -i | -i | 1 | 1 | -1 | -1 | 1 |
| 1 | i | i | 1 | 1 | -i | 1 | i | 1 | i | -i | 1 | -i | -1 | -1 | -1 |
| 1 | i | i | 1 | -1 | -1 | 1 | 1 | 1 | -i | -i | 1 | -1 | 1 | -1 | 1 |
| 1 | i | i | i | i | i | -1 | -1 | 1 | i | -i | 1 | -i | i | -1 | i |
| 1 | i | i | 1 | i | i | -i | 1 | 1 | i | -i | 1 | -i | -1 | i | -1 |
| 1 | i | i | -1 | 1 | 1 | -1 | 1 | 1 | -i | -i | -1 | 1 | -1 | 1 | 1 |
| 1 | i | i | -1 | 1 | -i | 1 | -i | 1 | -i | -i | 1 | -i | -1 | -1 | i |
| 1 | i | i | -1 | -1 | 1 | -1 | -i | 1 | -i | -i | -i | -1 | 1 | 1 | -i |
| 1 | i | i | -1 | i | i | 1 | -i | 1 | -i | i | -1 | i | 1 | -1 | i |
| 1 | i | i | -1 | -1 | i | -i | -1 | 1 | -i | -i | -1 | -1 | 1 | -1 | -1 |
| 1 | i | i | -1 | -i | -i | 1 | -1 | 1 | -i | i | -1 | -i | 1 | -1 | -i |
| 1 | i | i | -1 | -i | -1 | 1 | 1 | 1 | -i | -i | -i | i | -i | -1 | -1 |
| 1 | i | i | -1 | -i | -i | -i | i | 1 | i | i | -1 | -i | i | -1 | -i |
| 1 | i | -i | 1 | 1 | -1 | i | -i | 1 | -i | -i | -1 | 1 | 1 | i | i |
| 1 | i | -i | 1 | -1 | -1 | -1 | 1 | 1 | -i | i | 1 | -1 | -1 | i | 1 |
| 1 | i | -i | 1 | -1 | i | -i | i | 1 | -i | i | 1 | 1 | -1 | -1 | 1 |
| 1 | i | -i | 1 | i | i | -1 | i | 1 | -i | i | 1 | 1 | -1 | -i | i |
| 1 | i | -i | 1 | -i | 1 | -i | i | 1 | i | i | -i | i | i | i | -1 |
| 1 | i | -i | 1 | -i | -i | -i | i | 1 | -i | -i | -i | -1 | i | i | -i |
| 1 | i | -i | -1 | 1 | 1 | -1 | 1 | 1 | -i | -i | -1 | 1 | 1 | i | -i |
| 1 | i | -i | -1 | -1 | -1 | -i | -1 | 1 | -i | -i | -1 | -1 | -i | -1 | i |
| 1 | i | -i | -1 | i | -1 | -1 | -1 | 1 | i | -i | -1 | -1 | 1 | i | 1 |
| 1 | i | -i | -i | 1 | 1 | 1 | -1 | 1 | i | i | -i | 1 | i | -i | -i |
| 1 | i | -i | 1 | 1 | -1 | i | -i | 1 | -i | -i | -1 | 1 | 1 | i | i |
| 1 | i | -i | 1 | -1 | -1 | -1 | 1 | 1 | -i | 1 | -1 | 1 | 1 | 1 | 1 |
| 1 | i | -i | 1 | -1 | i | 1 | -i | 1 | i | i | -1 | -1 | 1 | -i | -1 |
| 1 | i | -i | 1 | -1 | i | i | -1 | 1 | i | -i | -i | 1 | i | 1 | -1 |
| 1 | i | -i | 1 | i | i | i | -i | 1 | -i | i | -i | i | -1 | -i | -i |
| 1 | i | -i | 1 | -i | -i | i | -1 | 1 | -i | 1 | 1 | 1 | -i | -i | -i |
| 1 | i | -i | -1 | 1 | -i | i | -1 | 1 | -i | -i | 1 | 1 | 1 | -i | -1 |
| 1 | i | -i | -1 | 1 | -i | -1 | -1 | 1 | i | -1 | 1 | -1 | i | 1 | i |
| 1 | i | -i | -1 | -1 | -i | 1 | -1 | 1 | -i | -1 | 1 | 1 | -1 | -i | -1 |
| 1 | i | -i | -1 | -i | -i | 1 | -i | 1 | -i | -1 | -1 | 1 | -i | -i | -i |
| 1 | i | -i | i | -i | -i | 1 | i | 1 | -i | i | -i | -1 | -1 | -i | -1 |
| 1 | i | -i | i | -i | -i | -1 | -i | 1 | -i | i | -1 | -1 | -i | -i | -1 |
| 1 | i | -i | -i | 1 | -1 | -1 | -i | 1 | -i | i | -1 | -1 | 1 | 1 | i |
| 1 | i | -i | -i | -1 | -1 | -1 | -i | 1 | -i | i | -1 | -1 | 1 | 1 | -i |

TABLE 9-continued

| | | | | | | | | | | | | | | | |
|---|---|---|---|---|---|---|---|---|---|---|---|---|---|---|---|
| 1 | i | −i | −i | i | 1 | −i | i | −1 | −i | −1 | −i | −i | −1 | −i | i |
| 1 | i | −i | −i | i | −i | −i | −1 | −1 | i | −i | i | −i | −i | −i | 1 |
| 1 | i | −i | −i | −i | i | i | 1 | −1 | i | −i | i | i | i | i | −1 |
| 1 | −i | 1 | 1 | 1 | 1 | −i | −1 | 1 | i | −1 | 1 | 1 | −1 | i | −1 |
| 1 | −i | 1 | 1 | 1 | i | −i | i | 1 | −i | −1 | −1 | 1 | i | i | −i |
| 1 | −i | 1 | 1 | −1 | −i | −i | i | 1 | −i | −1 | −1 | −1 | −i | 1 | −i |
| 1 | −i | 1 | 1 | i | −i | −1 | −i | −1 | −i | 1 | −1 | −i | −i | −1 | i |
| 1 | i | −i | 1 | i | 1 | −i | −1 | −1 | −i | −i | 1 | −i | −1 | −i | −1 |
| 1 | i | −i | 1 | i | −i | −i | −1 | −1 | i | −i | −1 | −1 | −i | −i | i |
| 1 | i | −i | 1 | −i | 1 | i | 1 | −1 | i | −i | −1 | 1 | 1 | i | −1 |
| 1 | i | −i | −1 | 1 | 1 | i | −i | 1 | −i | −i | 1 | 1 | −1 | i | i |
| 1 | i | −i | −1 | 1 | −i | i | 1 | 1 | i | i | 1 | 1 | −i | −1 | −i |
| 1 | i | −i | −1 | −1 | −1 | −1 | −1 | 1 | i | i | −1 | −1 | 1 | 1 | −1 |
| 1 | i | −i | −1 | i | 1 | i | −1 | −1 | −i | −i | −1 | −1 | −1 | i | −1 |
| 1 | i | −i | −1 | i | −i | −i | i | 1 | −i | −i | 1 | −i | −i | −i | −i |
| 1 | i | −i | −1 | −i | −i | 1 | −1 | −1 | −i | 1 | 1 | 1 | i | −1 | −i |
| 1 | i | −i | i | 1 | −1 | i | 1 | 1 | −i | −i | −i | i | 1 | 1 | −1 |
| 1 | i | −i | i | −1 | 1 | −i | −1 | 1 | −i | −i | −i | −1 | −1 | −i | 1 |
| 1 | i | −i | i | −1 | i | −1 | −1 | 1 | 1 | 1 | −i | −1 | 1 | 1 | 1 |
| 1 | i | −i | i | i | i | 1 | 1 | 1 | −i | −i | −1 | 1 | 1 | 1 | 1 |
| 1 | i | −i | i | −i | −1 | −i | −1 | −i | −i | i | i | 1 | −i | −i | −i |
| 1 | i | −i | −i | 1 | 1 | 1 | i | 1 | −i | i | −i | 1 | −1 | −1 | i |
| 1 | i | −i | −i | −1 | 1 | 1 | −i | 1 | −i | i | −i | −1 | −1 | −1 | −i |
| 1 | i | −i | −i | −1 | i | −1 | −1 | i | −i | i | i | 1 | 1 | i | −1 |
| 1 | i | −i | −i | 1 | −1 | i | −1 | 1 | −i | −i | i | 1 | 1 | i | 1 |
| 1 | i | −i | −i | −i | −i | i | −1 | −i | −i | −i | i | 1 | −i | i | i |
| 1 | i | −i | −i | −i | −i | 1 | −1 | i | −i | i | 1 | 1 | −i | −i | −1 |
| 1 | −i | 1 | 1 | −1 | i | −1 | 1 | 1 | −1 | 1 | 1 | 1 | −i | −1 | 1 |
| 1 | −i | 1 | 1 | −1 | 1 | −i | 1 | 1 | −1 | 1 | 1 | −1 | −1 | 1 | 1 |
| 1 | −i | 1 | 1 | i | −1 | 1 | 1 | −1 | 1 | 1 | −i | 1 | −1 | 1 | 1 |
| 1 | −i | 1 | 1 | −i | 1 | −i | 1 | −1 | 1 | 1 | −i | 1 | −1 | 1 | 1 |
| 1 | −i | 1 | 1 | −i | 1 | 1 | −1 | −1 | i | 1 | 1 | i | −1 | 1 | −1 |

| | | | | | | | | | | | | | | | |
|---|---|---|---|---|---|---|---|---|---|---|---|---|---|---|---|
| 1 | −i | 1 | 1 | −i | i | 1 | i | −1 | 1 | i | i | i | 1 | −i |
| 1 | −i | 1 | −1 | 1 | −1 | −1 | −i | 1 | i | 1 | 1 | 1 | 1 | −1 | i |
| 1 | −i | 1 | −1 | 1 | i | −i | −i | 1 | −i | −1 | 1 | i | i | i | 1 |
| 1 | −i | 1 | −1 | −1 | −1 | i | −1 | 1 | i | −1 | −1 | 1 | 1 | −i | −1 |
| 1 | −i | 1 | −1 | i | 1 | 1 | −1 | −1 | 1 | i | −1 | −i | 1 | 1 | −i |
| 1 | −i | 1 | −1 | −i | i | 1 | −i | −1 | −1 | 1 | i | i | 1 | 1 | i |
| 1 | −i | 1 | i | 1 | 1 | −1 | 1 | 1 | i | 1 | −1 | −1 | −1 | −1 | −1 |
| 1 | −i | 1 | i | 1 | i | 1 | 1 | 1 | −i | −1 | 1 | i | i | −i | −1 |
| 1 | −i | 1 | i | −1 | 1 | −1 | i | 1 | −1 | −1 | −1 | −1 | i | −i | i |
| 1 | −i | 1 | i | −1 | −i | i | 1 | 1 | 1 | −1 | −1 | −i | −i | −i | −1 |
| 1 | −i | 1 | i | i | −1 | i | −1 | i | 1 | −i | 1 | 1 | −1 | i |
| 1 | −i | 1 | i | i | −i | −i | −1 | −i | −1 | −i | −i | −i | i | −i |
| 1 | −i | 1 | i | −i | −i | −1 | −1 | −1 | 1 | i | −i | −1 | −1 | 1 |
| 1 | −i | 1 | −i | 1 | −1 | i | i | 1 | i | 1 | 1 | 1 | −i | i |
| 1 | −i | 1 | −i | −1 | 1 | −1 | −1 | 1 | 1 | −1 | −1 | −1 | −1 | i | −i |
| 1 | −i | 1 | −i | i | −1 | 1 | i | −1 | 1 | −i | 1 | 1 | 1 | i |
| 1 | −i | 1 | −i | −i | −i | −i | −1 | −1 | 1 | −i | −i | −i | −i | 1 | i |
| 1 | −i | −1 | 1 | 1 | 1 | 1 | −i | 1 | i | −1 | 1 | −1 | −1 | 1 | i |
| 1 | −i | −1 | 1 | 1 | 1 | 1 | i | 1 | −i | 1 | 1 | i | i | −i | −i |
| 1 | −i | −1 | 1 | −1 | −1 | −1 | i | 1 | 1 | −1 | 1 | 1 | −1 | −i | −i |
| 1 | −i | −1 | 1 | −1 | −i | −i | −i | 1 | −1 | 1 | −1 | −i | −i | i | i |
| 1 | −i | −1 | 1 | i | −i | 1 | −i | −1 | −1 | −i | −i | −1 | −1 | 1 | i |
| 1 | −i | −1 | 1 | −i | −i | 1 | i | −1 | i | i | −i | 1 | −1 | i |
| 1 | −i | −1 | −1 | 1 | −1 | −i | 1 | 1 | 1 | 1 | 1 | 1 | i | 1 |

| | | | | | | | | | | | | | | | |
|---|---|---|---|---|---|---|---|---|---|---|---|---|---|---|---|
| 1 | −i | 1 | 1 | −i | −i | i | −1 | −1 | −i | −1 | 1 | i | −i | −i | −1 |
| 1 | −i | 1 | −1 | 1 | i | i | i | 1 | −i | −1 | 1 | 1 | i | −i | −i |
| 1 | −i | 1 | −1 | −1 | 1 | −i | −1 | 1 | i | −1 | −1 | −1 | −1 | i | −1 |
| 1 | −i | 1 | −1 | −1 | −i | −i | −i | 1 | i | −1 | −1 | −1 | −1 | −1 | −1 |
| 1 | −i | 1 | −1 | i | −1 | i | −1 | −1 | 1 | 1 | −i | −i | −1 | −i |
| 1 | −i | 1 | −1 | −1 | −i | −1 | −1 | −i | 1 | 1 | i | −i | −1 | i |
| 1 | −i | 1 | i | 1 | −1 | −1 | 1 | i | 1 | −i | 1 | 1 | −1 | 1 |
| 1 | −i | 1 | i | 1 | −i | 1 | 1 | 1 | 1 | 1 | −i | 1 | −1 | −1 | −1 |
| 1 | −i | 1 | i | −1 | −1 | i | 1 | 1 | −i | 1 | −1 | −1 | 1 | −i | i |
| 1 | −i | 1 | i | i | −1 | 1 | −i | −1 | 1 | i | −1 | 1 | 1 | −i |
| 1 | −i | 1 | i | i | 1 | 1 | −1 | −i | −1 | 1 | −1 | 1 | i | i |
| 1 | −i | 1 | −i | 1 | 1 | −i | i | 1 | −i | 1 | 1 | −1 | i | i |
| 1 | −i | 1 | −i | 1 | i | −i | 1 | 1 | −i | i | 1 | 1 | i | −1 |
| 1 | −i | 1 | −i | −1 | −1 | 1 | 1 | 1 | −1 | 1 | −1 | 1 | 1 | −1 |
| 1 | −i | 1 | −i | −i | −i | −1 | 1 | 1 | −1 | 1 | −1 | −1 | −1 | 1 |
| 1 | −i | 1 | −i | −i | 1 | 1 | −1 | −1 | 1 | −i | −1 | −1 | 1 | i |
| 1 | −i | 1 | −i | −i | −i | i | −1 | −i | 1 | i | i | −i | −1 | −1 |
| 1 | −i | 1 | −i | −i | −i | 1 | −1 | −i | 1 | i | i | −1 | −1 | −i | −1 |
| 1 | −i | −1 | 1 | 1 | −1 | 1 | i | 1 | i | −1 | −1 | 1 | 1 | 1 | −i |
| 1 | −i | −1 | 1 | −1 | 1 | −1 | −i | 1 | i | −1 | −1 | −1 | −1 | −1 | i |
| 1 | −i | −1 | 1 | −i | −i | i | i | 1 | −i | 1 | −1 | −1 | −1 | −i | −i |

TABLE 9-continued

| | | | | | | | | | | | | | | | |
|---|---|---|---|---|---|---|---|---|---|---|---|---|---|---|---|
| 1 | −i | −1 | 1 | i | i | −1 | −i | −1 | −i | −1 | −1 | −i | i | −1 | i |
| 1 | −i | −1 | 1 | −i | 1 | −1 | −1 | −1 | i | −1 | 1 | i | −1 | −1 | −1 |
| 1 | −i | −1 | −1 | 1 | 1 | 1 | i | 1 | i | −1 | 1 | 1 | −1 | 1 | −i |
| 1 | −i | −1 | −1 | 1 | i | −i | i | 1 | −i | 1 | 1 | 1 | 1 | i | −i |

| | | | | | | | | | | | | | | | |
|---|---|---|---|---|---|---|---|---|---|---|---|---|---|---|---|
| 1 | −i | −1 | −1 | −1 | 1 | i | −1 | 1 | i | 1 | −1 | −1 | −1 | −i | −1 |
| 1 | −i | −1 | −1 | −1 | −i | −i | i | 1 | −i | 1 | 1 | −1 | −i | i | −i |
| 1 | −i | −1 | −1 | 1 | 1 | 1 | −1 | −i | −1 | 1 | 1 | −1 | 1 | −i | −1 |
| 1 | −i | −1 | −1 | 1 | i | −1 | −1 | −1 | −i | 1 | −1 | 1 | 1 | 1 | 1 |
| 1 | −i | −1 | i | 1 | 1 | i | −1 | 1 | i | 1 | i | 1 | −1 | −i | −i |
| 1 | −i | −1 | i | −1 | 1 | −1 | 1 | 1 | i | −1 | −i | −1 | −1 | −1 | −1 |
| 1 | −i | −1 | i | −1 | −1 | −i | 1 | 1 | −i | 1 | −1 | −1 | −1 | i | −1 |
| 1 | −i | −1 | i | i | i | 1 | −1 | i | 1 | i | 1 | i | −1 | i | 1 |
| 1 | −i | −1 | i | −i | 1 | −1 | −i | i | −1 | i | i | −1 | −1 | −1 | −i |
| 1 | −i | −1 | i | −i | −i | 1 | −1 | −1 | −i | −1 | −i | i | −1 | 1 | 1 |
| 1 | −i | −1 | −i | 1 | −1 | 1 | 1 | 1 | −1 | i | i | 1 | 1 | 1 | −1 |
| 1 | −i | −1 | −i | −1 | −1 | −1 | 1 | 1 | i | −1 | i | −1 | 1 | −1 | 1 |
| 1 | −i | −1 | −i | i | −1 | 1 | 1 | i | 1 | −1 | −i | −i | 1 | −1 | i |
| 1 | −i | −1 | −i | −i | 1 | −1 | −1 | −i | −1 | i | −i | −1 | 1 | 1 | 1 |
| 1 | −i | −1 | −i | −i | i | 1 | 1 | −i | −1 | i | i | 1 | 1 | −1 | 1 |
| 1 | −i | i | 1 | 1 | 1 | 1 | −1 | 1 | −1 | 1 | 1 | 1 | 1 | −1 | 1 |
| 1 | −i | i | 1 | 1 | i | 1 | i | 1 | −i | −1 | −1 | 1 | 1 | −1 | −i |
| 1 | −i | i | 1 | −1 | −1 | i | 1 | 1 | i | i | −1 | −1 | 1 | i | −i |
| 1 | −i | i | 1 | i | −1 | i | −1 | −1 | i | 1 | −i | 1 | i | i | −1 |
| 1 | −i | i | i | 1 | 1 | −1 | −1 | 1 | i | −1 | −i | 1 | −1 | −1 | 1 |
| 1 | −i | i | 1 | −i | i | i | 1 | −1 | −i | 1 | 1 | i | i | −1 | −i |
| 1 | −i | i | −1 | 1 | 1 | −1 | 1 | 1 | i | 1 | 1 | 1 | −1 | −i | −i |
| 1 | −i | i | −1 | 1 | i | 1 | −i | 1 | −i | −1 | 1 | 1 | i | −1 | i |
| 1 | −i | i | −1 | −1 | −1 | −1 | −1 | i | −1 | −i | −1 | 1 | 1 | 1 | −1 |
| 1 | −i | i | i | −1 | 1 | −1 | 1 | 1 | −i | 1 | −1 | −i | 1 | 1 | 1 |
| 1 | −i | i | i | −1 | i | 1 | −1 | 1 | −i | −1 | −i | −1 | −1 | 1 | 1 |
| 1 | −i | i | i | i | 1 | 1 | −1 | −1 | −i | −i | −1 | −i | −1 | 1 |
| 1 | −i | i | −i | i | i | −1 | −1 | −1 | 1 | i | i | i | i | i |
| 1 | −i | i | i | 1 | 1 | 1 | −i | 1 | 1 | 1 | 1 | −1 | −1 | −i |
| 1 | −i | i | i | 1 | i | −1 | 1 | −1 | −i | −1 | 1 | i | −1 | 1 |

| | | | | | | | | | | | | | | | |
|---|---|---|---|---|---|---|---|---|---|---|---|---|---|---|---|
| 1 | −i | −1 | −1 | −1 | −1 | −i | −i | 1 | i | 1 | −1 | −i | 1 | i | −1 |
| 1 | −i | −1 | −1 | i | −1 | −1 | 1 | −1 | i | −1 | −1 | −i | 1 | −1 | 1 |
| 1 | −i | −1 | −1 | −i | −1 | 1 | 1 | −1 | i | −1 | 1 | i | −1 | i | 1 |
| 1 | −i | −1 | −1 | −i | −1 | −i | 1 | −1 | −i | 1 | −1 | i | −i | i | 1 |
| 1 | −i | −1 | i | 1 | −1 | −i | −i | 1 | i | 1 | i | 1 | 1 | i | −i |
| 1 | −i | −1 | i | −1 | −1 | −i | i | 1 | 1 | 1 | i | −1 | 1 | 1 | 1 |
| 1 | −i | −1 | i | −1 | −1 | −i | i | 1 | i | 1 | −1 | 1 | −1 | −1 | −1 |
| 1 | −i | −1 | i | i | −1 | 1 | −1 | −1 | 1 | i | −1 | −i | −1 | −1 | −i |
| 1 | −i | −1 | i | −i | i | −1 | −i | −1 | i | i | i | i | i | i |
| 1 | −i | −1 | −i | 1 | 1 | −1 | 1 | i | −1 | i | i | −1 | 1 | 1 | 1 |
| 1 | −i | −1 | −i | 1 | i | i | 1 | 1 | −i | 1 | 1 | 1 | i | −1 | i |
| 1 | −i | −1 | −i | −1 | −i | i | 1 | 1 | −i | 1 | −1 | −i | −i | −1 | −i |
| 1 | −i | −1 | −i | i | i | −i | −1 | −i | 1 | −i | −i | i | −i | −i |
| 1 | −i | −1 | −i | −i | 1 | 1 | 1 | −1 | −1 | −i | 1 | −1 | 1 | 1 | −i |
| 1 | −i | i | 1 | 1 | −1 | −1 | −1 | 1 | i | −i | 1 | 1 | 1 | i | −1 |
| 1 | −i | i | 1 | −1 | 1 | i | −1 | 1 | i | i | −1 | −1 | −1 | i | −i |
| 1 | −i | i | 1 | −1 | −i | i | 1 | i | −i | −i | −1 | −1 | −i | −1 | −i |
| 1 | −i | i | 1 | i | i | i | −1 | −1 | 1 | −1 | i | 1 | i | i | i |
| 1 | −i | i | 1 | −i | −1 | −1 | −i | −i | 1 | i | −i | i | −1 |
| 1 | −i | i | −1 | 1 | −1 | −i | −1 | 1 | i | 1 | 1 | 1 | 1 | −i | 1 |
| 1 | −i | i | −1 | 1 | 1 | 1 | 1 | −1 | −1 | −i | −1 | −1 | −1 | −1 | −1 |
| 1 | −i | i | −1 | −1 | 1 | 1 | −i | 1 | −1 | −i | −1 | −1 | −i | −1 | −1 |
| 1 | −i | i | −1 | i | 1 | −1 | −1 | −1 | −1 | −i | 1 | 1 | −1 | −i | −1 |
| 1 | −i | i | −1 | i | 1 | 1 | −i | −1 | i | −1 | −1 | −i | i | −1 | −1 |
| 1 | −i | i | −1 | −i | 1 | −i | −1 | i | i | −1 | i | −1 | −i | −1 |
| 1 | −i | i | −1 | −1 | −i | −1 | 1 | 1 | 1 | i | 1 | 1 | i | 1 | −1 |
| 1 | −i | i | i | 1 | i | −1 | 1 | 1 | −i | −i | −i | 1 | i | 1 | −1 |

| | | | | | | | | | | | | | | | |
|---|---|---|---|---|---|---|---|---|---|---|---|---|---|---|---|
| 1 | −i | i | i | −1 | 1 | i | 1 | −1 | i | i | −i | −1 | −1 | i | −1 |
| 1 | −i | i | i | i | 1 | −1 | −1 | 1 | −1 | i | i | −1 | −i | −1 | −i |
| 1 | −i | i | i | i | −i | −i | 1 | 1 | −i | i | −i | −i | −i | −1 |
| 1 | −i | i | −i | 1 | −1 | −i | 1 | i | i | i | 1 | 1 | −i | −1 |
| 1 | −i | i | −i | −1 | 1 | 1 | 1 | 1 | 1 | i | −1 | 1 | 1 | 1 | 1 |
| 1 | −i | i | −i | −1 | −i | −1 | 1 | −i | i | −1 | −i | −i | 1 | 1 |
| 1 | −i | i | −i | i | i | i | 1 | −1 | −i | i | i | i | i | i | −1 |
| 1 | −i | i | −i | −i | 1 | −i | −1 | −1 | i | 1 | −1 | −1 | 1 | 1 | −1 |
| 1 | −i | −i | 1 | 1 | 1 | −1 | i | 1 | −i | i | −1 | 1 | i | 1 | −i |
| 1 | −i | −i | 1 | −1 | −1 | 1 | 1 | 1 | i | i | 1 | −1 | 1 | −1 | 1 |
| 1 | −i | −i | 1 | i | −1 | i | 1 | −1 | i | −1 | 1 | −1 | 1 | i | 1 |
| 1 | −i | −i | 1 | i | −1 | −1 | −1 | i | −i | 1 | −1 | 1 | i | 1 |
| 1 | −i | −i | 1 | i | 1 | 1 | 1 | i | i | 1 | −i | −i | 1 | −1 |
| 1 | −i | −i | 1 | −i | i | −1 | 1 | −i | 1 | −1 | i | 1 | i |

TABLE 9-continued

| | | | | | | | | | | | | | | | |
|---|---|---|---|---|---|---|---|---|---|---|---|---|---|---|---|
| 1 | -i | -i | -1 | 1 | 1 | i | i | 1 | i | -i | 1 | 1 | -1 | i | -i |
| 1 | -i | -i | -1 | 1 | i | 1 | i | 1 | -i | i | 1 | 1 | i | -1 | -i |
| 1 | -i | -i | -1 | -1 | -1 | 1 | -1 | 1 | i | i | -1 | -1 | 1 | -1 | -1 |
| 1 | -i | -i | -1 | i | -1 | i | -1 | i | -i | -1 | -i | 1 | i | i | -1 |
| 1 | -i | -i | -1 | i | i | -i | i | -1 | -1 | -i | 1 | -i | i | -i | -i |
| 1 | -i | -i | -1 | -i | 1 | i | -1 | -1 | i | -i | -1 | i | -1 | i | -1 |
| 1 | -i | i | i | -1 | -i | -1 | 1 | 1 | -i | -i | -1 | -i | -i | 1 | -1 |
| 1 | -i | i | i | i | 1 | i | 1 | 1 | -i | 1 | -1 | -i | i | 1 | -1 |
| 1 | -i | i | i | -i | 1 | -i | i | -1 | i | i | i | i | -1 | -1 | i |
| 1 | -i | i | -i | 1 | 1 | 1 | i | 1 | i | -1 | -1 | 1 | -1 | -1 | i |
| 1 | -i | i | -i | 1 | i | -1 | -1 | 1 | -i | -i | i | 1 | i | 1 | 1 |
| 1 | -i | i | -i | -1 | -1 | i | 1 | 1 | i | i | i | -1 | 1 | i | -1 |
| 1 | -i | i | -i | 1 | -1 | -i | -i | -1 | i | i | -1 | -i | 1 | -i | -i |
| 1 | -i | i | -i | -i | 1 | -i | -i | -1 | i | i | -i | i | -1 | -i | -i |
| 1 | -i | i | -i | -1 | -1 | -1 | 1 | -1 | -i | 1 | i | i | -i | -i | -1 |
| 1 | -i | -i | 1 | 1 | -1 | 1 | i | 1 | 1 | -i | i | 1 | 1 | 1 | -i |
| 1 | -i | -i | 1 | -1 | 1 | -i | -i | 1 | 1 | i | -1 | -1 | -1 | -i | i |
| 1 | -i | -i | 1 | -1 | -i | 1 | -i | 1 | -i | i | -1 | -1 | -i | -1 | i |
| 1 | -i | -i | 1 | i | i | -1 | 1 | -1 | -i | i | 1 | -i | i | 1 | 1 |
| 1 | -i | -i | 1 | -i | 1 | i | -1 | -i | i | -1 | 1 | i | -1 | i | 1 |
| 1 | -i | -i | 1 | -i | -i | i | -1 | -i | -i | -1 | i | -i | -1 | i | -i |
| 1 | -i | -i | -1 | 1 | -1 | 1 | 1 | i | i | -1 | 1 | 1 | -1 | 1 |
| 1 | -i | -i | -1 | -1 | 1 | -1 | -1 | i | i | -1 | -1 | -1 | i | -1 |
| 1 | -i | -i | -1 | -1 | 1 | i | 1 | i | i | -1 | -1 | 1 | -1 | -i |
| 1 | -i | -i | -1 | i | i | -1 | -1 | -1 | i | -1 | -i | i | 1 | -1 |
| 1 | -i | -i | -1 | i | -1 | i | i | -1 | -1 | i | -i | i | -i | -i | -i |
| 1 | -i | -i | -1 | -1 | 1 | -i | -i | -1 | -1 | -i | 1 | i | 1 | -i | i |
| 1 | -i | -i | -1 | -i | i | -i | -i | -1 | 1 | -i | -i | i | -i | -i | |
| 1 | -i | -i | -1 | -1 | 1 | -i | -i | -1 | -1 | -i | 1 | i | 1 | -i | i |
| 1 | -i | -i | -i | -i | i | -i | -1 | -i | -1 | 1 | i | -i | i | i |
| 1 | -i | -i | -i | 1 | -1 | 1 | -i | 1 | i | i | 1 | 1 | -1 | -i |
| 1 | -i | -i | i | -1 | 1 | -1 | i | 1 | 1 | i | -1 | -1 | 1 | i |
| 1 | -i | -i | i | -i | -1 | -1 | 1 | -i | 1 | -i | -1 | -i | 1 | 1 |
| 1 | -i | -i | i | i | -1 | -i | -i | -i | -i | -i | 1 | -i | 1 |
| 1 | -i | -i | i | -i | 1 | -1 | -1 | -1 | i | 1 | i | -i | -1 | -1 |
| 1 | -i | -i | -i | 1 | -1 | 1 | 1 | i | -i | 1 | 1 | 1 | i | -1 |
| 1 | -i | -i | -1 | -1 | 1 | 1 | i | -i | -1 | 1 | -1 | -1 | i | -1 |
| 1 | -i | -i | i | -1 | i | -i | -1 | -i | -i | -i | 1 | i | -i |
| 1 | -i | -i | 1 | -i | -1 | i | -1 | -i | -i | -i | -i | 1 | i |
| 1 | -i | -i | -i | 1 | -i | i | -1 | -i | i | -i | -i | i | i |
| 1 | -i | -i | -i | -i | -i | i | 1 | -1 | -i | -i | i | -i | -1 |

Among the total 6144 phase rotation factor sequences, the remaining 5440 sequences except the 704 baseline sequences shown in Table 9 can be estimated from the 704 baseline sequences according to the following methods. Hereinafter, examples of obtaining the remaining sequences from the baseline sequences will be explained. In Equations 16 to 18, $\gamma_{k,l}$ indicates a baseline sequence and k and l denotes a row and column of the corresponding baseline sequence in Table 9, respectively (where $1 \leq k \leq 352$, $l=\{1, 2\}$). For example, if k and l is respectively equal to 3 and 2 (i.e., k=3 and l=2), it indicates the baseline sequence shown in the third row and the right column of Table 9. In addition, $\chi_{k,l}$ indicates a sequence derived from the baseline sequence based on Equations 16 to 18.

As a first embodiment, it is possible to consider a case where the baseline sequence is multiplied by a prescribed constant α as shown in Equation 16.

Equation 16

$$\chi_{k,l} = \alpha \gamma_{k,l}$$ [Equation 16]

In Equation 16, α may be $\{1, -1, i, -i\}$.

As a second embodiment, a sequence can be generated by cyclic-shifting the baseline sequence as shown in Equation 17.

Equation 17

$$\chi_{k,l} = \gamma_{k,l}^{(m)}$$ [Equation 17]

In Equation 17, m denotes a cyclic shift value.

As a third embodiment, a sequence can be generated by arranging the baseline sequence in reverse order as shown in Equation 18.

Equation 18

$$\chi_{k,l} = \text{rev}(\gamma_{k,l})$$ [Equation 18]

In Equation 18, rev(.) indicates an operation of arranging a specific sequence in reverse order. For example, a result of rev([1 2 3]) becomes [3 2 1] (i.e., rev([1 2 3])=[3 2 1]).

Additionally, a new sequence can be generated by simultaneously applying at least two embodiments among the embodiments proposed in Equations 16 to 18.

Figure 18:
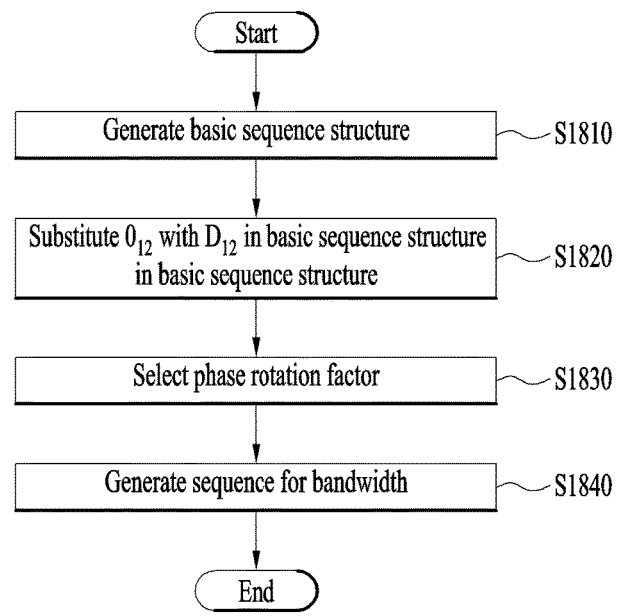
FIG. 18 is a flowchart illustrating a method for generating a sequence according to proposed embodiments.

FIG. 18 is a flowchart illustrating a method for generating a sequence according to proposed embodiments. Specifically, FIG. 18 shows a time series flow of the aforementioned embodiments. Thus, it is apparent that although the aforementioned features are not explicitly shown and described in FIG. 18, the features can be applied in the same or similar manner. Meanwhile, although in FIG. 18, an embodiment is described focusing on AP operation, a sequence for a UE can be generated in the same manner.

First, an AP generates a basic sequence structure [S1810]. Here, the basic sequence structure means a series of values repeatedly used for generating sequences for 20, 40, and 80 MHz bandwidths. For instance, the basic sequence structure may mean 244 tones (i.e., $C_{52}\ 0_{12}\ C_{52}\ 0_{12}\ C_{52}\ 0_{12}\ C_{52}$) obtained by eliminating the first component $0_5$ and the last component $0_7$ from the sequence for the 20 MHz bandwidth in Equation 2.

After generating the basic sequence structure, the AP substitutes $0_{12}$ of the basic sequence structure with $D_{12}$ [S1820]. In this case, D12 can be defined as shown in Equation 5. Alternatively, unlike Equation 5, it can be defined such that non-zero values are repeated at an interval of 2 tones. Hereinafter, the structure obtained by applying $D_{12}$ to the basic sequence structure is referred to as a substituted structure or a $D_{12}$ sequence structure.

Thereafter, the AP selects a phase rotation factor used for generating a sequence [S1830]. A plurality of phase rotation factors for an optimal or suboptimal PAPR can be determined in each bandwidth in advance and the UE selects any one from among the plurality of the phase rotation factors. Meanwhile, the phase rotation factor $\gamma_k$ may include different numbers of components depending on bandwidths.

The AP generates a final sequence for a corresponding bandwidth using the $D_{12}$ sequence structure and the phase rotation factor [S1840]. This step may be performed by applying the phase rotation factor in the unit of $\{C_{12}D_{12}\}$ or $\{C_{12}\}$ as described above. That is, in the 20 MHz bandwidth, the final sequence is generated by applying the phase rotation factor as shown in Equation 8.

Meanwhile, although the sequence generation procedure is described with reference to the 20 MHz bandwidth, the steps S1830 and S1840 may be changed in 40 and 80 MHz bandwidths. As described with reference to Equations 9 and 10, a sequence for the 40 MHz bandwidth is generated by repeating a sequence obtained by eliminating some components (the first $0_5$ component and the last $0_7$ component) from the sequence of the 20 MHz bandwidth and a sequence for the 80 MHz bandwidth is generated by repeating a sequence obtained by eliminating some components (the first $0_5$ component and the last $0_7$ component) from the sequence of the 40 MHz bandwidth.

In this case, the phase rotation factor is defined to have two components for the 40 and 80 MHz bandwidths, respectively. The UE may select any one from among a plurality of predetermined sequences.

Alternatively, phase rotation factors for the 40 and 80 MHz bandwidths may be determined by the unit of $\{C_{12}D_{12}\}$ or $\{C_{12}\}$ as described with reference to Equations 11, 12, 13, and 14. In this case, a phase rotation factor may include 8 or 16 components and the AP generates a sequence by selecting any one from among a plurality of predetermined sequences.

According to another embodiment, a sequence derived from a baseline sequence according to the embodiments described with reference to Equations 166 to 18 can be used as a phase rotation factor.

After generating a sequence according to one of the proposed embodiments, the AP transmits the corresponding sequence to the UE. That is, the generated sequence is inserted into a preamble of a frame for transmission thereof. In addition, the sequence is utilized for synchronization between an AP and a UE, channel measurement, AGC, etc. Moreover, it is apparent that the embodiments described in FIG. 18 can be applied to a UE in the same or similar manner.

4. Apparatus Configuration

Figure 19:
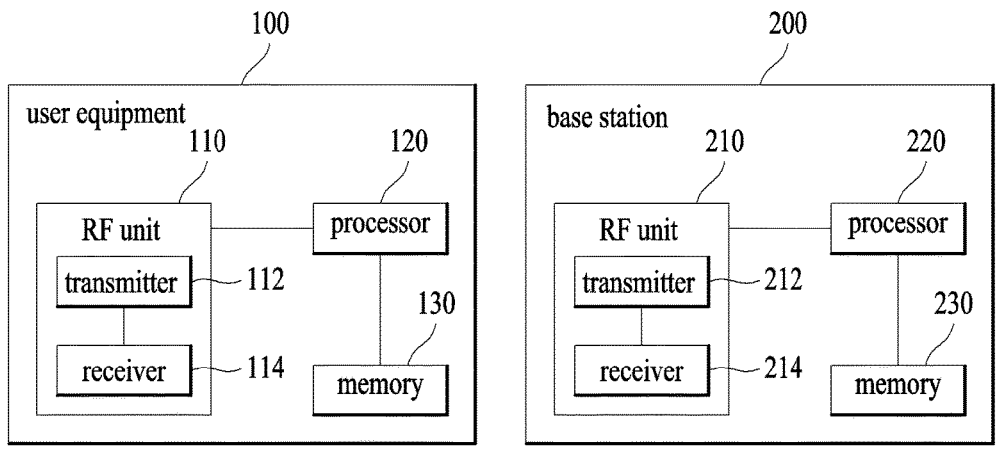
FIG. 19 is a block diagram illustrating configurations of a user equipment and a base station according to an embodiment of the present invention.

FIG. 19 is a block diagram showing the configuration of a user equipment and a base station (or, AP (Access Point)) according to one embodiment of the present invention. In FIG. 19, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 19, a communication environment may be established between a plurality of reception module and the transmission module. In addition, the base station 200 shown in FIG. 19 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other reception modules and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another transmission module and reception modules and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure. the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Although a sequence generation method is mainly described based on an IEEE 802.11 system and an HEW system, the method can be applied to various kinds of wireless communication systems as well as the IEEE 802.11 system and the HEW system.

What is claimed is:

1. A method of transmitting a preamble comprising a sequence, the method performed by an access point (AP) in a wireless local area network (WLAN) system and comprising:
generating, by the AP, a basic sequence structure including one or more $C_{52}$s and one or more $D_{12}$s,
wherein each of the one or more $C_{52}$s is composed of 52 tones, and
wherein each of the one or more $D_{12}$s is composed of 12 tones and has a non-zero value at an interval of 4 tones;
selecting, by the AP, one phase rotation factor from among a plurality of phase rotation factors predetermined for bandwidths for communication with a user equipment (UE);
generating, by the AP, the sequence based on the basic sequence structure and the selected phase rotation factor,
wherein the selected phase rotation factor is applied to the basic sequence structure in a unit of a $C_{52}$ or a $C_{52}D_{12}$; and
transmitting, by the AP, the preamble comprising the generated sequence to the UE.

2. The method of claim 1, wherein the basic sequence structure is configured in the form of a C52D12C52D12C52D12C52.

3. The method of claim 2, wherein the selected phase rotation factor is applied in the unit of the $C_{52}D_{12}$ to change a phase of each $C_{52}D_{12}$ of the basic sequence structure, and wherein the phase rotation factor is only applied in the unit of the $C_{52}$ to change a phase of the last $C_{52}$.

4. The method of claim 1, wherein the $D_{12}$ is {0, 0, 0, 1+j, 0, 0, 0, −1−j, 0, 0, 0, −1−j}.

5. The method of claim 1, wherein the sequence is generated by adding a $0_5$ composed of five consecutive 0s to front of the basic sequence structure and adding a $0_7$ composed of seven consecutive 0s, to back of the basic sequence structure.

6. The method of claim 5, wherein, in a case of a 20 MHz bandwidth, the sequence comprising the $0_5$ and the $0_7$ is used without any change,
wherein, in a case of a 40 MHz bandwidth, a sequence composed of two first partial sequences having a sequence structure that the $0_5$ and the $0_7$ are eliminated from the sequence for the 20 MHz bandwidth, one $D_{12}$, one $0_5$, and one $0_7$ is used, and
wherein, in a case of a 80 MHz bandwidth, a sequence composed of two second partial sequences having sequence structure that the $0_5$ and the $0_7$ are eliminated from the sequence for the 40 MHz bandwidth, one $D_{12}$, one $0_5$, and one $0_7$ is used.

7. The method of claim 6, wherein, in the case of the 40 MHz bandwidth, the phase rotation factor changes phases in a unit of the first partial sequence having the sequence structure that the $0_5$ and the $0_7$ are eliminated from the sequence for the 20 MHz bandwidth, and
wherein, in the case of the 80 MHz bandwidth, the phase rotation factor changes phases in a unit of the second partial sequence having the sequence structure that the $0_5$ and the $0_7$ are eliminated from the sequence for the 40 MHz bandwidth.

8. The method of claim 1, wherein the plurality of the phase rotation factors are generated by multiplying any single phase rotation factor by 1, −1, i, or −i, cyclic-shifting the any single phase rotation factor, or arranging the any single phase rotation in reverse order.

9. An access point (AP) for transmitting a preamble comprising sequence in a wireless local area network (WLAN) system, the AP comprising:
a transmitter;
a receiver;
a processor connected to the transmitter and the receiver and configured to generate the sequence,
wherein the processor is configured to:
generate a basic sequence structure including one or more $C_{52}$s and one or more $D_{12}$s,
wherein each of the one or more $C_{52}$s is composed of 52 tones, and
wherein each of the one or more $D_{12}$s is composed of 12 tones and has a non-zero value at an interval of 4 tones;
select one phase rotation factor from among a plurality of phase rotation factors predetermined for bandwidths for communication with a user equipment (UE);
generate the sequence based on the basic sequence structure and the selected phase rotation factor,
wherein the selected phase rotation factor is applied to the basic sequence structure in a unit of a $C_{52}$ or a $C_{52}D_{12}$; and
transmit the preamble comprising the generated sequence to the UE.

10. The AP of claim 9, wherein the basic sequence structure is configured in the form of a $C_{52}D_{12}C_{52}D_{12}C_{52}D_{12}C_{52}$.

11. The AP of claim 10, wherein the selected phase rotation factor is applied in the unit of the $C_{52}D_{12}$ to change a phase of each $C_{52}D_{12}$ of the basic sequence structure, and wherein the phase rotation factor is only applied in the unit of the $C_{52}$ to change a phase of the last $C_{52}$.

12. The AP of claim 9, wherein the $D_{12}$ is {0, 0, 0, 1×j, 0, 0, 0, −1 −j, 0, 0, 0, −1 −j}.

13. The AP of claim 9, wherein the sequence is generated by adding a $0_5$ composed of five consecutive 0s to front of the basic sequence structure and adding a $0_7$ composed of seven consecutive 0s to back of the basic sequence structure.

14. The AP of claim 13, wherein, in a case of a 20 MHz bandwidth, the sequence comprising the $0_5$ and the $0_7$ is used without any change, wherein, a case of a 40 MHz bandwidth, a sequence composed of two first partial sequences having a sequence structure that the $0_5$ and the $0_7$ are eliminated from the sequence for the 20 MHz bandwidth, one D12, one $0_5$, and one $0_7$ is used, and wherein, in a case of a 80 MHz bandwidth, a sequence composed of two second partial sequences having sequence structure that the $0_5$ and the $0_7$ are eliminated from the sequence for the 40 MHz bandwidth, one $D_{12}$, one $0_5$, and one $0_7$ is used.

15. The AP of claim 14, wherein, in the case of the 40 MHz bandwidth, the phase rotation factor changes phases in a unit of the first partial sequence having the sequence structure that the $0_5$ and the $0_7$ are eliminated from the sequence for the 20 MHz bandwidth, and wherein, in the case of the 80 MHz bandwidth, the phase rotation factor changes phases in a unit of the second partial sequence having the sequence structure that the $0_5$ and the $0_7$ are eliminated from the sequence for the 40 MHz bandwidth.

16. The AP of claim 9, wherein the plurality of the phase rotation factors are generated by multiplying any single phase rotation factor by 1, −1, i, or −i, cyclic-shifting the any single phase rotation factor, or arranging the any single phase rotation in reverse order.

* * * * *